US011388788B2

(12) United States Patent
Denker et al.

(10) Patent No.: US 11,388,788 B2
(45) Date of Patent: Jul. 12, 2022

(54) IN-OVEN CAMERA AND COMPUTER VISION SYSTEMS AND METHODS

(71) Applicant: Brava Home, Inc., Redwood City, CA (US)

(72) Inventors: Dennis Denker, Scottsdale, AZ (US); Brian Williams, Mountain View, CA (US); Shih-yu Cheng, Union City, CA (US); Zinovy Dolgonosov, San Francisco, CA (US)

(73) Assignee: BRAVA HOME, INC., Redwood City, CA (US)

( * ) Notice: Subject to any disclaimer, the term of this patent is extended or adjusted under 35 U.S.C. 154(b) by 394 days.

(21) Appl. No.: 16/030,858

(22) Filed: Jul. 9, 2018

(65) Prior Publication Data

US 2018/0324908 A1 Nov. 8, 2018

Related U.S. Application Data

(63) Continuation-in-part of application No. 15/922,877, filed on Mar. 15, 2018, which is a
(Continued)

(51) Int. Cl.
*H05B 1/02* (2006.01)
*F24C 7/08* (2006.01)
(Continued)

(52) U.S. Cl.
CPC ............. *H05B 6/687* (2013.01); *F24C 7/085* (2013.01); *G06K 9/46* (2013.01); *G06T 7/0002* (2013.01);
(Continued)

(58) Field of Classification Search
None
See application file for complete search history.

(56) References Cited

U.S. PATENT DOCUMENTS 3,407,285 A 10/1968 Jacobs
4,117,294 A 9/1978 Appelquist et al.
(Continued)

FOREIGN PATENT DOCUMENTS

CN 1892673 10/2007
CN 101398197 4/2009
(Continued)

*Primary Examiner* — Joseph M. Pelham
(74) *Attorney, Agent, or Firm* — Haynes and Boone, LLP

(57) ABSTRACT

Systems and methods include a cooking appliance comprising a heating element disposed within a cooking chamber and operable to selectively emit waves at any of a plurality of powers and/or peak wavelengths, a camera operable to capture an image of the cooking chamber, and a computing device operable to supply power to the heating element to vary the power and/or peak wavelength of the emitted waves and generate heat within the cooking chamber, and instruct the camera to capture the image when the heating element is emitting at a stabilized power and/or peak wavelength. The computing device is operable to generate an adjusted captured image by adjusting the captured image with respect to the stabilized power and/or peak wavelength. The computing device comprises feedback components operable to receive the adjusted captured image, extract features, and analyze the one or more features to determine an event, property, measurement and/or status.

31 Claims, 34 Drawing Sheets

Related U.S. Application Data continuation-in-part of application No. 15/261,784, filed on Sep. 9, 2016.

(60) Provisional application No. 62/256,626, filed on Nov. 17, 2015, provisional application No. 62/249,456, filed on Nov. 2, 2015, provisional application No. 62/240,794, filed on Oct. 13, 2015, provisional application No. 62/218,942, filed on Sep. 15, 2015, provisional application No. 62/216,859, filed on Sep. 10, 2015.

(51) Int. Cl.
| | |
|---|---|
| H05B 6/68 | (2006.01) |
| H05B 6/64 | (2006.01) |
| H05B 6/70 | (2006.01) |
| H05B 6/66 | (2006.01) |
| G06T 7/00 | (2017.01) |
| G06K 9/46 | (2006.01) |
| H04N 5/232 | (2006.01) |
| H04N 7/18 | (2006.01) |
| H04N 5/235 | (2006.01) |
| H04N 9/73 | (2006.01) |
| G06T 7/62 | (2017.01) |
| G06T 7/70 | (2017.01) |

(52) U.S. Cl.
CPC ............ *H04N 5/232* (2013.01); *H04N 7/188* (2013.01); *H05B 1/0263* (2013.01); *H05B 6/6435* (2013.01); *H05B 6/6441* (2013.01); *H05B 6/6444* (2013.01); *H05B 6/6447* (2013.01); *H05B 6/6467* (2013.01); *H05B 6/668* (2013.01); *H05B 6/705* (2013.01); *G06K 2209/17* (2013.01); *G06T 7/62* (2017.01); *G06T 7/70* (2017.01); *G06T 2207/20084* (2013.01); *H04N 5/2353* (2013.01); *H04N 9/735* (2013.01)

(56) References Cited

U.S. PATENT DOCUMENTS

| | | | |
|---|---|---|---|
| 4,335,293 | A | 6/1982 | Kobayashi et al. |
| 4,441,015 | A | 4/1984 | Eichelberger |
| 4,473,732 | A | 9/1984 | Payne |
| 4,475,024 | A | 10/1984 | Tateda et al. |
| 4,771,154 | A | 9/1988 | Bell et al. |
| 4,800,090 | A | 1/1989 | August |
| 5,349,163 | A | 9/1994 | An |
| 5,360,965 | A | 11/1994 | Ishii et al. |
| 5,517,005 | A | 5/1996 | Westerberg et al. |
| 5,665,259 | A | 9/1997 | Westerberg |
| 5,877,477 | A | 3/1999 | Petty |
| 5,990,454 | A | 11/1999 | Westerberg et al. |
| 6,011,242 | A | 1/2000 | Westerberg |
| 6,013,900 | A | 1/2000 | Westerberg et al. |
| 6,069,345 | A | 5/2000 | Westerberg |
| 6,302,095 | B1 | 10/2001 | Tolley et al. |
| 6,417,494 | B1 | 7/2002 | Westerberg et al. |
| 6,448,540 | B1 | 9/2002 | Wilhelm et al. |
| 6,843,207 | B2 | 1/2005 | Kanzaki et al. |
| 7,075,442 | B2 | 7/2006 | Lion et al. |
| D541,578 | S | 5/2007 | Jeon |
| 7,323,663 | B2 | 1/2008 | Cavada et al. |
| D586,180 | S | 2/2009 | Pino et al. |
| D602,306 | S | 10/2009 | Lavy |
| 7,619,186 | B2 | 11/2009 | Cavada et al. |
| 7,683,292 | B2 | 3/2010 | Cavada et al. |
| D629,639 | S | 12/2010 | Fernandez et al. |
| 8,200,548 | B2 | 6/2012 | Wiedl |
| 8,791,398 | B2 | 7/2014 | De la Cuerda Ortin et al. |
| 8,833,242 | B2 * | 9/2014 | Sanchez-Prieto Aler .................... A47J 37/085 99/331 |
| 8,929,724 | B1 | 1/2015 | Mograbi |
| 9,414,444 | B2 | 8/2016 | Libman et al. |
| 9,460,633 | B2 | 10/2016 | Minvielle |
| D771,995 | S | 11/2016 | Bhogal et al. |
| D771,996 | S | 11/2016 | Bhogal et al. |
| 9,528,972 | B2 | 12/2016 | Minvielle |
| D777,504 | S | 1/2017 | Bhogal et al. |
| D782,864 | S | 4/2017 | Bhogal et al. |
| D783,336 | S | 4/2017 | Suh et al. |
| D802,996 | S | 11/2017 | Bhogal et al. |
| 9,927,129 | B2 | 3/2018 | Bhogal et al. |
| 10,085,592 | B1 * | 10/2018 | Cheng ................. A47J 37/0676 |
| 10,502,430 | B1 * | 12/2019 | Alvey .................... F27D 21/04 |
| 2002/0171674 | A1 | 11/2002 | Paris |
| 2005/0173400 | A1 | 8/2005 | Cavada et al. |
| 2006/0289436 | A1 | 12/2006 | Carbone et al. |
| 2008/0259995 | A1 | 10/2008 | Kuhn et al. |
| 2009/0034944 | A1 | 2/2009 | Burtea et al. |
| 2009/0102083 | A1 | 4/2009 | Cochran et al. |
| 2009/0272814 | A1 | 11/2009 | Granhed et al. |
| 2010/0186600 | A1 | 7/2010 | Lewis et al. |
| 2010/0199857 | A1 | 8/2010 | Storiz et al. |
| 2011/0002675 | A1 | 1/2011 | Cochran et al. |
| 2011/0002677 | A1 | 1/2011 | Cochran et al. |
| 2011/0114627 | A1 | 5/2011 | Burt |
| 2011/0114633 | A1 | 5/2011 | Niklasson et al. |
| 2012/0063753 | A1 | 3/2012 | Cochran et al. |
| 2012/0180775 | A1 | 7/2012 | Waltz et al. |
| 2013/0202754 | A1 | 8/2013 | Cochran et al. |
| 2014/0203012 | A1 * | 7/2014 | Corona ................. H05B 6/687 219/705 |
| 2015/0056344 | A1 * | 2/2015 | Luckhardt ............ F24C 7/081 426/233 |
| 2015/0289324 | A1 | 10/2015 | Rober et al. |
| 2015/0330640 | A1 | 11/2015 | Stork Genannt Wersborg |
| 2015/0366219 | A1 * | 12/2015 | Stork genannt Wersborg ............ A21C 13/00 702/136 |
| 2016/0033140 | A1 | 2/2016 | Weaver, Jr. et al. |
| 2016/0192446 | A1 | 6/2016 | Seddik |
| 2016/0283822 | A1 * | 9/2016 | Imai ..................... G06K 9/6212 |
| 2016/0327279 | A1 | 11/2016 | Bhogal et al. |
| 2016/0327281 | A1 * | 11/2016 | Bhogal .................... F24C 7/085 |
| 2016/0348918 | A1 | 12/2016 | Bhogal et al. |
| 2017/0006669 | A1 * | 1/2017 | Kamei ................. H05B 6/6441 |
| 2017/0048461 | A1 * | 2/2017 | Lee ...................... G06F 3/04817 |
| 2017/0074522 | A1 * | 3/2017 | Cheng .................... A47J 36/321 |
| 2017/0099988 | A1 | 4/2017 | Matloubian et al. |
| 2017/0211819 | A1 | 7/2017 | McKee et al. |
| 2017/0215233 | A1 | 7/2017 | Katz et al. |
| 2017/0223774 | A1 * | 8/2017 | Cheng .................... F24C 15/22 |
| 2017/0330348 | A1 * | 11/2017 | Park ........................ G06T 7/90 |
| 2018/0128493 | A1 | 5/2018 | Chen et al. |
| 2018/0172510 | A1 | 6/2018 | Rosen et al. |
| 2018/0184668 | A1 | 7/2018 | Stork Genannt Wersborg |
| 2018/0202667 | A1 * | 7/2018 | Cheng ................. H04N 5/23229 |
| 2019/0234617 | A1 * | 8/2019 | Bhogal ..................... A23L 5/15 |
| 2019/0242584 | A1 * | 8/2019 | Ebert ......................... A23L 5/10 |
| 2020/0069111 | A1 * | 3/2020 | Eiter ........................ F27D 21/02 |
| 2020/0103120 | A1 * | 4/2020 | Bhogal ..................... A23L 5/17 |

FOREIGN PATENT DOCUMENTS

| | | |
|---|---|---|
| CN | 102413712 | 4/2012 |
| DE | 10 2012 204229 | 9/2013 |
| EP | 1740018 | 1/2007 |
| EP | 2243407 | 10/2010 |
| EP | 2515044 | 10/2012 |
| EP | 2 662 628 | 11/2013 |
| FR | 2284243 | 4/1976 |
| JP | H03-136619 A | 6/1991 |
| JP | 2001-506360 A | 5/2001 |
| JP | 2002-156117 A | 5/2002 |
| JP | 2002-206753 A | 7/2002 |
| JP | 2002-527878 T | 1/2004 |

(56) References Cited

FOREIGN PATENT DOCUMENTS

| | | |
|---|---|---|
| JP | 2006-275489 A | 10/2006 |
| JP | 2009052817 | 3/2009 |
| JP | 2015-226662 A | 12/2015 |
| JP | 2016-011763 A | 1/2016 |
| RU | 2006102663 | 8/2007 |
| RU | 2007111953 | 10/2008 |
| RU | 2008111110 | 9/2009 |
| RU | 110892 | 11/2011 |
| WO | WO 199709865 | 3/1997 |
| WO | WO 98/030941 | 7/1998 |
| WO | WO2014086486 | 9/2004 |
| WO | WO 2009/091145 | 7/2009 |
| WO | WO-2010/102261 A1 | 9/2010 |
| WO | WO 2014/086487 | 6/2014 |
| WO | WO 2017/044876 | 3/2017 |
| WO | WO-2018/026846 A1 | 2/2018 |

* cited by examiner

900

Take images in advance of the start of the cook to determine properties of the food (e.g., size, placement) and potential errors in the food preparation.
901

Interact with user to correct detected errors, if any, and adjust recipe flow as appropriate
902

Select a heating recipe from its local heating recipe library or from a heating library implemented by a cloud service accessible through a network interface
903

Continuously stream images of the food substance to a computing device
904

When the computing device receives an image, analyze the image, utilizing computer vision techniques, to determine a state of the food substance, the cooking chamber, or the cooking platform
906

Re-configure the heating elements or other physical components of the cooking instrument in response to a state change of the food substance, the cooking chamber, and/or the cooking platform
908

Store the state change history of the food substance, the cooking chamber, and/or the cooking platform in local memory
910

Generate a media file (e.g., a visualization image or video) illustrating the progress of the heating recipe according to the state change history
912

*FIG. 9*

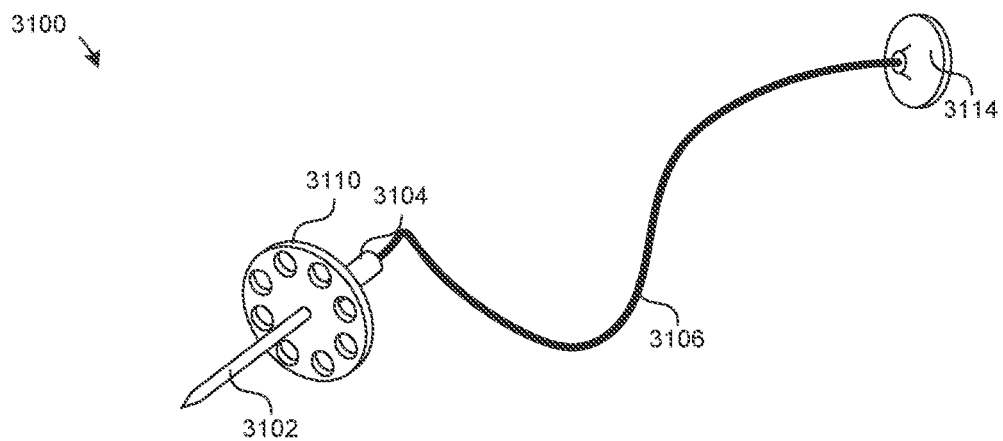
FIG. 31
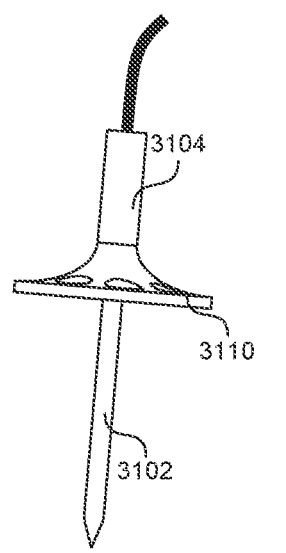   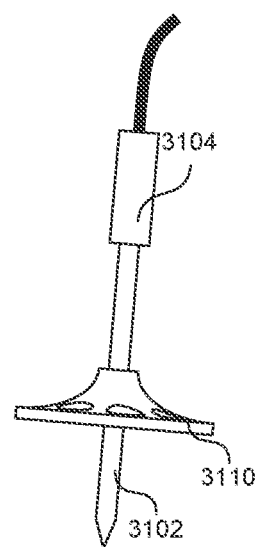
FIG. 32A          FIG. 32B

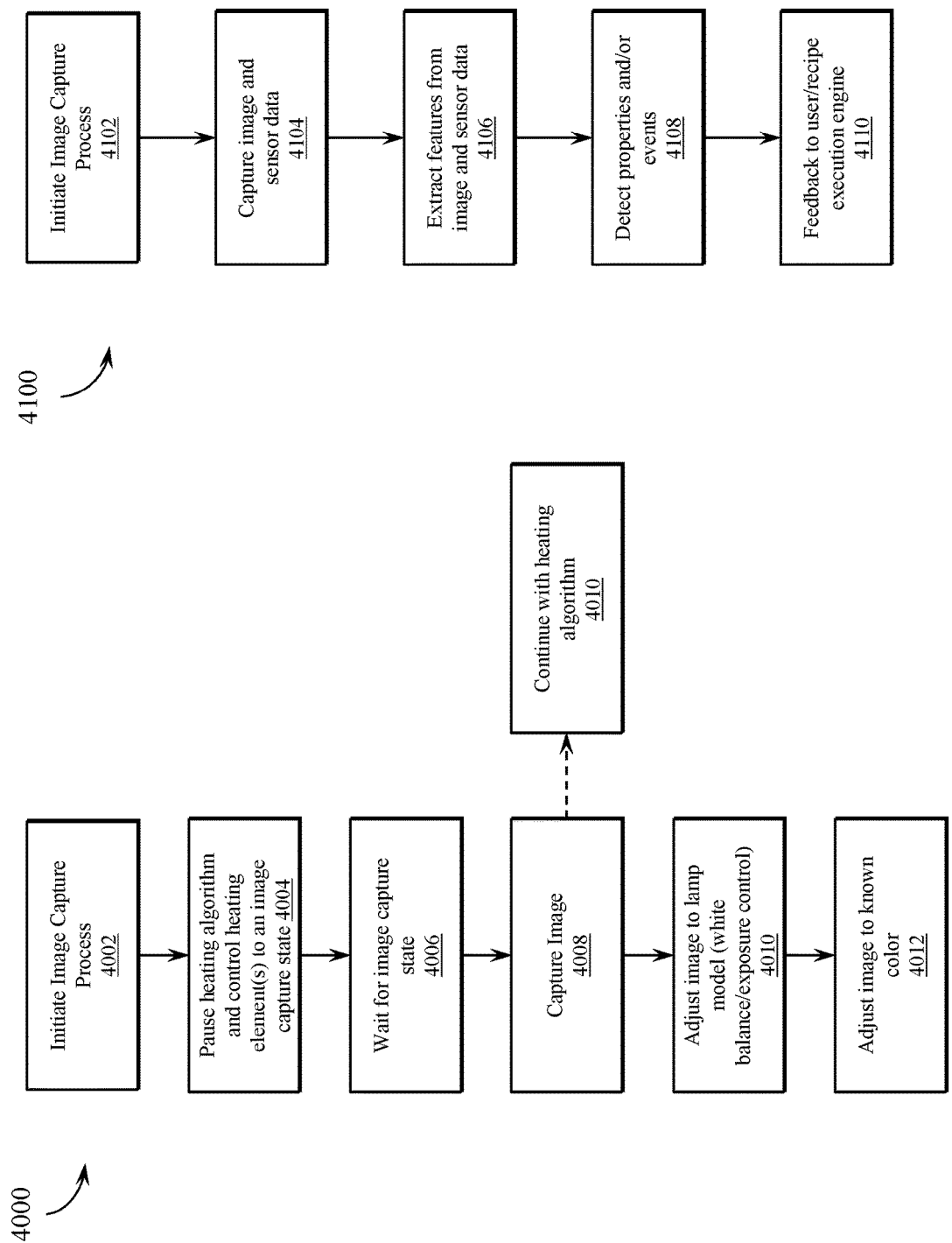

IN-OVEN CAMERA AND COMPUTER VISION SYSTEMS AND METHODS

CROSS-REFERENCE TO RELATED APPLICATIONS

This application is a continuation-in-part of U.S. patent application Ser. No. 15/922,877, entitled "DYNAMIC HEAT ADJUSTMENT OF A SPECTRAL POWER DISTRIBUTION CONFIGURABLE COOKING INSTRUMENT", filed Mar. 15, 2018, which is hereby incorporated by reference in its entirety.

U.S. patent application Ser. No. 15/922,877 is a continuation-in-part of U.S. patent application Ser. No. 15/261,784, entitled "IN-OVEN CAMERA", filed Sep. 9, 2016, which is hereby incorporated by reference in its entirety.

This application is a continuation-in-part of U.S. patent application Ser. No. 15/261,784, entitled "IN-OVEN CAMERA," filed Sep. 9, 2016, which claims the benefit of U.S. Provisional Patent Application No. 62/249,456, entitled "HEATING TECHNIQUE VIA FILAMENT WAVELENGTH TUNING," filed Nov. 2, 2015; U.S. Provisional Patent Application No. 62/216,859, entitled "WIRELESS TEMPERATURE MEASUREMENT SYSTEM," filed Sep. 10, 2015; U.S. Provisional Patent Application No. 62/218,942, entitled "IN-OVEN CAMERA," filed Sep. 15, 2015; U.S. Provisional Patent Application No. 62/240,794, entitled "TEMPERATURE PROBE ATTACHMENT WITHIN COOKING INSTRUMENT," filed Oct. 13, 2015 and U.S. Provisional Patent Application No. 62/256,626, entitled "CLOUD-BASED RECIPE STORE FOR CONFIGURABLE COOKING INSTRUMENT," filed Nov. 17, 2015, which all are incorporated by reference herein in their entirety.

TECHNICAL FIELD

Various embodiments relate to cooking appliances, such as ovens.

BACKGROUND

The art of cooking remains an "art" at least partially because of the food industry's inability to help cooks to produce systematically award worthy dishes. To make a full course meal, a cook often has to use multiple cooking appliances, understand the heating patterns of the cooking appliances, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking appliances automatically. The industry has yet been able to create an intelligent cooking appliance capable of automatically and consistently producing complex meals with precision, speed, and lack of unnecessary human intervention.

SUMMARY

Systems and methods of various embodiments include a cooking appliance comprising a heating element disposed within a cooking chamber and operable to selectively emit waves at any of a plurality of powers and/or peak wavelengths, a camera operable to capture an image of the cooking chamber, and a computing device operable to supply power to the heating element to vary the power and/or peak wavelength of the emitted waves and generate heat within the cooking chamber, and instruct the camera to capture the image when the heating element is emitting at a stabilized power and/or peak wavelength. The computing device is operable to generate an adjusted captured image by adjusting the captured image with respect to the stabilized power and/or peak wavelength. The computing device comprises feedback components operable to receive the adjusted captured image, extract features, and analyze the one or more features to determine an event, property, measurement and/or status.

Several embodiments describe a cooking appliance (e.g., an enclosed cooking chamber or otherwise) having one or more heating elements controlled by a computing device (e.g., a computer processing unit (CPU), a controller, application specific integrated circuit (ASIC), or any combination thereof). The computing device can control the output power, peak emission wavelength and/or the spectral power distribution of the heating elements. For example, each heating element can include one or more filament assembly, one or more drivers that receives commands from a computing device and adjust the output power, peak wavelength, and/or spectral power distribution of waves emitted from the filament assembly, a containment vessel, or any combination thereof. The computing device can control the filament assemblies (e.g., individually or as a whole) by controlling the electric signals driving these filament assemblies. For example, the computing device can change driving power, average electrical current level, driving signal pattern, driving signal frequency, or any combination thereof to target different material in a cooking chamber of the cooking appliance to heat. For example, the peak wavelength of waves emitted by a filament assembly can coincide with excitable wavelength of meat, water, a glass tray in the cooking appliance, interior chamber wall of the cooking appliance, containment vessels (e.g., envelope) of the filament assemblies, or any combination thereof. The computing device can implement an interactive user interface to control the cooking appliance. For example, the interactive user interface can be implemented on a touchscreen of the cooking appliance or a mobile device connected to the computing device of the cooking appliance. Each cooking recipe can include one or more heat adjustment algorithms.

The cooking appliance can instantiate and execute a heat adjustment algorithm (e.g., also referred to as "heating logic") based on a cooking recipe (e.g., a set of instructions to operate a cooking appliance). In some embodiments, the disclosed cooking appliance can directly emulate one or more types of conventional cooking appliances (e.g., a convection oven, a baking oven, a kiln, a grill, a roaster, a furnace, a range, a microwave, a smoker, a pan, a sous vide appliance or any combination thereof). In some embodiments, the cooking appliance can download (e.g., directly or indirectly) one or more cooking recipes from an external computer server system.

Some embodiments of this disclosure have other aspects, elements, features, and steps in addition to or in place of what is described above. Some of these potential additions and replacements are described throughout the rest of the specification

BRIEF DESCRIPTION OF THE DRAWINGS

FIG. 9 is a flowchart illustrating a method of operating the cooking appliance to cook a food substance utilizing optical feedback, in accordance with various embodiments.

FIG. 31 is a perspective view of at least an embodiment of a temperature probe.

FIG. 32A is a side view of the temperature probe of FIG. 31 with the insertion aid at a first position.

FIG. 32B is a side view of the temperature probe of FIG. 31 with the insertion aid at a second position.

FIG. 40 is a flow diagram illustrating a method of operating a cooking appliance, in accordance with various embodiments.

FIG. 41 is a flow diagram illustrating a method of operating a cooking appliance, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1A:
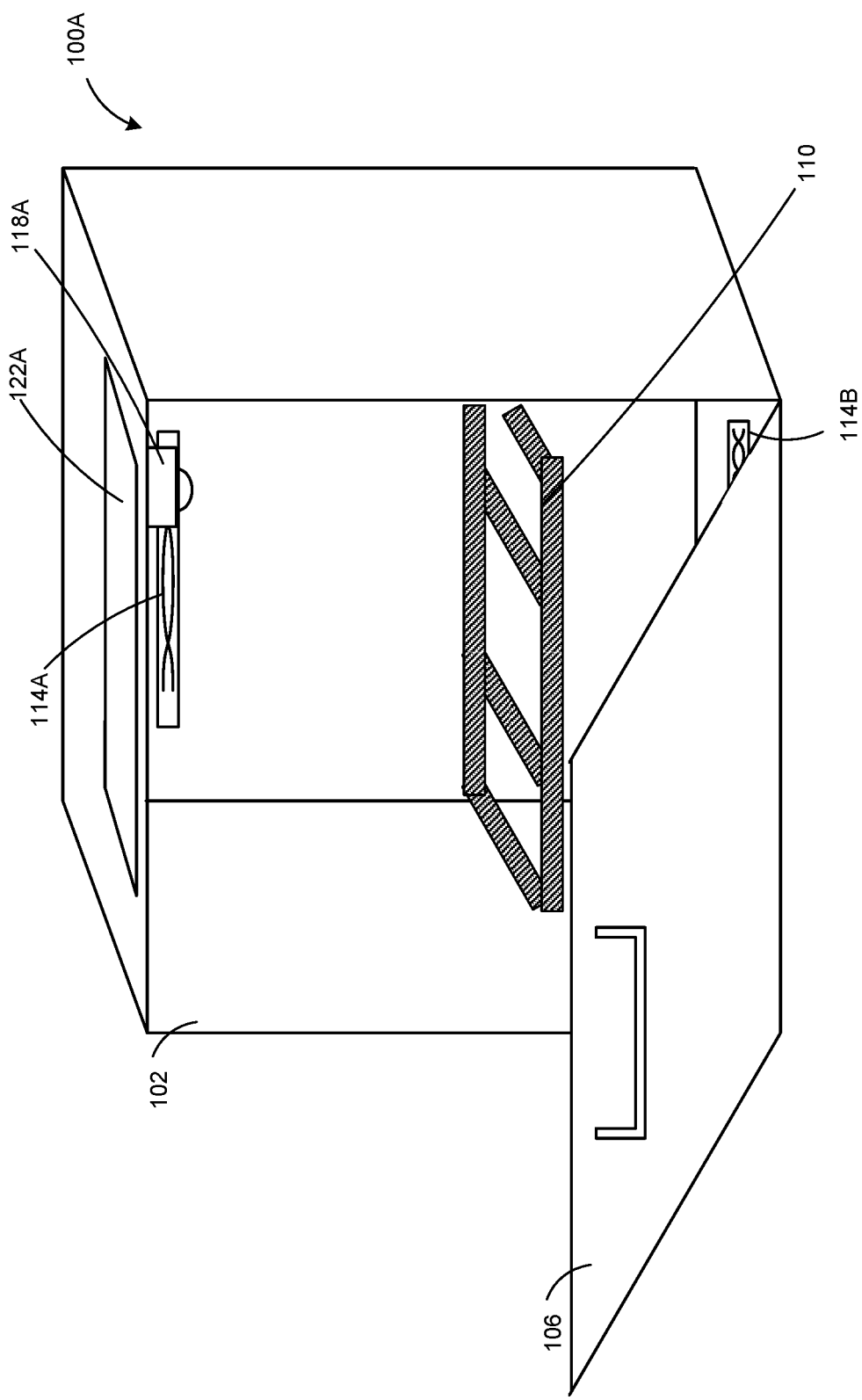
FIG. 1A is a structural diagram of a perspective view of an example of a cooking appliance, in accordance with various embodiments.

FIG. 1A is a structural diagram of a perspective view of an example of a cooking appliance 100A, in accordance with various embodiments. The cooking appliance 100A can include a chamber 102 having a door 106. At least one cooking platform 110 is disposed inside the chamber 102. The cooking platform 110 can be a tray, a rack, or any combination thereof. The chamber 102 can be lined with one or more heating elements (e.g., a heating element 114A, a heating element 114B, etc.). Each of heating elements can include a wavelength controllable filament assembly. The wavelength controllable filament assembly is capable of independently adjusting an emission frequency/wavelength, emission power, and/or emission signal pattern in response to a command from a computing device (not shown) of the cooking appliance 100A.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118A can be attached to an interior of the chamber 102. In some embodiments, the camera 118A is attached to the door 106. The camera 118A can be adapted to capture an image of content at least partially inside the chamber 102. For example, the camera 118A can face inward toward the interior of the chamber 102 when the door 106 is closed and upward when the door 106 is opened as illustrated. In some embodiments, the camera 118A is installed on the ceiling (e.g., top interior surface) of the chamber 102. The camera 118A can be attached to the door 106 or proximate (e.g., within three inches) to the door 106 on the ceiling of the chamber 102 to enable easy cleaning, convenient scanning of labels, privacy, heat damage avoidance, and etc.

In several embodiments, the heating elements (e.g., heating elements 114A and 114B) include one or more wavelength-controllable filament assemblies at one or more locations in the chamber. In some embodiments, each of the one or more wavelength-controllable filament assemblies is capable of independently adjusting its emission frequency (e.g., peak emission frequency) and/or its emission power. For example, the peak emission frequency of the wavelength-controllable filament assemblies can be tuned within a broad band range (e.g., from 20 terahertz to 300 terahertz). Different frequencies can correspond to different penetration depth for heating the food substances, other items within the chamber 102, and/or parts of the cooking appliance 100A.

The heating elements can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking appliance 100A can hold the power constant while lowering the peak emission frequency by activating more heating elements, each at a lower power. The cooking appliance 100A can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118A includes an infrared sensor to provide thermal images to the computing device as feedback to a heat adjustment algorithm. In some embodiments, the cooking appliance 100A includes multiple cameras. In some embodiments, the camera 118A includes a protective shell. In some embodiments, the heating elements 114A and 114B and the camera 118A are disposed in the chamber 102 such that the camera 118A is not directly between any pairing of the heating elements. For example, the heating elements 114A and 114B can be disposed along two vertical walls perpendicular to the door 106. The heating elements 114A and 114B can be quartz tubes (e.g., with heating filaments therein) that runs horizontally on the vertical walls and perpendicular to the door 106.

In some embodiments, a display 122A is attached to the door 106. The display 122A can be a touchscreen display. The display 122A can be attached to an exterior of the chamber 102 on an opposite side of the door 106 from the camera 118A. The display 122A can be configured to display an image or a video of the interior of the chamber captured by and/or streamed from the camera 118A. In some embodiments, the image and/or the video can be displayed (e.g., in real-time) synchronous to the capturing. In some embodiments, the image and/or the video can be displayed sometime after the capturing of the image or video.

Figure 1B:
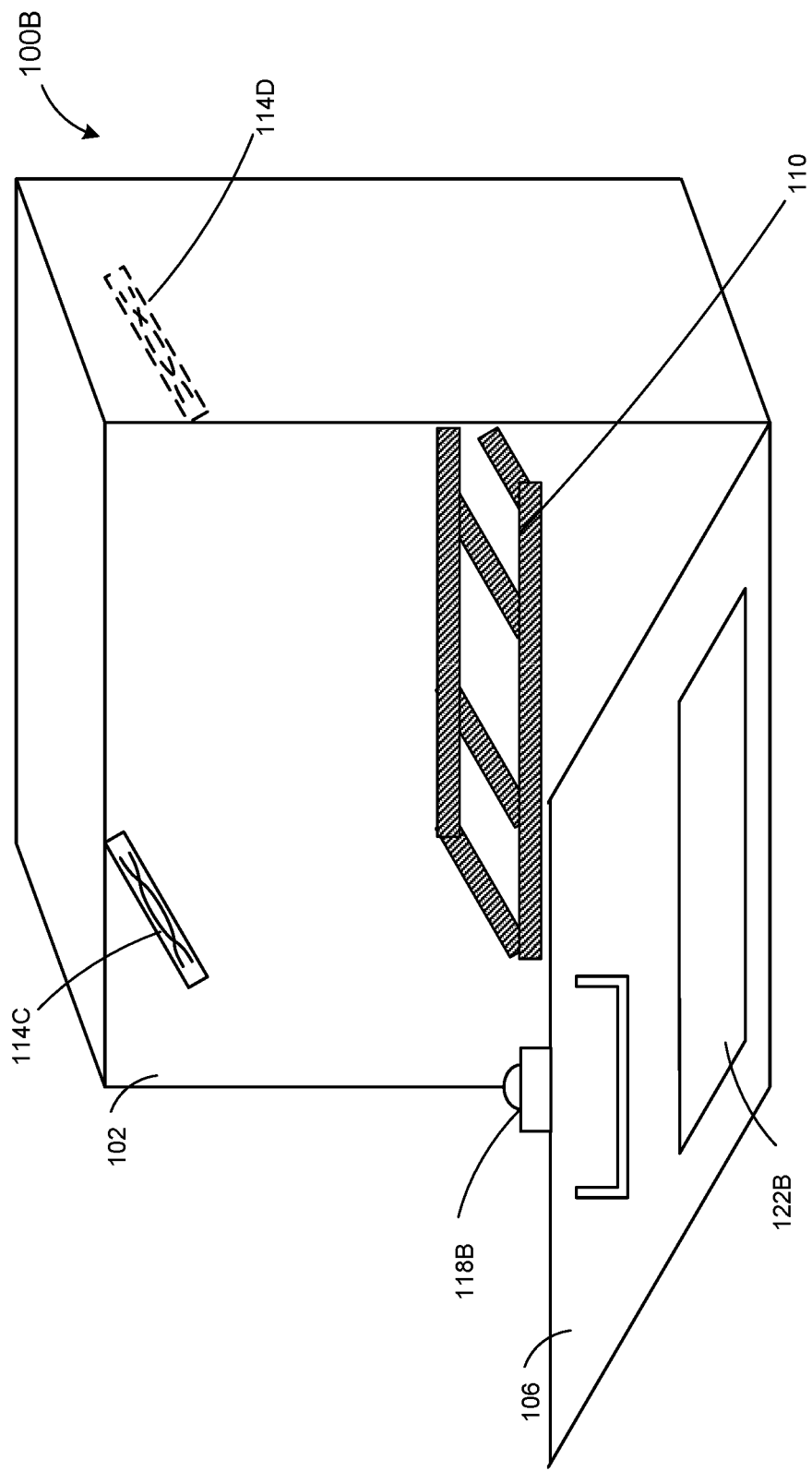
FIG. 1B is a structural diagram of a perspective view of another example of a cooking appliance, in accordance with various embodiments.

FIG. 1B is a structural diagram of a perspective view of another example of a cooking appliance 100B, in accordance with various embodiments. The cooking appliance 100B is similar to the cooking appliance 100A except for the following differences. The illustrated structural diagram shows potential variations to the components of various embodiments. In the illustrated example, the cooking appliance 100B has a display 122B on the door 106, instead of on its top surface as in the cooking appliance 100A. In the illustrated example, heating elements 114C and 114D extend parallel away from the door 106, instead of in parallel to the edges of the door 106 as in the cooking appliance 100A. In the illustrated example, the cooking appliance 100B has a camera 118B positioned on the door 106 instead on a top interior surface of the chamber 102. The camera 118B can be adapted to capture an image of content at least partially inside the chamber 102.

Figure 2:
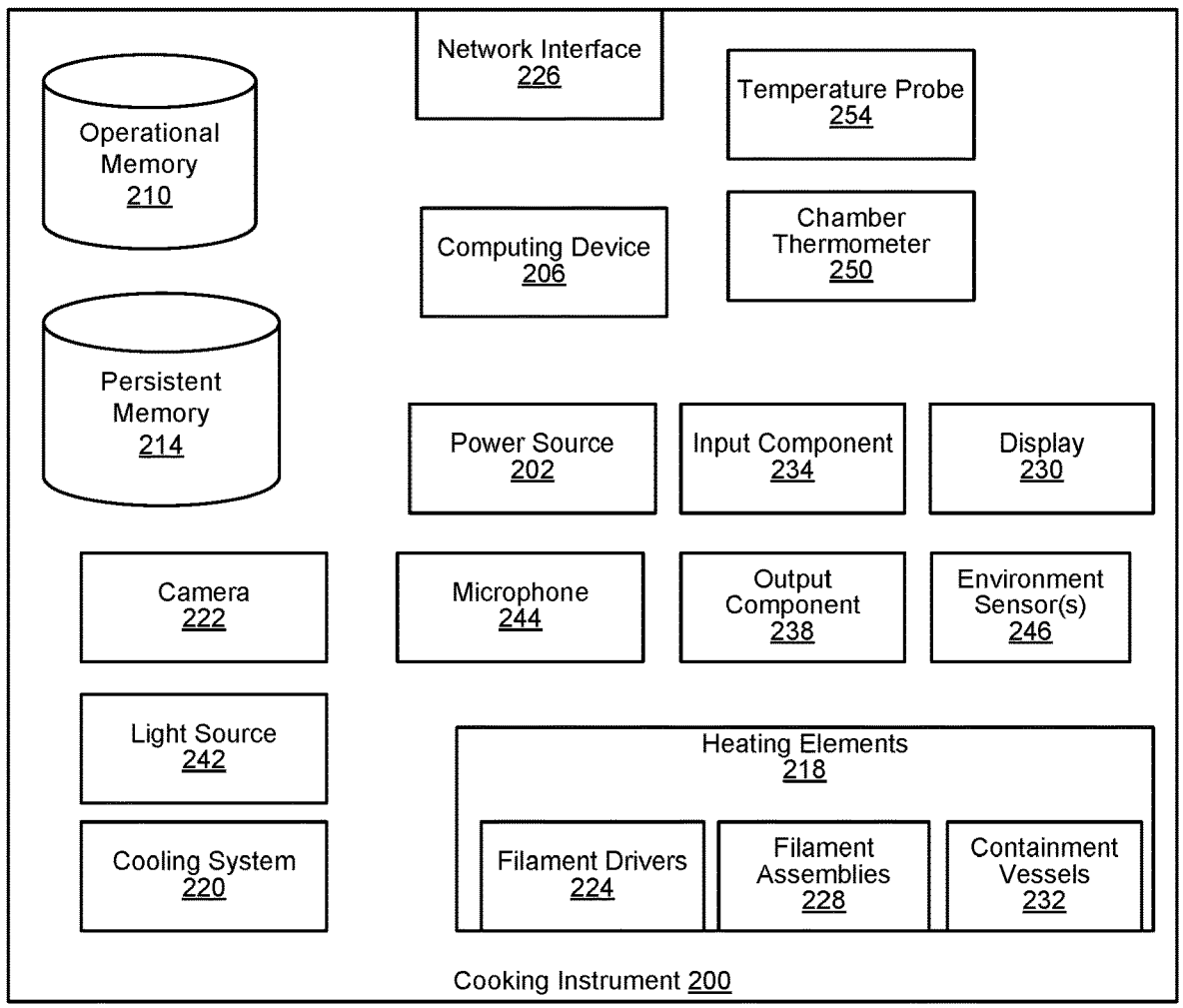
FIG. 2 is a block diagram illustrating physical components of a cooking appliance, in accordance with various embodiments.

FIG. 2 is a block diagram illustrating physical components of a cooking appliance 200 (e.g., the cooking appliance 100A and/or the cooking appliance 100B), in accordance with various embodiments. The cooking appliance 200 can include a power source 202, a computing device 206, an operational memory 210, a persistent memory 214, one or more heating elements 218 (e.g., the heating elements 114), a cooling system 220, a camera 222 (e.g., the camera 118A or the camera 118B), a network interface 226, a display 230 (e.g., the display 122A or the display 122B), an input component 234, an output component 238, a light source 242, a microphone 244, one or more environment sensors 246, a chamber thermometer 250, a temperature probe 254, or any combination thereof.

The computing device 206, for example, can be a control circuit. The control circuit can be an application-specific integrated circuit or a circuit with a general-purpose processor configured by executable instructions stored in the operational memory 210 and/or the persistent memory 214. The computing device 206 can control all or at least a subset of the physical components and/or functional components of the cooking appliance 200.

The power source 202 provides the power necessary to operate the physical components of the cooking appliance 200. For example, the power source 202 can convert alternating current (AC) power to direct current (DC) power for the physical components. In some embodiments, the power source 202 can run a first powertrain to the heating elements 218 and a second powertrain to the other components.

The computing device 206 can control output power, peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking appliance 200. For example, the persistent memory 214 can store one or more cooking recipes, which are sets of operational instructions and schedules to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable. For example, the heating elements 218 can include quartz tubes, each enclosing one or more heating filaments. In various embodiments, the side of the quartz tubes facing toward the chamber wall instead of the interior of the chamber is coated with a heat resistant coating. However, because the operating temperature of the heating filaments can be extremely high, the cooling system 220 provides convection cooling to prevent the heat resistant coating from melting or vaporizing.

The heating elements 218 can respectively include filament drivers 224, filament assemblies 228, and containment vessels 232. For example, each heating element can include a filament assembly housed by a containment vessel. The filament assembly can be driven by a filament driver. In turn, the filament driver can be controlled by the computing device 206. For example, the computing device 206 can instruct the power source 202 to provide a set amount of DC power to the filament driver. In turn, the computing device 206 can instruct the filament driver to drive the filament assembly to generate electromagnetic waves at a set output power and/or peak wavelength.

The camera 222 serves various functions in the operation of the cooking appliance 200. For example, the camera 222 and the display 230 together can provide a virtual window to the inside of the chamber despite the cooking appliance 200 being windowless. The camera 222 can serve as a food package label scanner that configures the cooking appliance 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking appliance 200 such that the camera 222 can clearly capture an image of the food substance therein. In some embodiments, the light source 242 is part of the heating elements 218.

In some embodiments, the light source 242 is a directional light source (e.g., a light emitting diode or a laser). In some embodiments, the light source 242 is configured to project light over the contents in a cooking chamber of the cooking appliance 200. The camera 222 can be configured to capture one or more images while the light source 242 is projecting the light. The computing device 206 can be configured to develop a three-dimensional model of the contents in the cooking chamber based on the one or more images.

In some embodiments, the camera 222 is a dual camera system having a first sub-camera and a second sub-camera. The dual camera system can be configured to capture pairs of images simultaneously. The computing device 206 can be configured to analyze a pair of output images from the dual camera system to determine depth information associated with content in a cooking chamber of the cooking appliance 200.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical buttons. In some embodiments, the output component 238 is the display 230. In some embodiments, the output component 238 is a speaker or one or more external lights.

In some embodiments, the cooking appliance 200 includes the microphone 244, and/or the one or more environment sensors 246. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heat adjustment algorithm.

In some embodiments, the cooking appliance 200 includes the chamber thermometer 250, and/or the temperature probe 254. For example, the computing device 206 can utilize the temperature readings from the chamber thermometer 250 as dynamic feedback to adjust the controls of the heating elements 218 in real-time according to a heat adjustment algorithm. The temperature probe 254 can be adapted to be inserted into edible substance to be cooked by the cooking appliance 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the edible substance should be heated at a preset temperature for a preset amount time according to the cooking recipe.

Figure 3:
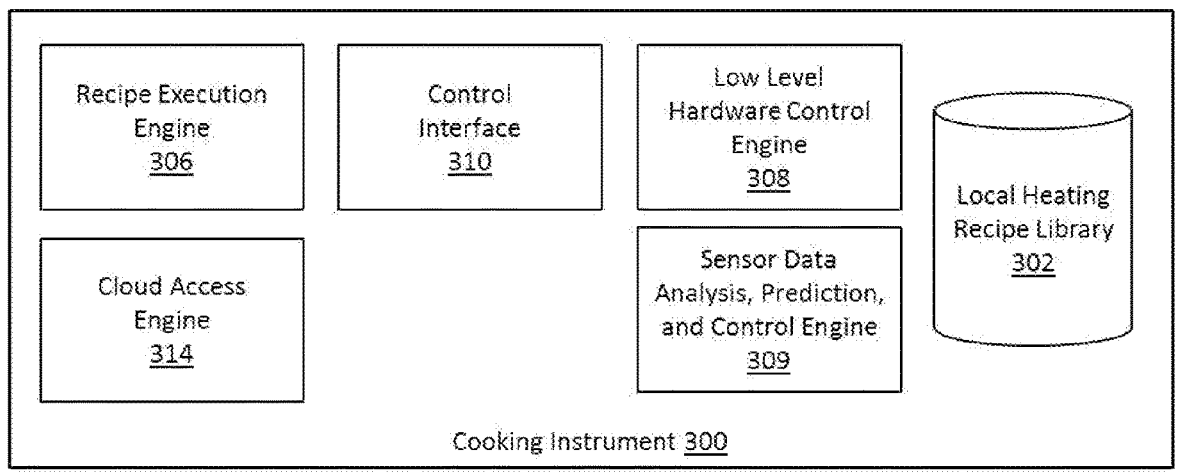
FIG. 3 is a block diagram illustrating functional components of a cooking appliance, in accordance with various embodiments.

FIG. 3 is a block diagram illustrating functional components of a cooking appliance 300 (e.g., the cooking appliance 100A, the cooking appliance 100B and/or the cooking appliance 200), in accordance with various embodiments. For example, the functional components can run on the computing device 206 or one or more specialized circuits. For example, the cooking appliance 300 can implement at least a cooking recipe library 302, a recipe execution engine 306, a low level hardware control engine 308, a sensor data analysis, prediction and control engine 309, a control interface 310, a cloud access engine 314, or any combination thereof.

In some embodiments, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking appliance 300. The recipe execution engine 306 can configure an interactive user interface (e.g., the control interface 310) to query the user to specify content being placed in the chamber when the door is open. In some embodiments, responsive to detecting that the door is open during execution of a heating recipe, the recipe execution engine 306 can stop or pause the execution of the heating recipe for safety.

In some embodiments, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In some embodiments, the control interface 310 is configured to send a message to a user device to confirm the automatically selected cooking recipe. In some embodiments, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating configuration schedule by controlling the heating elements according to the cooking recipe and a heat adjustment algorithm specified therein. The heat adjustment algorithm is capable of dynamically controlling the heating elements 218 (e.g., adjusting output power, spectral power distribution, and/or peak wavelength) in real-time in response to changing input variables.

The control interface 310 can be used to interact with a user, via a user interface of the cooking appliance 300, a remote user interface on a user device, or other means. For example, a user device (e.g., a computer or a mobile device) can connect to the control interface 310 via the network interface 226. Via this connection, the user can configure the cooking appliance 300 in real-time. In another example, the control interface 310 can generate an interactive user interface on a display device and/or a touchscreen device of the cooking appliance 300. In one example, the user can select a cooking recipe via a user-device-side application. The user-device-side application can communicate the control interface 310 to cause the cooking appliance 300 to execute the selected cooking recipe. The cloud access engine 314 can enable the cooking appliance 300 to access a cloud service to facilitate execution of a cooking recipe or update the cooking recipes in the cooking recipe library 302.

Components (e.g., physical or functional) associated with the cooking appliance can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
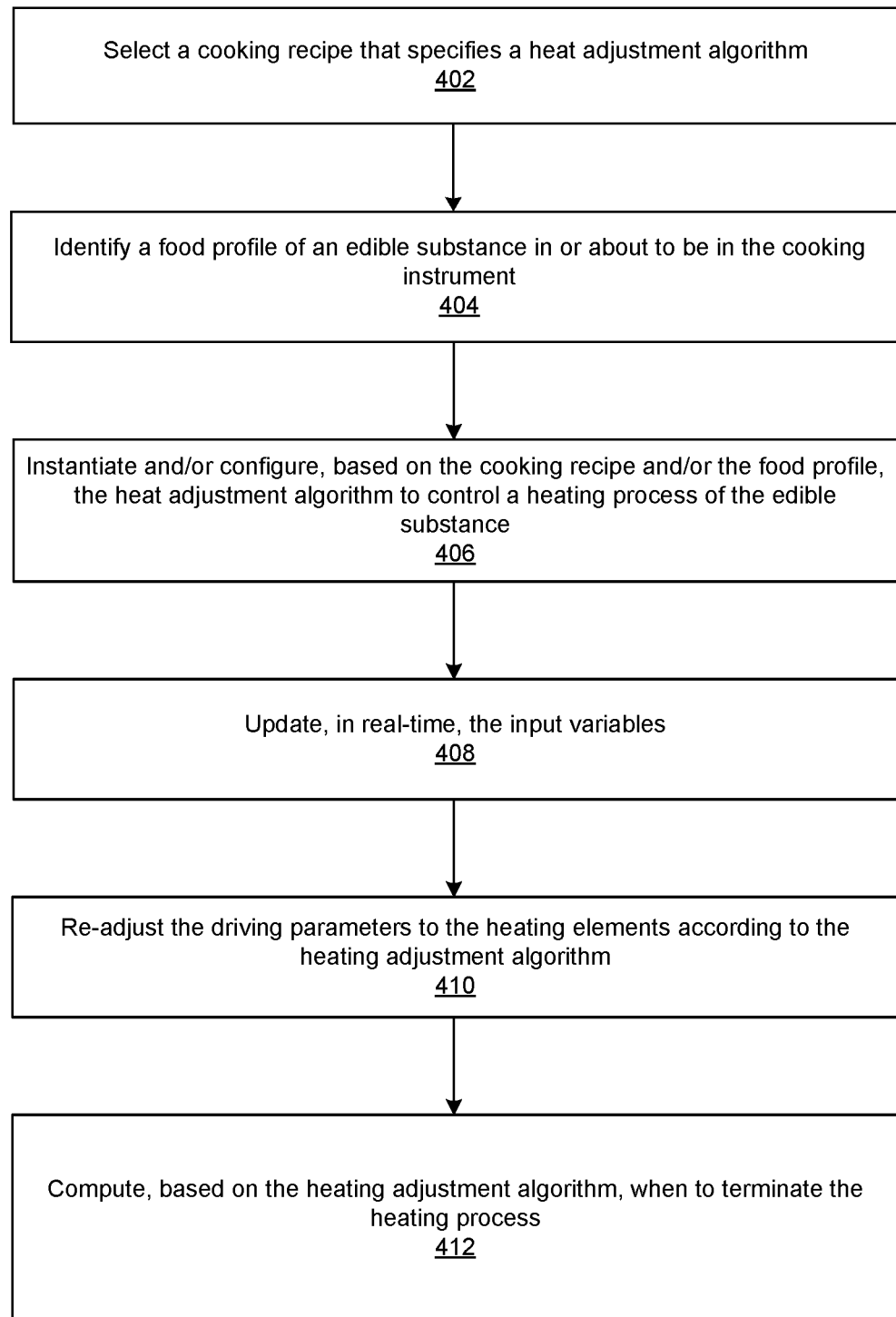
FIG. 4 is a flowchart illustrating a method of operating a cooking appliance to cook an edible substance, in accordance with various embodiments.

FIG. 4 is a flowchart illustrating a method 400 of operating the cooking appliance (e.g., the cooking appliance 100A, the cooking appliance 100B, the cooking appliance 200, and/or the cooking appliance 300) to cook an edible substance, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking appliance, a heating library implemented by a cloud service accessible through a network interface (e.g., the network interface 226), or another external source connected to the computing device). Optionally, at step 404, the computing device can identify a food profile of an edible substance in or about to be in the cooking appliance. For example, the computing device can utilize a camera to identify the food profile (e.g., performing image recognition of the edible substance or scanning a digital label attached to an outer package of the edible substance). In some embodiments, the user may input the food profile through the user interface. The food profile can identify properties of the food which may include the size of the edible substance, the weight of the edible substance, the shape of the edible substance, the current temperature of the edible substance, other food properties and/or any combination thereof.

At step 406, the computing device can instantiate and/or configure, based on the cooking recipe and/or the food profile, a heat adjustment algorithm to control a heating process of the edible substance. The heat adjustment algorithm specifies how to adjust the driving parameters of one or more heating elements in the cooking appliance based on input variables that may change over time. Input variables can include time lapsed (e.g., from when the heating elements are first driven and/or when the heating process first begins), temperature within the cooking appliance, user input via an external device connected to the computing device or a control panel of the cooking appliance, temperature within the edible substance (e.g., as reported by a temperature probe inserted into the edible substance), real-time image analysis of the edible substance, real-time environment sensor outputs analysis, other sensed, calculated or received data and/or any combination thereof. At step 408, the computing device can update, in real-time, the input variables and, at step 410, re-adjust the driving parameters to the heating elements according to the heating adjustment algorithm.

Part of the adjustment made by the heat adjustment algorithm can include heat intensity, peak wavelength (e.g., for targeting different edible substance or material within the cooking chamber), heat duration, topical heat location (e.g., zones), or any combination thereof. In various embodiments, the heat intensity of a heating element corresponds to power supplied by the heating element, and heat duration corresponds to a duration of emitting at a given target power and/or peak wavelength. The computing device can configured the heating elements to apply different heating patterns to different zones on a tray in the cooking appliance. The different zones can be portions of the tray or regions of edible substance resting on the tray. The computing device can configure the heating elements to apply, simultaneously or sequentially, different heating patterns (e.g., heating levels) to different zones (e.g., areas above the tray) on the support tray by supplying different amount of power to different heating elements. The computing device can configure the heating elements to apply different heating patterns to different zones on the support tray by driving the heating elements of the heating system at varying output power and/or peak wavelengths. The cooking appliance can include a perforated metallic sheet between the tray and at least one of the heating elements. The computing device can configure the heating elements to apply different heating patterns to different zones on the support tray by using the perforated metallic sheet to spatially block portions of waves emitted by the at least one of the heating elements.

At step 412, the computing device can compute, based on the heating adjustment algorithm, when to terminate the heating process (e.g., when the cooking appliance stops supplying power to the heating elements). In some embodiments, the heating adjustment algorithm takes into account whether the edible substance is expected to be extracted out of the cooking appliance substantially immediately after the termination of the heating process (e.g., a high-speed mode). For example, the heating adjustment algorithm can shorten the expected termination time if the user indicates that the edible substance will remain in the cooking appliance a preset duration after the termination of the heating process (e.g., a low stress mode).

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 5A:
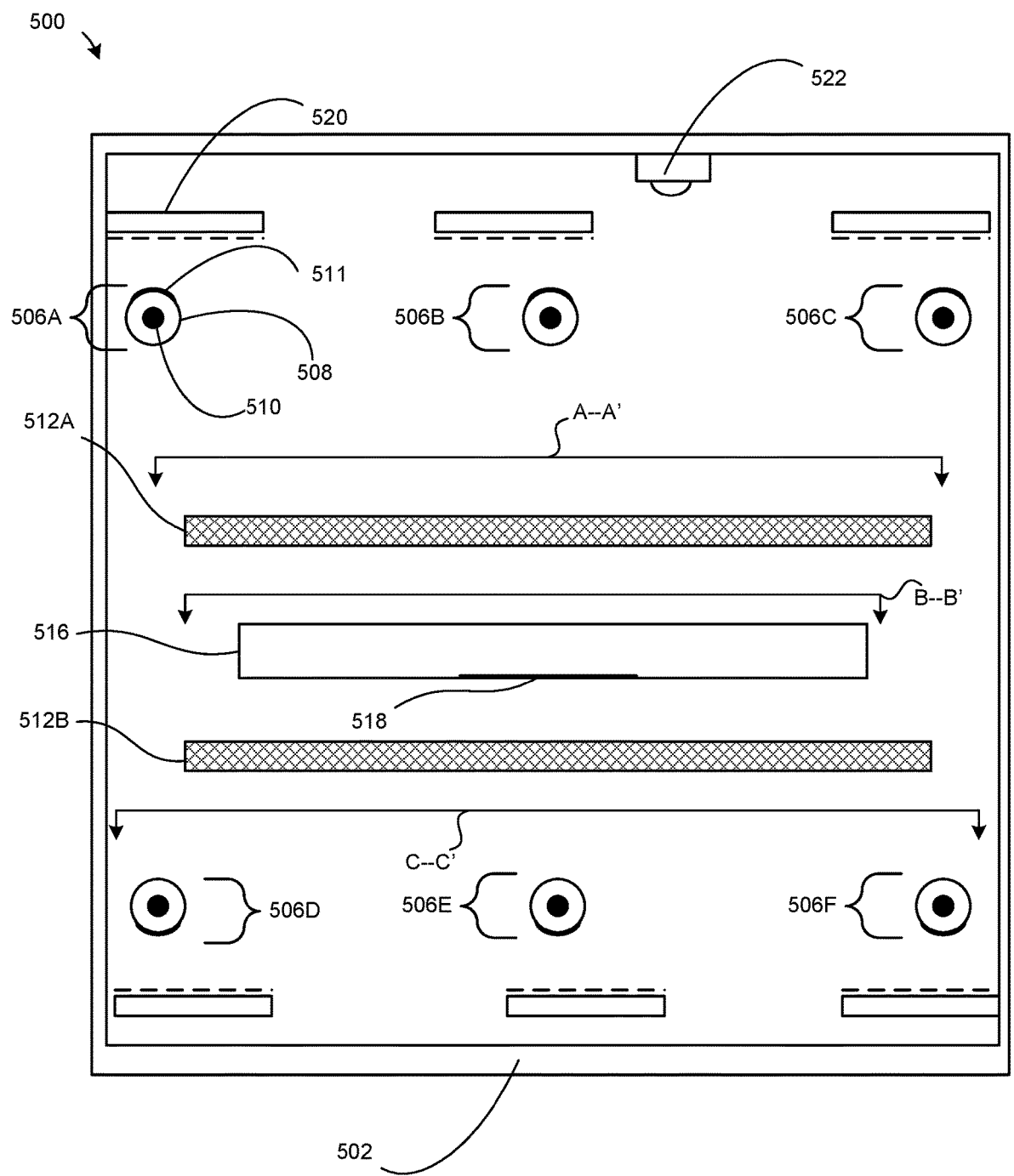
FIG. 5A is a cross-sectional front view of a first example of a cooking appliance, in accordance with various embodiments.

FIG. 5A is a cross-sectional front view of a first example of a cooking appliance 500 (e.g., the cooking appliance 100A, the cooking appliance 100B, the cooking appliance 200, and/or the cooking appliance 300), in accordance with various embodiments. The cooking appliance 500 includes a chamber 502 and one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can be part of the heating elements of the cooking appliance 500. Each of the filament assemblies 506 can include a containment vessel 508 surrounding a filament 510. The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of the each heating element that faces away from a tray 516.

A computing device (e.g., the computing device 206) can be configured to control the peak emission wavelengths of the filament assemblies 506. For example, the computing device can be configured to identify a food profile associated with an edible substance (e.g., in the chamber 502) based on sensor input (e.g., camera scanning a label) or the user input. The computing device can then determine one or more excitable wavelengths associated with the food profile. The computing device can drive the filament assemblies 506 to emit at a peak emission wavelength corresponding to at least one of the excitable wavelengths to heat the edible substance.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the tray 516 or below the tray 516). In some embodiments, there are two perforated metal sheets (as shown). Each of the perforated metal sheets 512 can be a removable or fixated panel. The perforated metal sheets 512 can enable control of heating concentration along a horizontal plane parallel its surface. Perforated metal sheets, such as a perforated aluminum foil, can be used to shield certain food items from the intense radiant heat generated by the heating elements. For example, when cooking a steak and vegetables side-by-side, the perforated metal sheets can shield the vegetables from being overcooked and enable the steak to receive the full power from the heating elements. Longer wavelength emission from the filament assemblies 506 can penetrate perforations more equally compared to shorter wavelength. Hence even if the perforations were designed to shield, for example, 90% of direct radiant heat, the cooking appliance can still independently tune the heating by varying the wavelength. This enables some control of side-by-side cooking in addition to direct radiant heating.

In some embodiments, the chamber 502 includes the tray 516 (e.g., the cooking platform 110) in the chamber 502. In some embodiments, the tray 516 includes or is part of at least one of the one or more perforated metal sheets 512. The computing device can be configured to drive the heating elements to emit at a peak emission wavelength corresponding to excitable wavelength for the tray 516. By tuning the peak emission wavelength to the excitable wavelength of the tray 516, the computing device can heat up the tray 516 without directly heating the air or the edible substance inside the chamber 502.

The tray 516 can be made of glass. The tray 516 can include an optically transparent region enabling visible light to substantially travel through two opposing surfaces of the tray 516. For example, a user of the cooking appliance 500 can place an instruction sheet beneath the tray 516 while arranging edible substance on the tray 516 to be cooked. The user can directly overlay specific edible substance at the desired location according to the instruction sheet. The tray 516 can include a reflective portion 518 to enable a camera 522 to capture a bottom view of edible substance resting on the tray 516.

The cooking appliance 500 can include an airflow-based cooling system 520. The airflow-based cooling system 520 can blow directly onto a reflector portion of the containment vessel 508 to cool (e.g., prevent vaporization of the reflective coating) and improve performance of the reflector 511. The airflow can be controlled to provide impingement convection heating. The airflow-based cooling system 520 can have an air path that filters steam and thus prevents hot air from escaping when the door of the cooking appliance 500 is opened. The air path can also be configured to go over a camera (not shown) of the cooking appliance 500 to keep the lens of the camera condensation free.

In some embodiments, a fan can be installed away from the filament assemblies 506. When the peak wavelength of a filament assembly is configured to heat the envelope and/or the containment vessel 508, the fan can stir the air within the chamber 502 to ensure that heated air adjacent to the containment vessel 508 is moved to other parts of the chamber 502 to cook the edible substance.

In some embodiments, the cooking appliance 500 lacks a crumb tray. For example, the cooking appliance 500 can use quartz or other heat resistant sheet to cover the heating elements so that the bottom of the cooking appliance chamber has no heating elements to trip over. The heat resistant sheet can be transparent at the operating wavelengths of the filament assemblies 506 to enable for the emission from the heating elements to penetrate through without much loss.

In some embodiments, the computing device within the cooking appliance 500 can drive the filament assemblies 506 according to instructions in a cooking recipe. For example, the computing device can drive at least one of the filament assemblies 506 at a specific output power and/or peak wavelength. The specific peak wavelength can correspond to excitable wavelengths of the materials in the support tray, the containment vessel 508 (e.g., envelope of the filament assembly), a specific type of edible material, water molecules, or any combination thereof. By matching the specific peak wavelength, the computing device can target specific material for heating. For example, the computing device can drive at least one of the heating elements at a peak wavelength (e.g., 3 µm or above for glass trays) such that the support tray is substantially opaque to waves emitted from the at least one of the heating elements. The computing device can drive at least one of the heating elements at a peak wavelength (e.g., 3 µm or less for glass trays) such that the support tray is substantially transparent to waves emitted from the at least one of the heating elements. The computing device can drive at least one of the heating elements at a peak wavelength (e.g., between 3 µm and 4 µm for glass trays) such that the support tray is heated by waves emitted from the at least one of the heating elements without heating any organic edible substance in the cooking chamber.

Figure 5B:
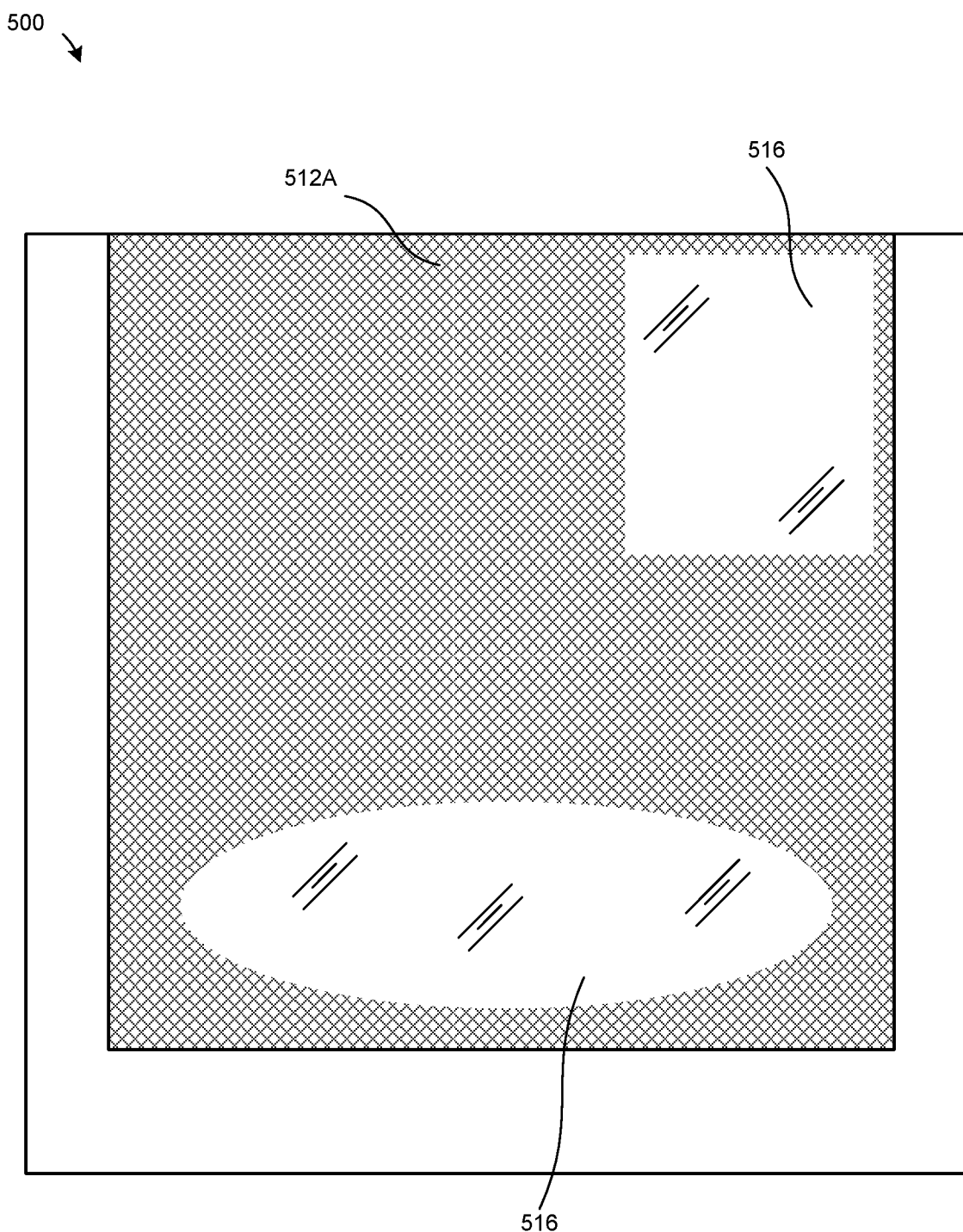
FIG. 5B is a cross-sectional top view of the cooking appliance of FIG. 5A along lines A-A', in accordance with various embodiments.
Figure 5C:
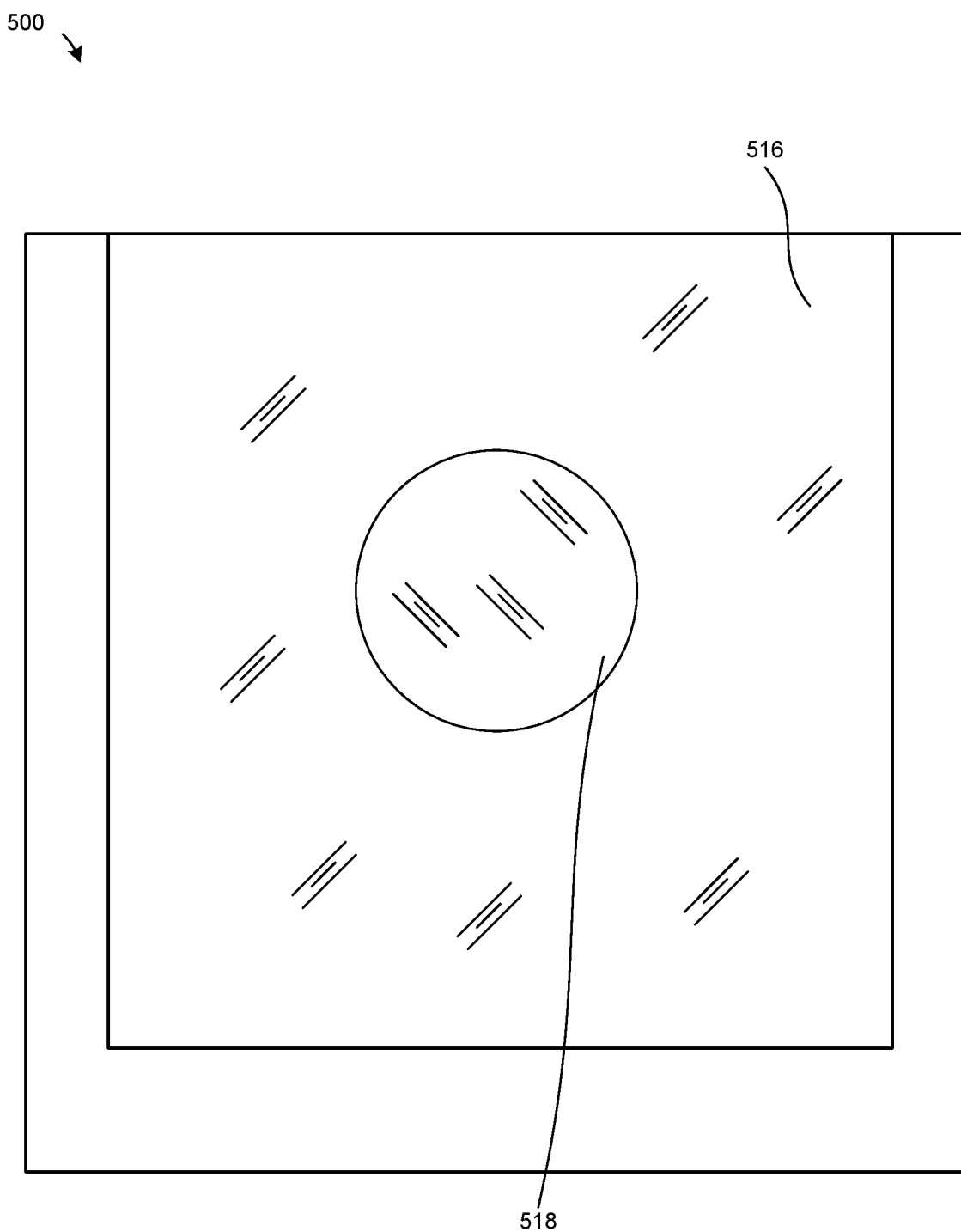
FIG. 5C is a cross-sectional top view of the cooking appliance of FIG. 5A along lines B-B', in accordance with various embodiments.
Figure 5D:
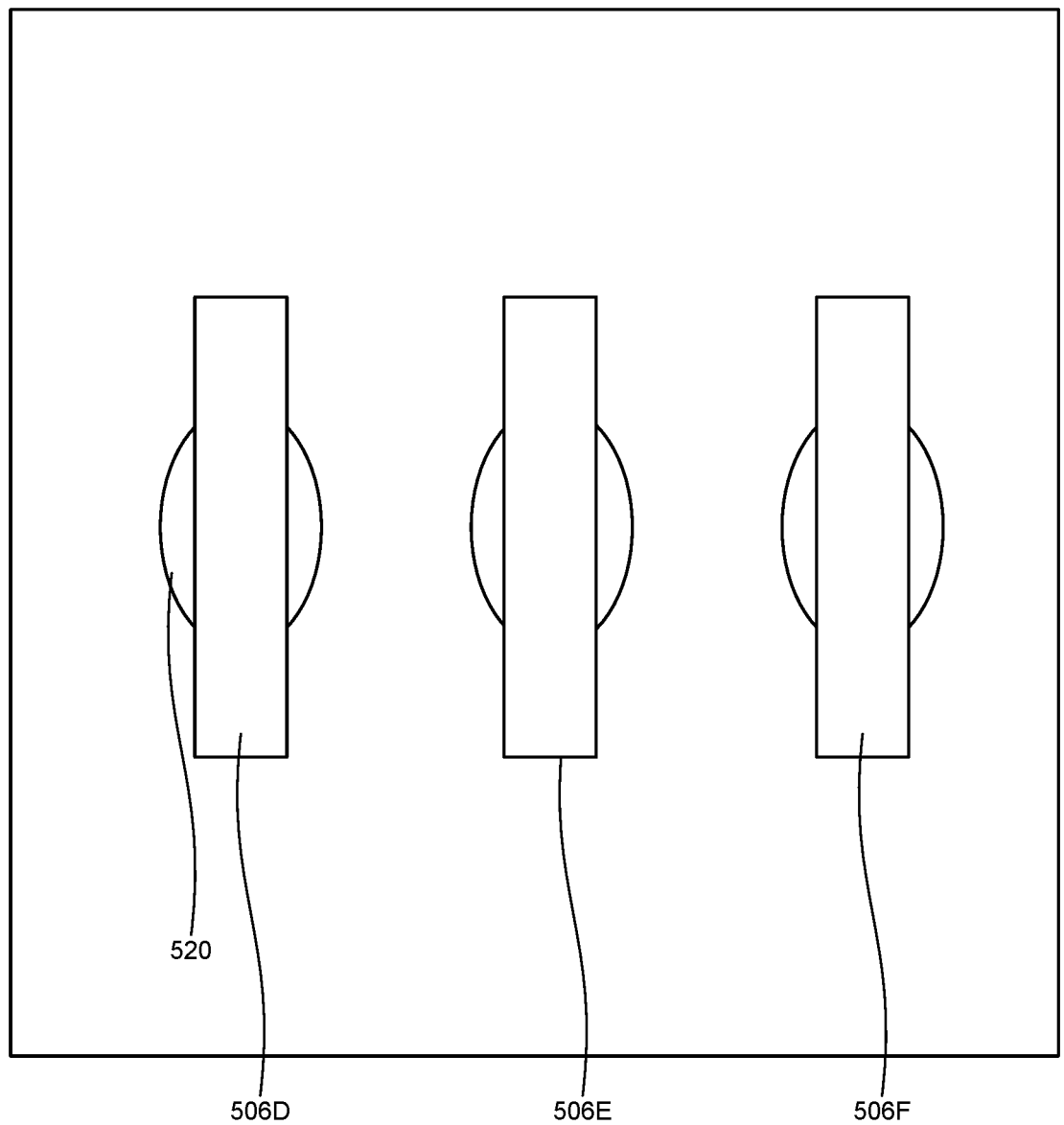
FIG. 5D is a cross-sectional top view of the cooking appliance of FIG. 5A along lines C-C', in accordance with various embodiments.

FIG. 5B is a cross-sectional top view of the cooking appliance 500 of FIG. 5A along lines A-A', in accordance with various embodiments. FIG. 5B can illustrate the perforated metal sheet 512A and cavities within the perforated metal sheet 512A that exposes the tray 516. FIG. 5C is a cross-sectional top view of the cooking appliance 500 of FIG. 5A along lines B-B', in accordance with various embodiments. FIG. 5C can illustrate the tray 516. In some embodiments, the reflective portion 518 is visible through the tray 516. FIG. 5D is a cross-sectional top view of the cooking appliance 500 of FIG. 5A along lines C-C', in accordance with various embodiments. FIG. 5D can illustrate the filament assemblies 506. In some embodiments, fans of the airflow-based cooling system 520 are under the filament assemblies 506.

Figure 6:
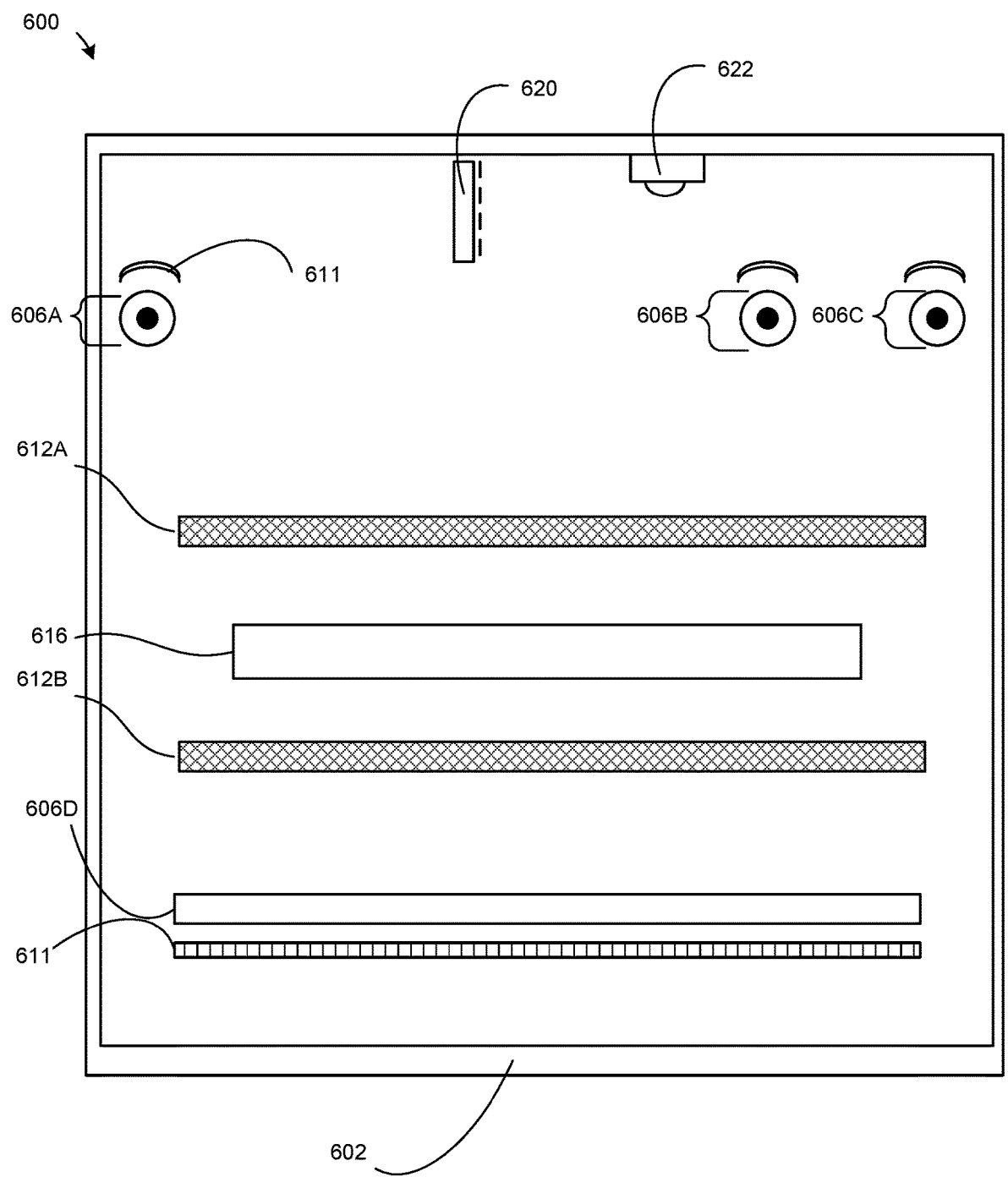
FIG. 6 is a cross-sectional front view of a second example of a cooking appliance, in accordance with various embodiments.

FIG. 6 is a cross-sectional front view of a second example of a cooking appliance 600, in accordance with various embodiments. This second example can illustrate various features in various embodiments of the disclosed cooking appliance. A particular feature, structure, or characteristic described in connection with the second example can be included in the first example. All of the described examples have features that are not mutually exclusive from other examples.

For example, the cooking appliance 600 includes heating elements, and therefore filament assemblies (e.g., a filament assembly 606A, a filament assembly 606B, a filament assembly 606C, and a filament assembly 606D, collectively as the "filament assemblies 606"). The filament assemblies 606 can differ from the filament assemblies 506 in that an upper set (e.g., the filament assemblies 606A, 606B, and 606B) extends longitudally at a substantially perpendicular angle from a lower set (e.g., the filament assembly 606D and other filament assemblies not shown). Further unlike the filament assemblies 506, the filament assemblies 606 are not uniformly spaced apart from each other.

A reflector 611 can be positioned to be spaced apart from each of the filament assemblies 606. The reflector 611 can be a standalone structure unlike the coating of the reflector 511. The reflector 611 can be spaced within a distance from a filament assembly (e.g., therefore a heating element) to have anti-fouling characteristics and to vaporize any edible substance debris. The cooking appliance 600 can include a fan 620. Unlike the airflow-based cooling system 520, the fan 620 is not specifically directed to any of the filament assemblies 606.

A chamber 602 is substantially similar to the chamber 502. Perforated metal sheets 612A and 612B are substantially similar to the perforated metal sheets 512. A tray 616 is substantially similar to the tray 516, but does not include a reflective portion. The camera 622 is substantially similar to the camera 522.

Figure 7:
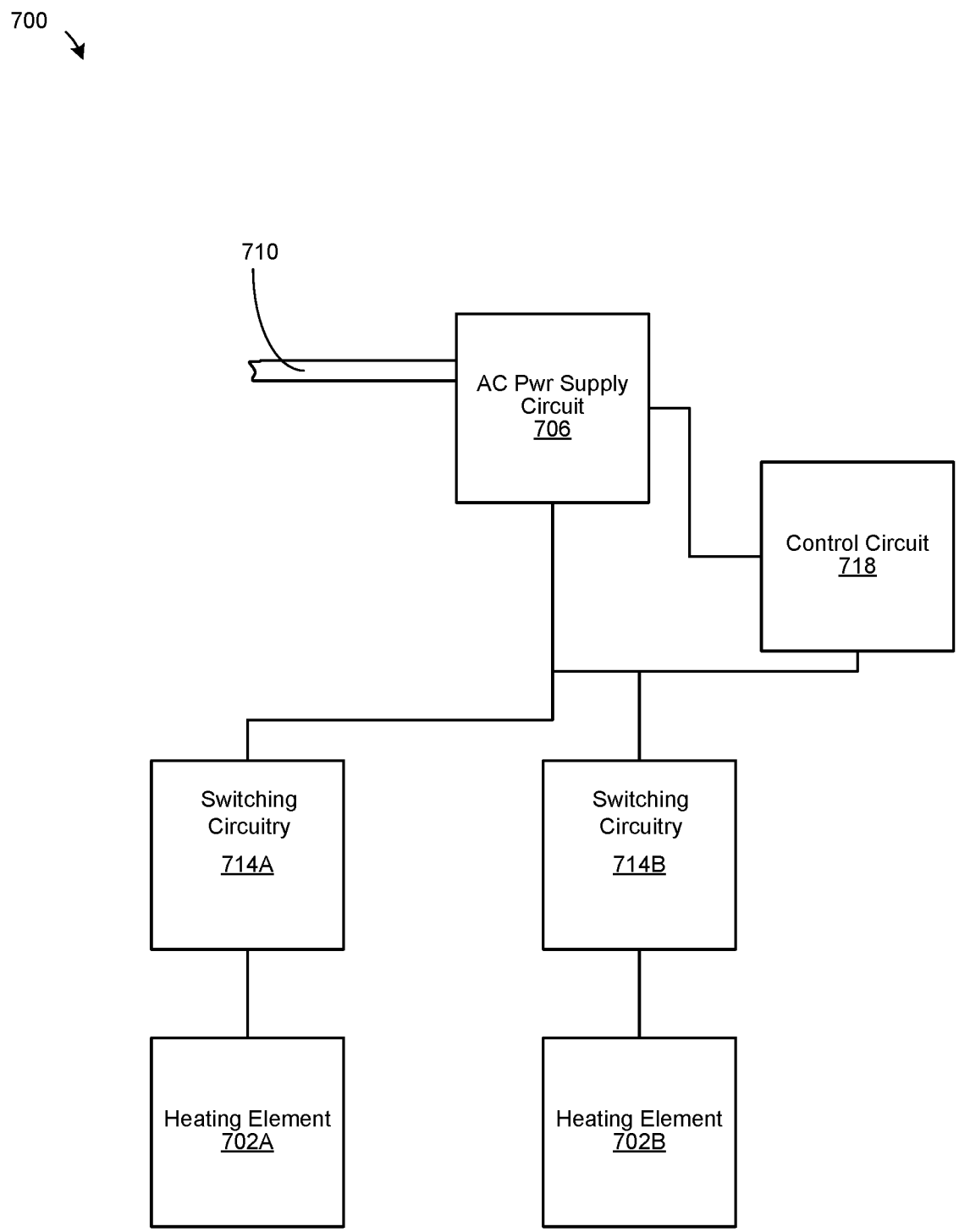
FIG. 7 is a circuit diagram of a heating system of a cooking appliance, in accordance with various embodiments.

FIG. 7 is a circuit diagram of a heating system 700 of a cooking appliance (e.g., the cooking appliance 100A, the cooking appliance 100B, the cooking appliance 200, and/or the cooking appliance 300), in accordance with various embodiments. The heating system 700 can include a plurality of heating elements (e.g., a heating element 702A, a heating element 702B, etc., collectively the "heating elements 702") configured to generate electromagnetic waves. Each heating element is configurable to operate over a range of output power and/or peak wavelengths.

An alternating current (AC) power supply circuit 706 is configured to convert AC power from an AC power line 710 to direct current (DC) power. The AC power line 710 provides up to a maximum power threshold before triggering a circuit breaker. The AC power supply circuit 706 can include a power factor correction (PFC) circuit. The AC power supply circuit 706 can divide an AC power cycle from the AC power line into two half waves.

A plurality of switching circuits (e.g., switching circuitry 714A, a switching circuitry 714B, etc., collectively as the "switching circuitry 714") can respectively correspond to the plurality of heating elements 702. The switching circuitry 714 can be TRIAC switches. The DC power from the AC power supply circuit 706 is routed to a heating element when a corresponding switching circuitry is switched on. A control circuit 718 is configured to switch on a subset of the plurality of switching circuitry 714 such that a total power drawn through the switching circuitry is equal to or below the maximum power threshold. The control circuit 718 can be configured to switch on a single switching circuit at a time to concentrate the DC power provided via the AC power supply at the maximum power threshold to a single heating element. The control circuit 718 can include a processor (e.g., the computing device 206). The switching circuitry 714 can be configured by the control circuit 718 to provide one half wave to a first heating element and another half wave to a second heating element.

Figure 8:
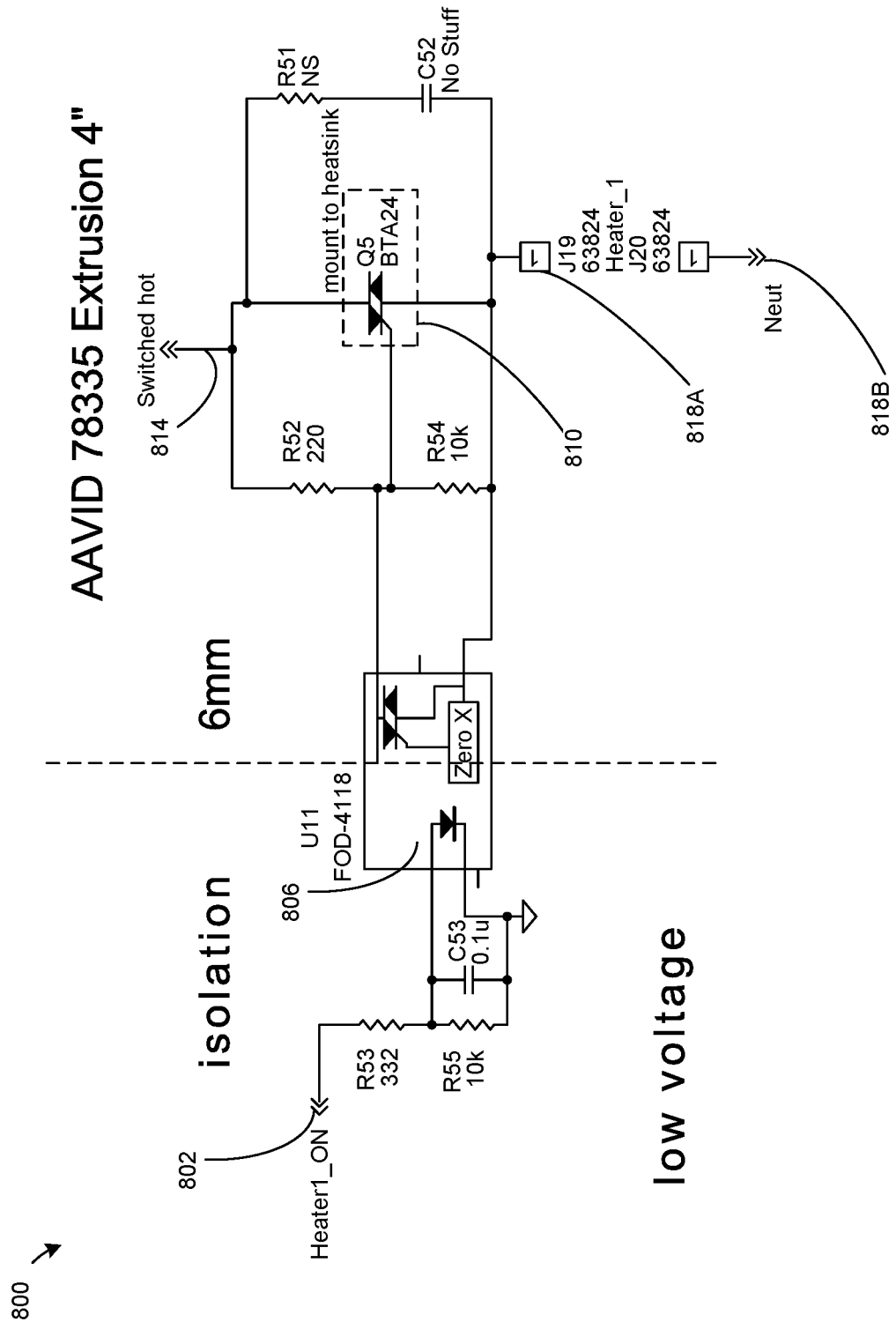
FIG. 8 is a circuit diagram of a driver circuit for a heating element in a cooking appliance, in accordance with various embodiments.

FIG. 8 is a circuit diagram of a driver circuit 800 for a heating element in a cooking appliance (e.g., the cooking appliance 100A, the cooking appliance 100B, the cooking appliance 200, and/or the cooking appliance 300), in accordance with various embodiments. In various embodiments, the cooking appliance can have as many instances of the driver circuit 800 as the number of heating elements it has. The driver circuit 800 can receive a control signal 802 from a control circuit, a processor, and/or a computing device of the cooking appliance. The control signal 802 is provided to a triode for alternating current (TRIAC) driver 806. The TRIAC driver 806 can be an optocoupler with a zero crossing TRIAC driver. The TRIAC driver 806 can control the dimming ratio provided by a TRIAC 810. The TRIAC 810 can draw its power from an alternating current (AC) source 814. The AC source 814 can be 120 Hz AC power. The control circuit/processor/computing device of the cooking appliance can switch the AC source 814 off from the driver circuit 800 prior to the driver circuit 800 drawing too much power. The direct output of the TRIAC 810 is provided as a positive terminal 818A of a heating element corresponding to the driver circuit 800. A negative terminal 818B of the heating element can be connected to an electrical neutral potential.

FIG. 9 is a flowchart illustrating a method 900 of operating the cooking appliance (e.g., the cooking appliance 100A, the cooking appliance 100B, the cooking appliance 200, and/or the cooking appliance 300) to cook a food substance utilizing optical feedback, in accordance with various embodiments. The method 900 can be controlled by a computing device (e.g., the computing device 206).

At step 901, the computing device captures one or more images in advance of the cook and determines properties of the food, such as the height and placement on the cooking tray, through image analysis. The images may also be analyzed to detect potential errors in the meal preparation, such as placing the food on the wrong location of the tray. In step 902, the computing device may (e.g., as necessary to correct user mistakes) interact with the user to correct detected errors, if any, and adjust the recipe flow as appropriate.

At step 903, the computing device can select a heating recipe from its local heating recipe library or from a heating library implemented by a cloud service accessible through a network interface (e.g., the network interface 226). At step 904, a camera (e.g., the camera 118A or the camera 118B) inside the cooking appliance can stream images of the food substance to the computing device. For example, the camera can be pointed toward a cooking platform (e.g., the cooking platform 110) of the cooking appliance.

At step 906, when the computing device receives an image, the computing device can analyze the image, utilizing computer vision techniques, to determine a state of the food substance, the cooking chamber, or the cooking platform. In some embodiments, the computing device can segment the image into portions corresponding to the food substance, portions corresponding to the cooking platform, and/or portions corresponding to the cooking chamber. According to the segmentation of the image, the computing device can determine separate states for the food substance, the cooking platform, and/or the cooking chamber. The state can be a known state (e.g., matching a set of potential states specific to the heating recipe or global to cooking operations of the cooking appliance in general) or an unknown state.

In one example, the heating recipe is for cooking a steak. The set of potential states specific to the steak cooking recipe can include states corresponding to different searing levels. In another example, the heating recipe is for making popcorn. The set of potential states specific to the popcorn making recipe can include states corresponding to a yet-to-pop state, a popping state, and an all popped state. In yet another example, the heating recipe is for boiling an egg. The set of potential states specific to the egg boiling recipe can include a water boiling state and a water not boiling state. Global states can include a smoke alarm state (e.g., when there is smoke inside the cooking chamber) or a fire alarm state (e.g., when there is fire inside the cooking chamber or the food substances on fire). An unknown state is an image that deviates from all known states, such that it is so unusual that the computing device would either stop the operation of the cooking appliance or at least alert the user.

At step 908, the computing device can re-configure the heating elements or other physical components of the cooking appliance in response to a state change of the food substance, the cooking chamber, and/or the cooking platform. For example, the reconfiguration can include turning off the heating elements, changing the peak emission frequency of one or more of the heating elements, changing the output power of one or more of the heating elements, controlling the cooling system (e.g., the cooling system 220), sending a natural language or media message via the network interface (e.g., network interface 226), displaying a message on the display (e.g., the display 122A or the display 122B), or any combination thereof.

At step 910, the computing device can store the state change history of the food substance, the cooking chamber, and/or the cooking platform in local memory (e.g., the persistent memory 214). In some embodiments, at step 912, the computing device can generate a media file (e.g., a visualization image or video) illustrating the progress of the heating recipe according to the state change history.

Optical Feedback System

The cooking appliance can implement an optical cooking control. The cooking appliance can use the camera to determine several critically important parameters prior to or while cooking food matter, which includes, but not limited to: food geometry and thickness, surface texture changes, level of browning or searing, presence of burn, food shrinkage, expansion or distortion, seepage of liquids, presence of smoke, presence of steam, liquid boiling, or any combination thereof.

Optical feedback control is exceptionally useful for cooking methods where the cooking process follows an exponential or non-linear trajectory. For example, in browning foods, the darker the food, the more heat the food will absorb. This is particularly evident in toasting where 2 minutes usually produces a beautiful brown, but 2 minutes 30 seconds would burn the toast. Optical feedback would enable the toast to be browned perfectly every time.

Additionally, for sequential cooking sessions where the cooking device has already been preheated by the previous cooking session, optical control of browning is even more important because it is difficult to programmatically calculate how much heating the already-warm cooking device body will impart to the food matter.

Besides optical feedback control, the 3D geometry of the food matter can also be determined by the camera. It can be obtained by adding an additional camera where stereoscopic vision can be used to determine the 3D geometry or by adding another structured light source such that a predetermined light pattern is projected onto the food matter so that the 3D structure of the food matter can be deduced by the distortion of the light pattern.

It is also possible to determine food geometry by using only a single camera because the cooking device cavity is well controlled. However, for food with very little contrast or visible edges, determining the precise 3D structure using a single camera can be more challenging. In these cases, different lighting sources, different camera filters and sensors can be simultaneously used to improve the three-dimensional resolution. The 3D geometry is useful in several ways: the cooking sequence can be optimized based on the thickness of the food matter in question. The 3D geometry can also help in generating a preview of the result of a browning or searing session.

In several embodiments, the computing device can implement various mechanisms to facilitate programming process of developers who intend to build virtual heating recipes for the cooking appliance, where the virtual heating recipes include use of optical feedback control. The optical properties of the food can be determined by a camera library, which then translates the state of the food into easily applicable application programming interfaces (APIs). In one example, the control of searing or browning can be programmatically divided into 10 segments: zero being not browned at all, and 10 being black. The camera can use the initial shade of the food to calibrate this browning scale to be the value zero. Based on the type of food, browning level of 10 can be computed. While the food is being cooked, the camera can compare the initial browning level with the current browning level to compute the current browning level presented in the API.

Additionally, in cooking processes where there are non-linear changes, the optical feedback library can further use that nonlinear change to calibrate its browning scale. For example, in foods where a crust can form from baking, formation of the crust can be calibrated to a level 7, for example.

In another example, presence of steam emanating from the food or presence of bubbles indicates that the surface temperature of the food has reached 100° C. This information combined with cooking equipment temperature, other optical information mentioned above and timing can be used to model the interior temperature for the food and/or the state of the cooking process.

Figure 10A:
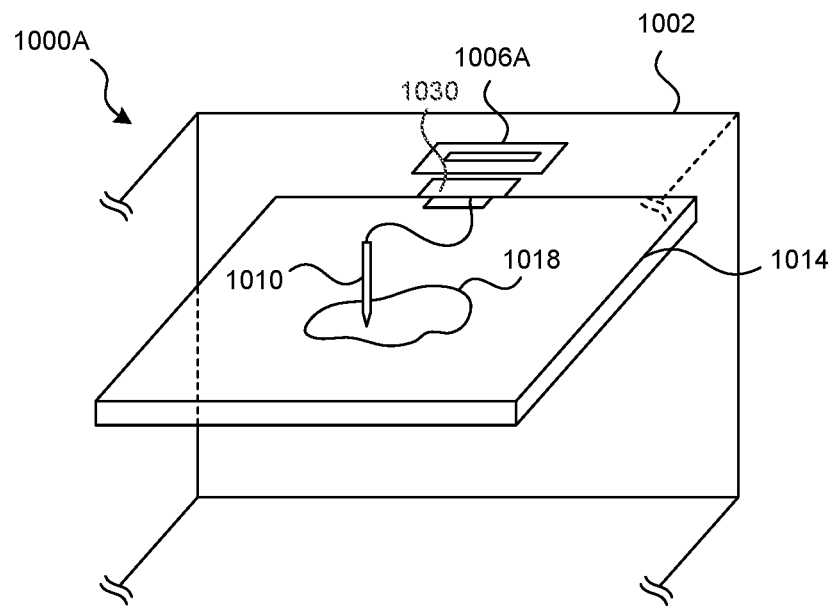
FIG. 10A is an example of a perspective view of an interior chamber of a cooking appliance, in accordance with various embodiments.

FIG. 10A is an example of a perspective view of an interior chamber 1002 of a cooking appliance 1000A (e.g., the cooking appliance 100, the cooking appliance 100B, the cooking appliance 200, and/or the cooking appliance 300), in accordance with various embodiments. The interior chamber 1002 can include a connection interface 1006A to receive signals from a temperature probe 1010 (e.g., the temperature probe 1100). Ridges (not shown) of the interior chamber 1002 are adapted to receive and support a food tray 1014. The food tray 1014, in turn, supports edible substance 1018. The temperature probe 1010 is inserted into the edible substance 1018 to take temperature readings of the edible substance 1018. For example, the temperature probe can be a multipoint temperature probe sending multiple streams (e.g., respectively corresponding to points along the length of the temperature probe) of temperature readings to a computing device (e.g., the computing device 206) in or coupled to the cooking appliance 1000A.

Figure 10B:
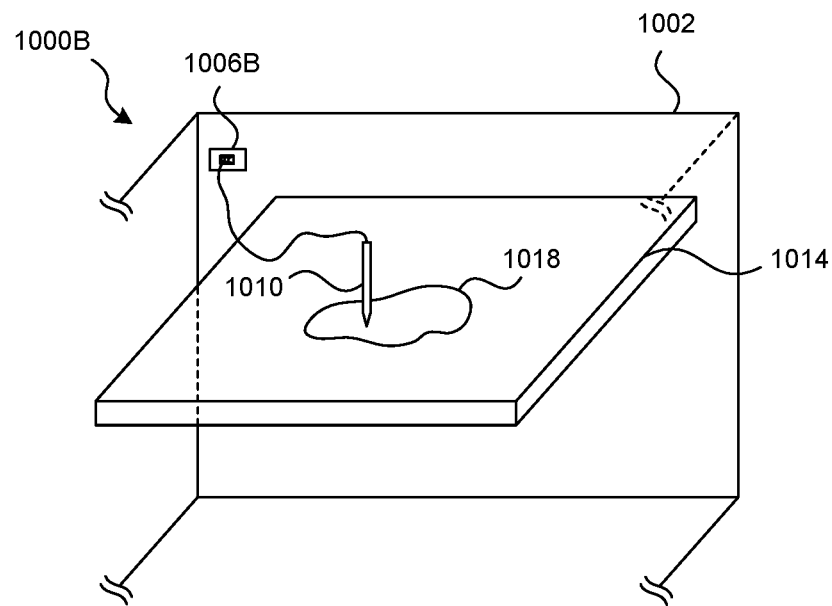
FIG. 10B is another example of a perspective view of an interior chamber of a cooking appliance, in accordance with various embodiments.

FIG. 10B is another example of a perspective view of the interior chamber 1002 of a cooking appliance 1000B (e.g., the cooking appliance 100A, the cooking appliance 100B, the cooking appliance 200, and/or the cooking appliance 300), in accordance with various embodiments. Hereinafter, the "connection interface 1006" can refer to connection interface 1006A or the connection interface 1006B. In several embodiments, the connection interface 1006 is adapted to receive one or more analog signals corresponding to the temperature readings. The connection interface 1006 can be adapted to establish an electrical connection, an inductive coupling connection, a capacitive coupling connection, or any combination thereof, to the food tray 1014 (as shown in FIG. 10A) or to the temperature probe 1010 (as shown in FIG. 10B). The computing device of the cooking appliance 1000B can receive one or more continuous feeds of temperature readings from the temperature probe 1010 via the connection interface 1006B. In these embodiments, the computing device can determine the temperature readings by analyzing/decoding the analog signals. In response to changes to the temperature readings from the continuous feeds, the computing device can execute a heat adjustment algorithm that is dynamically controlled by the computing device. Each time the cooking appliance is used, the user can select a heating recipe corresponding to a cooking recipe. The heating recipe can specify the heat adjustment algorithm for the computing device to execute.

In several embodiments, the computing device is configured to detect a center of the edible substance 1018 such that the computing device can accurately assign a stream of temperature readings as corresponding to the center of the edible substance 1018. This enables the computing device to monitor the temperature gradients at different portions of the edible substance 1018 and thus enables precise cooking methodologies. In one example, the computing device can detect the center of the edible substance based on user input of an insertion angle and/or an insertion depth of the temperature probe 1010 and/or the temperature readings from the continuous feeds. In another example, the exertion angle and/or the insertion depth of the temperature probe 1010 is specified by the heating recipe. In some embodiments, a display of the cooking appliance can present the insertion angle and the insertion depth to the user to have the user insert, according to those specifications, the temperature probe 1010 into the edible substance 1018.

In several embodiments, the connection interface 1006 is configured to mechanically couple to a portion of the food tray 1014 and to communicate with a relay interface 1030 of the food tray 1014. The food tray 1014 can be a removable component of the cooking appliance 1000A and/or 1000B. The food tray 1014 can mechanically attach to at least a portion of the temperature probe 1010 and to receive temperature reading signals from the temperature probe 1010. In some embodiments, the connection interface 1006 can provide electrical power to the food tray 1014, which can be relayed to the temperature probe 1010. The temperature probe 1010 can be a removable component that conveniently detaches and/or re-attaches to the food tray. In one example, the connection interface 1006 includes a magnet or a magnetizable material (e.g., ferromagnetic material) to mechanically couple with a portion of the food tray 1014. In other examples, the connection interface 1006 includes a click-in mechanism, a button, a pin, a hook, a clip, or any combination thereof, to removably attach to the food tray 1014. The relay interface 1030 can include a magnet or a magnetizable material (e.g., ferromagnetic material) to mechanically couple with a portion of the connection interface 1006 and/or a portion of the temperature probe 1010. In other examples, the relay interface 1030 includes a click-in mechanism, a button, a pin, a hook, a clip, or any combination thereof, to removably attach to a portion of the connection interface 1006 and/or a portion of the temperature probe 1010. In some embodiments, the relay interface 1030 includes at least two portions. One portion of the relay interface 1030 can couple (e.g., mechanically and/or electrically) to the temperature probe 1010. One portion of the relay interface 1030 can couple (e.g., mechanically and/or electrically) to the connection interface 1006.

In several embodiments, the cooking appliance 1000A and/or 1000B includes a power supply (e.g., power source 202). The power supply can supply power to a removable accessory of the cooking appliance by modulating an alternating current (AC) through the interior chamber 1002. A wall in the interior chamber 1002 can be electrically conductive, acting as a single conductor wire. The food tray 1014 can also be electrically conductive. Hence, the supplied power from the power supply can transfer to any component (e.g., the temperature probe 1010) in electrical contact with the food tray 1014. The temperature probe 1010 can extract (e.g., harvest) power from the power supply by harvesting power from capacitive coupling to the AC current through the conductive chamber wall and the food tray 1014. In turn, the temperature probe 1010 can utilize the harvested power to generate a wired electrical signal, an audio signal, a radiofrequency signal, an inductive coupling signal, and/or a capacitive coupling signal to the connection interface 1006. For example, the signal can be generated using one or more passive electronic components that produce different signals in response to receiving electrical power at different temperature ranges.

Figure 11A:
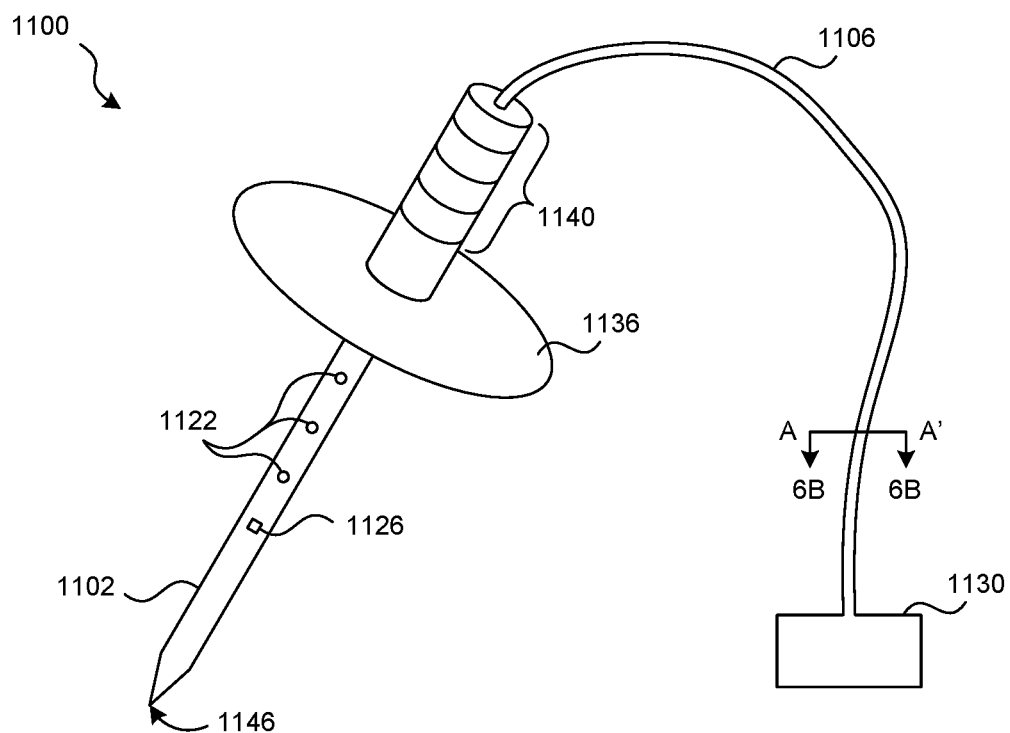
FIG. 11A is an example of a temperature probe that monitors temperatures inside edible substance to provide temperature feedback to a cooking appliance, in accordance with various embodiments.
Figure 11B:
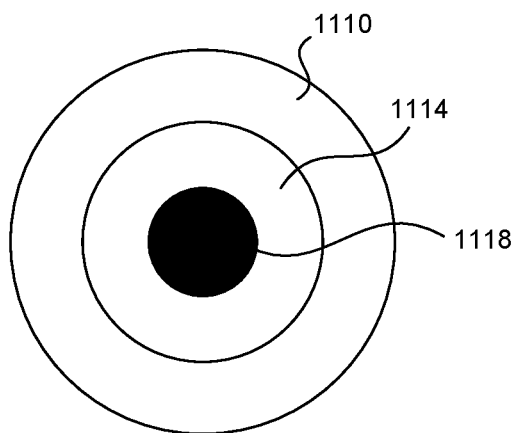
FIG. 11B is a cross-sectional view of the cable of the temperature probe of FIG. 11A.

FIG. 11A is an example of a temperature probe 1100 that monitors temperatures inside edible substance (e.g., the edible substance 1018) to provide temperature feedback to a cooking appliance, in accordance with various embodiments. The temperature probe 1100 includes a probe body 1102 and a cable 1106 attached to the probe body 1102. FIG. 11B is a cross-sectional view of the cable 1106 (along line 6B) of the temperature probe 1100 of FIG. 11A.

Regarding FIG. 11A and FIG. 11B, the cable 1106 can include a sheath 1110, an insulation layer 1114, and an inner wire 1118. For example, the sheath 1110 can be a metal braided sheath (e.g., an iron braided sheath or a steel braided sheath). In another example, the sheath 1110 is a heat resistant polyamine-based sheath or a polyamide sheath. The insulation layer 1114 can be a heat resistant insulation between the inner wire 1118 and the sheath 1110. The heat resistant insulation can comprise a metal oxide powder (e.g., magnesium oxide powder), silicon, glass fiber, or any combination thereof.

Figure 12A:
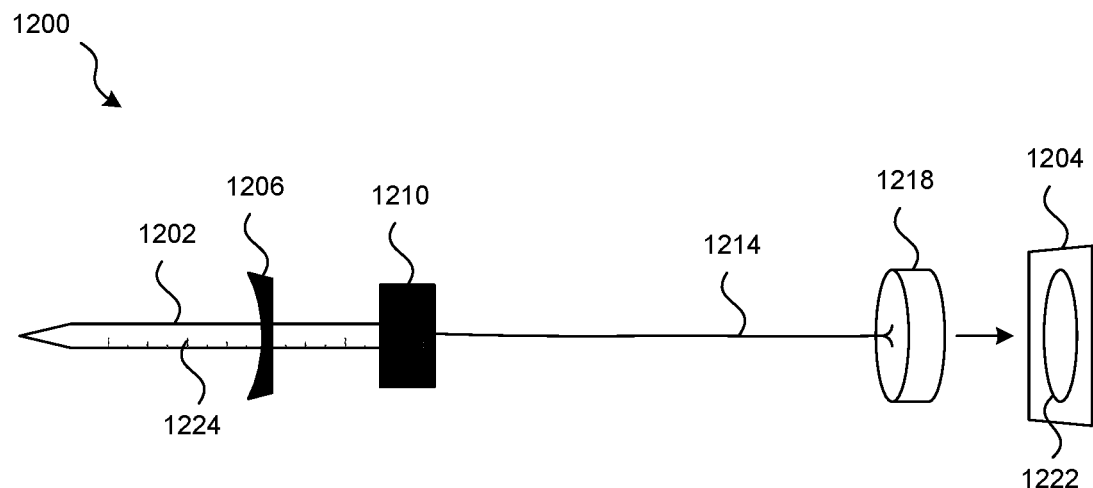
FIG. 12A is an example of a side view of a probe and tray connection, in accordance with various embodiments.
Figure 12B:
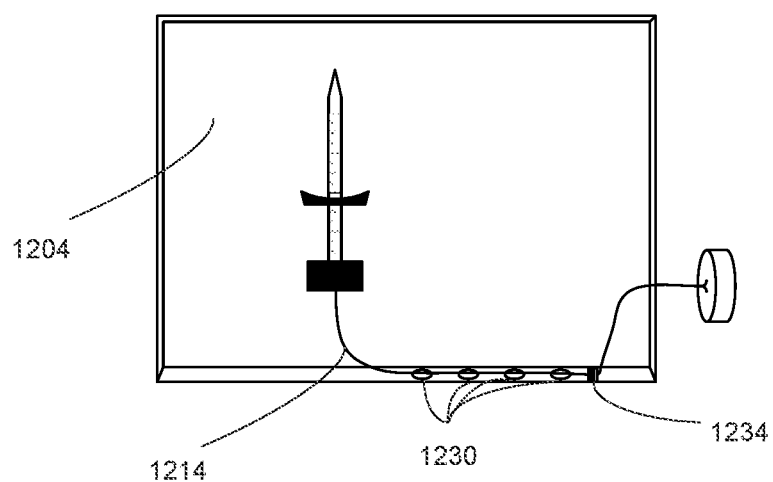
FIG. 12B is an example of a top view of the probe and tray connection, in accordance with various embodiments.

The cable 1106 is configured to communicate temperature readings from temperature sensing elements 1122 along the probe body 1102. In some embodiments, the cable 1106 can also deliver power to the temperature sensing elements 1122. The temperature sensing elements 1122 are configured to measure the temperature readings and communicate the temperature readings via the cable in analog signal form. In some embodiments, the probe body 1102 includes markings, etchings or other visible indicia allowing for measurement of the food height and/or insertion depth of the probe body 1102. For example, the markings may include locations of the temperature sensing elements 1122, tick marks for a ruler (e.g., as illustrated in FIGS. 12A-B), and/or other insertion and measurements aids. In some embodiments, a computer vision system may capture an image of a temperature probe inserted into an edible substance and determine from the captured image (including by analyzing the probe markings that are visible in the captured image) one or more food properties (e.g., food height) and/or verify whether the probe has been properly inserted.

In some embodiments, the temperature probe 1100 includes a wireless communication device 1126. For example, the wireless communication device 1126 can generate a radiofrequency (RF) signal, an inductive coupling signal, a capacitive coupling signal, an audio or vibratory signal, an optical signal, or any combination thereof. The cable 1106 is configured to provide power to the wireless communication device 1126.

In some embodiments, the temperature probe 1100 includes a tray attachment mechanism 1130 coupled to an end of the cable 1106 opposite from the probe body 1102. The tray attachment mechanism 1130 can be removably attachable to a tray of a cooking appliance. In some embodiments, the tray attachment mechanism 1130 is adapted to electrically couple to at least a portion of the tray (e.g., to communicate or to receive power). In some embodiments, the tray attachment mechanism 1130 includes a capacitive coupler (e.g., antenna) or an inductive coupler (e.g., coil) to facilitate one or more forms of near field communication. The tray attachment mechanism 1130 can be a block designed to fit at least partially into the tray or design to fit around a protrusion of the tray. The tray attachment mechanism 1130 can include a temperature resistant magnet or a magnetizable metal (e.g., ferromagnetic material). The tray attachment mechanism 1130 can include a clip, a hook, a click in button, a clamp, an anchor, or any combination thereof, for attachment or mechanical coupling.

In several embodiments, the temperature probe 1100 includes an insertion aid 1136 (e.g., a disc, a truncated prism, a cylinder, etc.). The insertion aid 1136 can surround the probe body 1102. In several embodiments, the insertion aid 1136 can slide along the probe body 1102 to adjust the depth of insertion. In some embodiments, the insertion aid 1136 may have holes or hallowed out portions to reduce the weight of the insertion aid 1136. The insertion aid 1136, the probe body 1102, the temperature sensing elements 1122, and/or other components of the temperature probe 1100 can be heat resistant. For example, these components can comprise or consist one or more heat resistant materials capable of withstanding temperatures below 900 to 1000 Fahrenheit. In another example, these components can comprise or consist one or more heat resistant materials capable of withstanding temperatures below 1000 Fahrenheit. In some embodiments, the insertion aid 1136 includes at least one insertion angle reference that enables a user to determine whether the probe body is inserted at a known angle. In some embodiments, the insertion aid includes at least one insertion depth reference that enable a user to determine how deep the probe body 1102 is inserted into an edible substance or a depth (e.g., thickness) of a top surface of the edible substance when the probe body is inserted all the way through the edible substance. The insertion aid 1136 can include a stopper structure (e.g., a disc structure) surrounding the probe body and adjacent to the handle. The stopper structure can prevent the temperature probe 1100 from being inserted beyond a certain depth.

In some embodiments, the probe body 1102 includes a handle 1140 on an end opposite from a sharp end 1146. In some embodiments, the probe body 1102 is length adjustable.

FIG. 12A is an example of a side view of a probe and tray connection, in accordance with various embodiments. A temperature probe 1200 includes a probe body 1202, a depth setting aid 1206, a handle 1210, a cable 1214, and a connector 1218. The temperature probe 1200 can be coupled to a tray 1204. The probe body 1202 can be made from a rigid material, and may include visible indicia 1224 allowing for measurement of food items and providing additional guides for setting and/or measuring insertion depth. In some embodiments, a computer vision system captures one or more images of the inserted probe and estimates a food height, insertion depth and angle, and other properties using one or more of known dimensions of the probe and the visible indicia 1224. The depth setting aid 1206 can be adapted to slide along the probe body 1202. The handle 1210 can be fixated to one end of the probe body 1202 across from a food penetrating end (e.g., sharp end). The cable 1214 can be coupled to (e.g., mechanically couple to and/or electrically couple to) the probe body 1202. The cable 1214 can be electrically coupled to heat sensing elements along the probe body 1202. In some embodiments, the cable 1214 is detachable from the probe body 1202.

In some embodiments, the cable 1214 includes magnetic material, ferromagnetic material, magnetizable material, ferrous material, or any combination thereof. This enables the cable 1214 to be organized (e.g., magnetically attracted according to a pattern) by magnets embedded in the tray 1204. In some embodiments, the cable 1214 includes deformable material (e.g., deformable metal) such that the cable 1214 can hold its shape. In some embodiments, the cable 1214 or the tray 1204 can include clipping mechanisms to clip the cable 1214 to the tray 1204. The connector 1218 can detachably couple with a mating connector 1222 of the tray 1204.

FIG. 12B is an example of a top view of the probe and tray connection, in accordance with various embodiments. The tray 1204 can include magnets 1230. The magnets can be embedded along an edge of the tray 1204 to hold the cable 1214 against the edge of the tray 1204. Optionally, the tray 1204 can also include a clip 1234 to hold the cable 1214.

Figure 13:
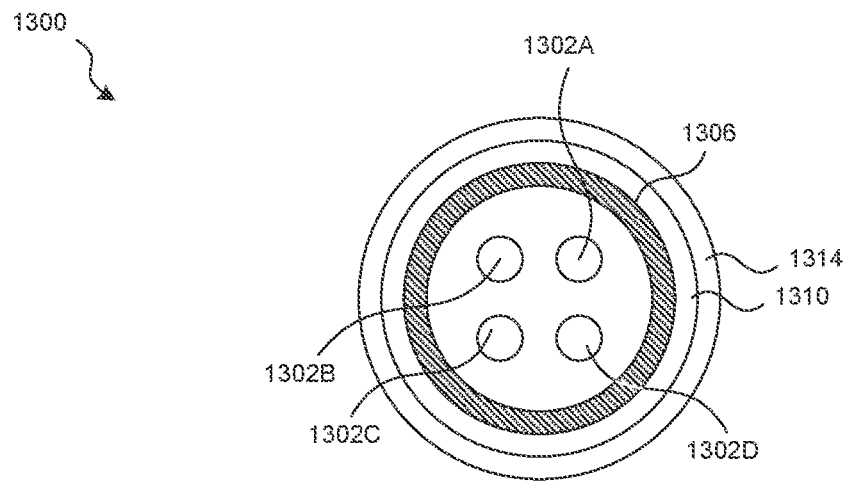
FIG. 13 is an example of a front view of a temperature probe connector, in accordance with various embodiments.

FIG. 13 is an example of a front view of a temperature probe connector 1300 (e.g., the connector 1218), in accordance with various embodiments. The temperature probe connector 1300 can include multiple electrical conductor pads (e.g., a pad 1302A, a pad 1302B, a pad 1302C, and a pad 1302D, collectively as the "electrical conductor pads 1302") surrounded by a ferrous ring 1306. The ferrous ring 1306 in turn is surrounded by a gasket 1310. The gasket 1310 can be surrounded by a protective shell 1314.

Figure 14:
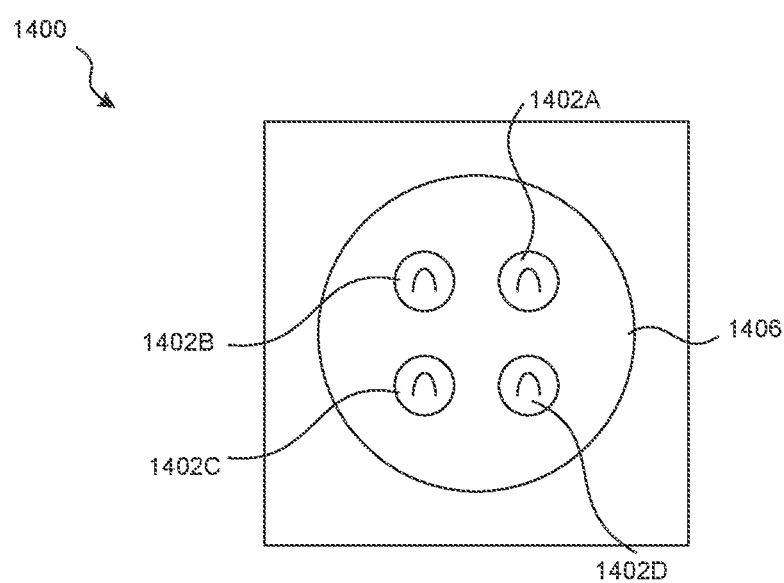
FIG. 14 is an example of a front view of a mating connector corresponding to the temperature probe connector of FIG. 13, in accordance with various embodiments.

FIG. 14 is an example of a front view of a mating connector 1400 (e.g., the mating connector 1222) corresponding to the temperature probe connector of FIG. 13, in accordance with various embodiments. The mating connector 1400 can include multiple contact springs (e.g., a contact spring 1402A, a contact spring 1402B, a contact spring 1402C, and a contact spring 1402D, collectively as the "contact springs 1402") within a recess or boss 1406 to accept a probe connector (e.g., the temperature probe connector 1300).

The temperature probe connector 1300 and the mating connector 1400 can be adapted to magnetically couple. For example, one of the connectors can include a magnet, while the other connector includes a ferrous (e.g., ferromagnetic) material that is magnetizable. The magnetic coupling mechanisms of the tray 1204 and the temperature probe 1200 enables convenient mechanical coupling of the wiring. For example, when the assembled food and the temperature probe 1200 is pushed into the cooking appliance, the connector 1218 and/or the cable 1214 that are partly dangling can snap into place automatically.

Figure 15:
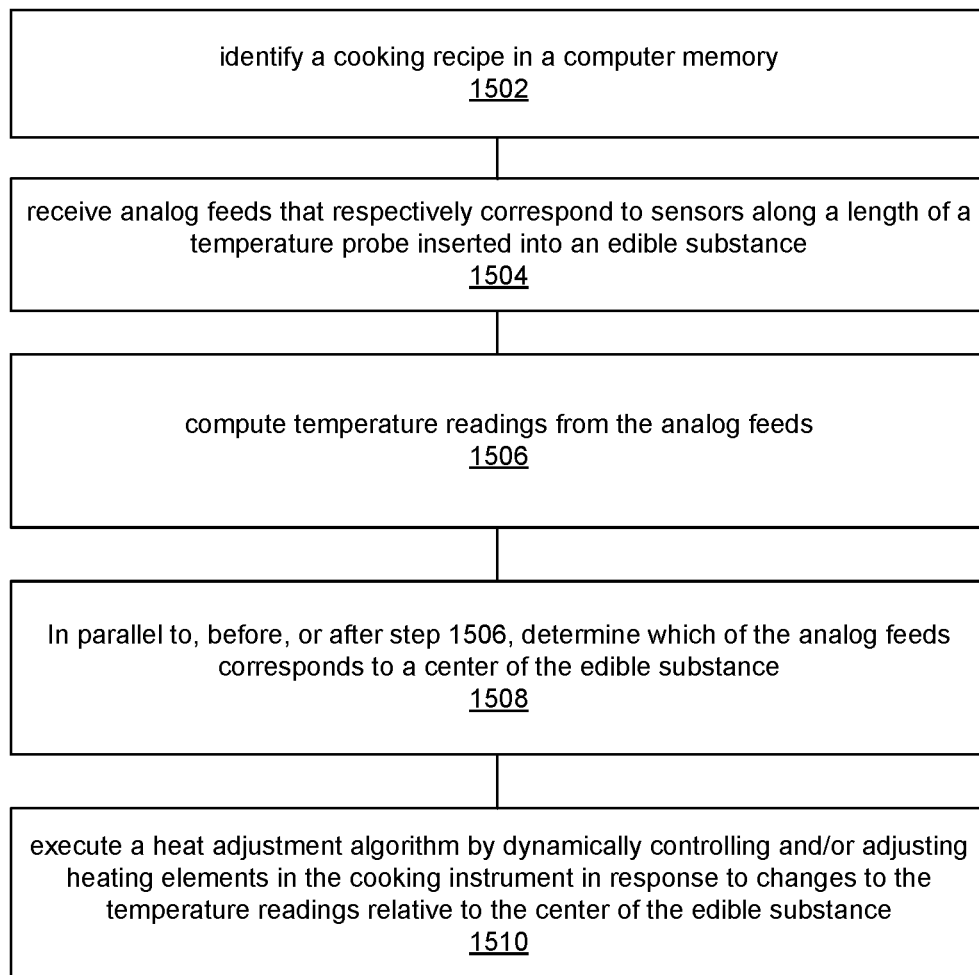
FIG. 15 is a flowchart illustrating a method of operating the cooking appliance to cook a food substance utilizing temperature feedback, in accordance with various embodiments.

FIG. 15 is a flowchart illustrating a method 1500 of operating a cooking appliance (e.g., the cooking appliance 100A, the cooking appliance 100B, the cooking appliance 200, the cooking appliance 300, the cooking appliance 1000A and/or the cooking appliance 1000B) to cook a food substance utilizing temperature feedback, in accordance with various embodiments. At step 1502, a computing device in the cooking appliance identifies a cooking recipe in a computer memory. The cooking recipe can specify a heat adjustment algorithm.

At step 1504, the computing device can receive analog feeds that respectively correspond to sensors along a length of a temperature probe inserted into an edible substance. At step 1506, the computing device can compute temperature readings from the analog feeds. In parallel to, before, or after step 1506, the computing device can determine, at step 1508, which of the analog feeds corresponds to a center of the edible substance. At step 1510, the computing device can execute a heat adjustment algorithm by dynamically controlling and/or adjusting heating elements in the cooking appliance in response to changes to the temperature readings relative to the center of the edible substance.

Figure 16:
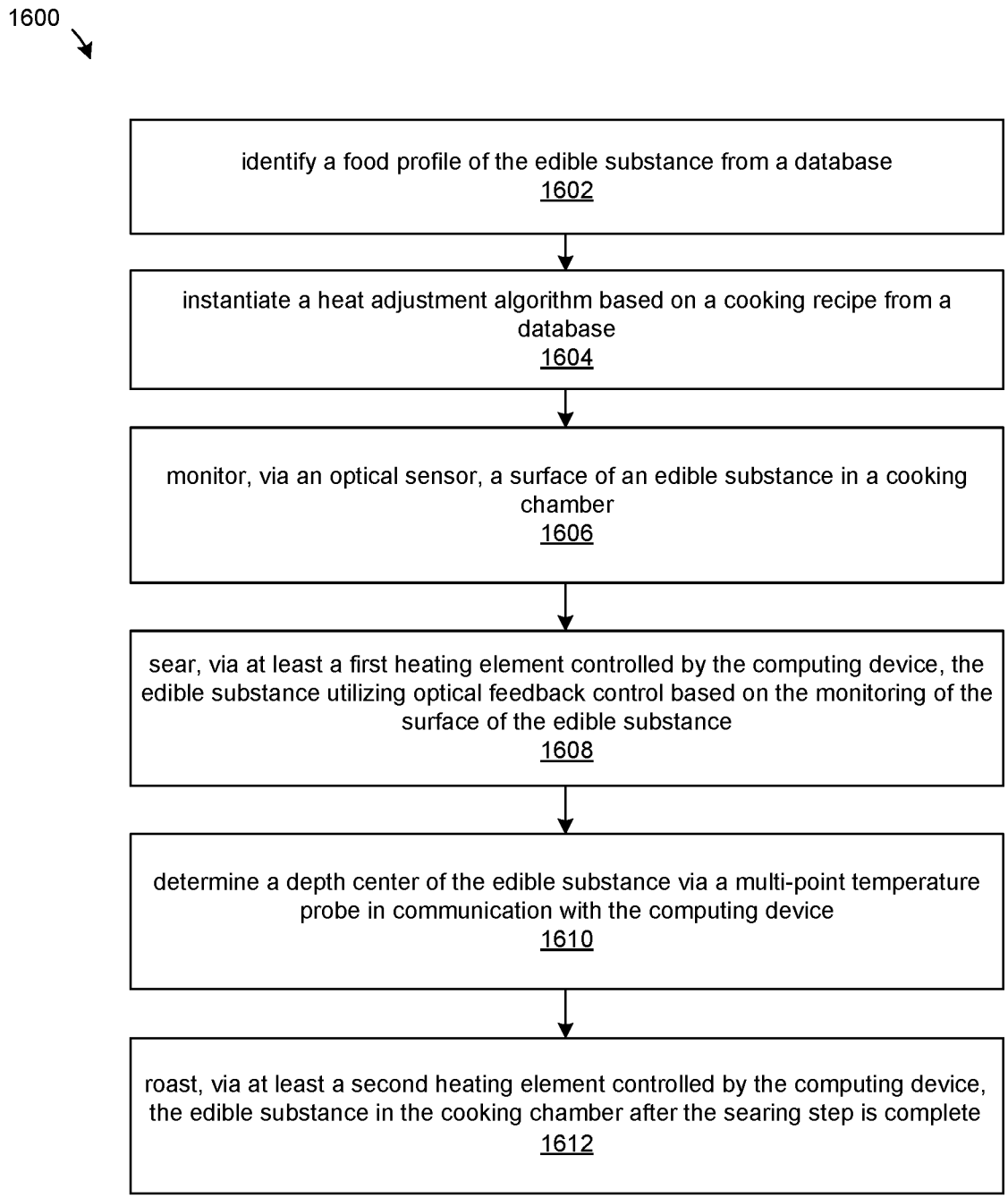
FIG. 16 is a flowchart illustrating a method of operating a cooking appliance to cook an edible substance evenly, in accordance with various embodiments.

FIG. 16 is a flowchart illustrating a method 1600 of operating a cooking appliance (e.g., the cooking appliance 100A, the cooking appliance 100B, the cooking appliance 200, the cooking appliance 300, the cooking appliance 1000A and/or the cooking appliance 1000B) to cook an edible substance evenly, in accordance with various embodiments. At step 1602, the cooking appliance can identify a food profile of the edible substance from a database. For example, the cooking appliance can identify the food profile by scanning (e.g., optically scanning or near-field-based) a packaging of the edible substance prior to starting to heat (e.g., searing and/or roasting) the edible substance. For another example, the cooking appliance can identify the food profile by receiving a user indication of the food profile via an interactive user interface. The interactive user interface can be implemented on a touchscreen of the cooking appliance. The interactive user interface can be implemented on a mobile device (e.g., smart phone or electronic tablet) having a network connection with the cooking appliance.

At step 1604, a computing device (e.g., a processor or a controller) of the cooking appliance can instantiate a heat adjustment algorithm based on a cooking recipe from a database. For example, the computing device can identify one or more cooking recipes associated with the food profile and display the cooking recipes for user selection. The computing device can then receive a user selection of at least one of the cooking recipes. The computing device can instantiate the heat adjustment algorithm based on the selected cooking recipe. In one example, the selected cooking recipe includes a searing step.

At step 1606, the cooking appliance can monitor, via an optical sensor, a surface of an edible substance in a cooking chamber. At step 1608, the cooking appliance can sear, via at least a first heating element controlled by the computing device, the edible substance utilizing optical feedback control based on the monitoring of the surface of the edible substance. For example, the computing device can set the cooking appliance to sear by tuning a peak emission wavelength of the first heating element. For example, the heating concentration of longer peak emission wavelengths can penetrate the edible substance more. Accordingly, when searing, the computing device can shorten the peak emission wavelength of the heating elements. When searing, higher-frequency and shorter peak emission wavelength is used. The radiant heat transfer efficiency during the searing operation can be more than 20 times the radiant heat transfer efficiency of an oven running at conventional filament temperatures (e.g., a conventional nichrome oven). At this much higher radiant heat transfer efficiency, various parts of the edible substance may not ever reach a balanced thermal equilibrium (e.g., radiant heat is added to the surface of the edible substance at a faster pace than the heat being thermally conducted away into the inner parts of the edible substance). Hence, the inner parts of the edible substance do not completely act as a heat sink for the surface of the edible substance. As a result, when searing the surface of the edible substance, the internal parts of the edible substance are also roasted.

At step 1610, the cooking appliance can determine a depth center of the edible substance via a multi-point temperature probe in communication with the computing device. At step 1612, the cooking appliance can roast, via at least a second heating element controlled by the computing device, the edible substance in the cooking chamber after the searing step is complete (e.g., according to optical feedback). The first heating element and the second heating element can be the same heating element or different heating elements. Each of the heating elements can include one or more filament assemblies capable of adjusting their peak emission wavelengths. For example, the computing device can set the cooking appliance to roast by tuning a peak emission wavelength of the second heating element.

When roasting, the computing device can configure the peak emission wavelength of the second heating element to correspond with a penetration depth through the edible substance to the determined depth center. The computing device can proportionally adjust the peak emission wavelength to a level that corresponds to the penetration depth. The food profile identified in step 1602 can specify a depth adjustment function. The depth adjustment function can map penetration depths to peak emission wavelengths. The computing device can thus proportionally adjust the peak emission wavelength to correspond to the penetration depth according to the food profile/depth adjustment function.

The computing device can operate the heating elements differently when roasting versus when searing. In some embodiments, when roasting, the computing device drives (e.g., sending a control command to a driver) a filament assembly of the second heating element to emit at a peak emission wavelength longer (e.g., lower peak emission frequency) than when searing the edible substance. In some embodiments, when roasting, the computing device drives a filament assembly of the second heating element at a higher power than when searing the edible substance. When roasting, the peak emission wavelength is longer, the radiated power is lower, and the radiant heat transfer efficiency is lower than when searing. This enables the roasting operation to cook the inner parts of the edible substance without affecting the surface of the edible substance. For example, this can be partly because the edible substance reaches equilibrium quicker since the surface heat of the edible substance is quickly conducted to the center of the edible substance.

While roasting, the computing device can tune the power driving the heating elements (e.g., the second heating element) based on temperature feedback control from a temperature probe inserted into the edible substance. The temperature probe can be in communication with the computing device. For example, the computing device can monitor temperature readings from the temperature probe via an electrical wire connection, a radiofrequency (RF) wireless connection, or a near field inductive or capacitive coupling connection with the temperature probe.

In various embodiments of the method 1600, the cooking appliance sears (e.g., surface cooking utilizing high-power) before roasting. For example, roasting is performed with less power. In some embodiments, there are four large cooking areas with multiple heating elements. Due to power limitation, it may be impractical to use all heating elements at max power or shortest wavelength when searing. For example, the cooking appliance can have three heating elements on the top portion of its inner chamber. The cooking appliance can run the heating elements on the top portion sequentially to sear (e.g., to overcome the power limitation). When roasting, the cooking appliance can drive the heating elements at lower power sequentially, or running all heating elements or all top portion heating elements at the same time, all which have a lower filament temperature with longer wavelength as compared to when searing.

Generally, driving heating elements to emit longer wavelengths cause the emitted power to penetrate deeper into food. However, thermal gradient of the food can contribute to penetration as well. Very hot surface can cause a relatively sharp temperature gradient from the surface to the center of the food. A relatively lower temperature can have even heating from all sides of the food, similar to how blackbody radiation can cause a lower/smoother temperature gradient.

Figure 17:
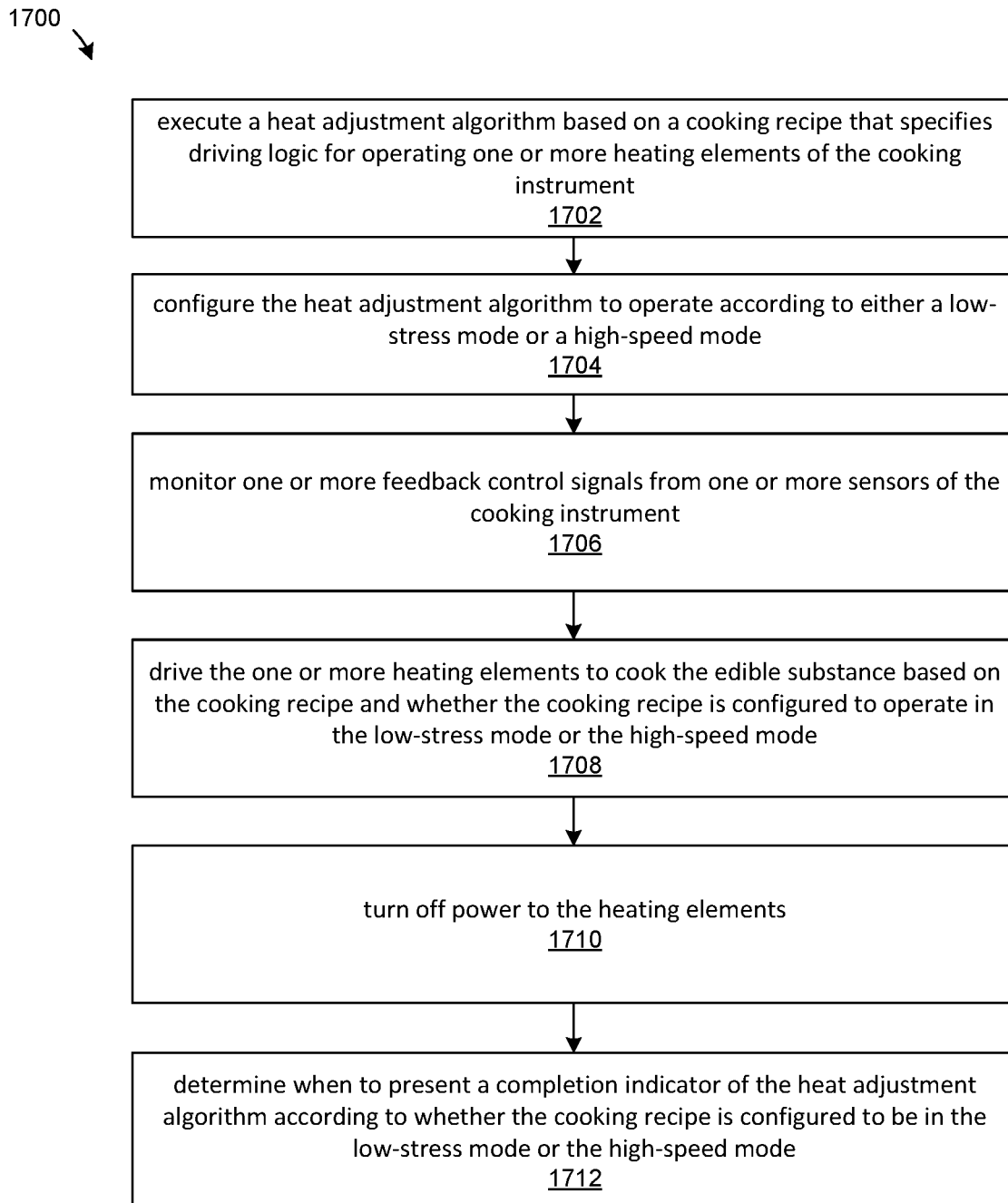
FIG. 17 is a flowchart illustrating a method of operating a cooking appliance to cook an edible substance in different modes, in accordance with various embodiments.

FIG. 17 is a flowchart illustrating a method 1700 of operating a cooking appliance (e.g., the cooking appliance 100A, the cooking appliance 100B, the cooking appliance 200, the cooking appliance 300, the cooking appliance 1000A, and/or the cooking appliance 1000B) to cook an edible substance in different modes, in accordance with various embodiments. At step 1702, a computing device of the cooking appliance can be configured to execute a heat adjustment algorithm/process based on a cooking recipe that specifies driving logic for operating one or more heating elements of the cooking appliance (e.g., see steps 1602 and 1604).

For example, the cooking recipe can specify which of the heating elements to turn on (e.g., controlling the directionality of heating. For example, the cooking recipe can dictate that heating elements from below a tray are turned on and heating elements from above the tray are turned off. In this example, the cooking appliance can be simulating a range top. The cooking appliance can heat up the edible substance in a number of ways. The cooking appliance can be configured to heat the edible substance directly. The cooking appliance can be configured to heat its internal chamber (e.g., its chamber walls and its tray) and let its internal chamber absorb and re-emit energy to heat the edible substance. The cooking appliance can be configured to heat the internal chamber and the edible substance simultaneously. The heated air in the internal chamber can also heat up the edible substance. The cooking appliance can further be configured to provide airflow of heated air to cook the food as an impingement convection oven. At a lower airflow speed, the cooking appliance can be configured as a regular convection oven.

Because items (e.g., the edible substance, the air, the chamber walls, and the tray) inside the cooking appliance may each have one or more excitable wavelengths, by controlling the peak emission wavelengths of the heating elements, the computing device can specifically target different items to heat up. Because an item can have multiple excitable wavelengths, the computing device can select different peak emission wavelengths to control the cooking speed/efficiency provided by the heating elements.

When initially heating up any cooking appliance to a proper operating temperature, such cooking appliance may attempt to draw too much power. Accordingly, the disclosed cooking appliance can include a choke circuit that caps the power drawn to be within the limit of typical circuit breakers. For example, typical circuit breakers can tolerate sudden large surges, but not a relatively consistent draw above 1800 Watt). The choke circuit can cause the cooking appliance to warm up slower initially to prevent blowing a fuse in a circuit breaker.

At step 1704, the computing device can configure the heat adjustment algorithm to operate according to either a low-stress mode or a high speed mode. At step 1706, the computing device can monitor one or more feedback control signals from one or more sensors of the cooking appliance. For example, the feedback control signals can include a temperature reading signal from a temperature probe, an optical feedback signal from an optical sensor (e.g., a camera), or a combination thereof.

At step 1708, the computing device can drive the one or more heating elements to cook the edible substance based on the cooking recipe and whether the cooking recipe is configured to operate in the low-stress mode or the high speed mode. In some embodiments, the computing device can drive the one or more heating elements further based on the feedback control signals. In some embodiments, the computing device can calculate a projection (e.g., heating trajectory) of when to complete cooking and turn off the heating elements. In some embodiments, the control of the heating elements is dynamic (e.g., based on feedback control signals from the temperature probe or from the camera), and hence completion time is not yet known.

At step 1710, the computing device can turn off power to the heating elements. At step 1712, the computing device can determine when to present a completion indicator of the heat adjustment algorithm according to whether the cooking recipe is configured to be in the low-stress mode or the high speed mode. In some embodiments, the computing device can determine when to present the completion indicator based on the feedback control signals (e.g., when the searing is "visually" done according to an optical sensor or when the edible substance has reached a certain temperature for a certain period of time).

The high speed mode requires extraction of the edible substance from the cooking appliance when the completion indicator is presented (e.g., otherwise the edible substance will overcook). The low-stress mode allows for the extraction to occur within a preset time range (e.g., from immediately to within 30 minutes or from immediately to within two to three hours).

In some embodiments, under the high speed mode, the cooking appliance can present the completion indicator when the computing device turns off the power to the heating elements. In some embodiments, under the low-stress mode, the computing device can present the completion indicator a certain amount of time after the computing device turns off the power to the heating elements. For example, after the power to the heating elements is turned off, the tray and/or the chamber walls of the cooking appliance remain as sources of re-emitted energy. The internal air is also still at a high temperature. Under the low-stress mode, the computing device can simulate the re-emission of energy from the internal chamber and the hot air using a computerized model to compute/predict the heating trajectory of the edible substance. The computing device can present the completion indicator once the heating trajectory has reached a point where the re-emission of energy from the internal chamber has died down sufficiently and the hot air has cooled such that they do not cause the edible substance to be overcooked or go stale even if the edible substance remains in the chamber for a preset range of time.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 18:
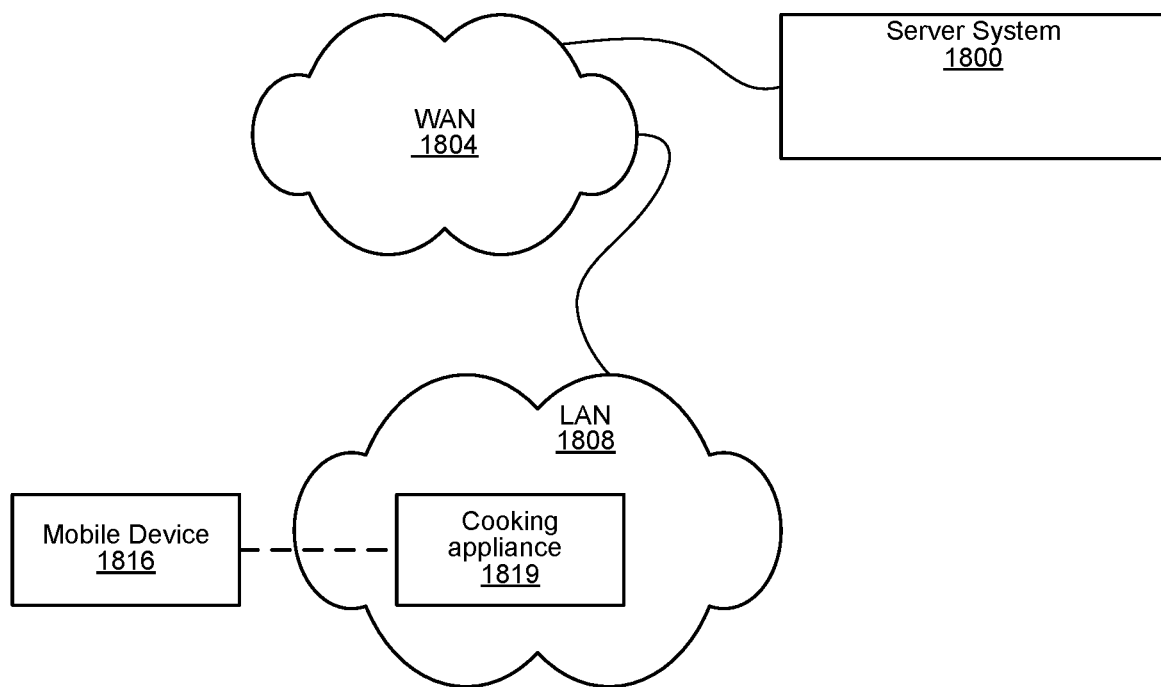
FIG. 18 is a system environment of a cloud-based recipe store, in accordance with various embodiments.

FIG. 18 is a system environment of a cloud-based recipe store, in accordance with various embodiments. A server system 1800 can implement the cloud-based recipe store. The server system 1800 can be accessible via a wide area network (WAN) 1804, such as the Internet. A local area network (LAN) 1808 can be connected to the WAN 1804. A cooking appliance 1812 (e.g., the cooking appliance 100A, the cooking appliance 100B) can establish a network connection to the LAN 1808, and via the LAN 1808 to the WAN 1804. In some embodiments, a mobile device 1816 can be connected to the cooking appliance 1812 via the LAN 1808 or a peer to peer connection (e.g., Bluetooth). In some embodiments, the mobile device 1816 is connected to the LAN 1808. In some embodiments, the LAN 1808 can be established by an access point, a router, the mobile device 1816, or other network equipment (not shown).

Figure 19:
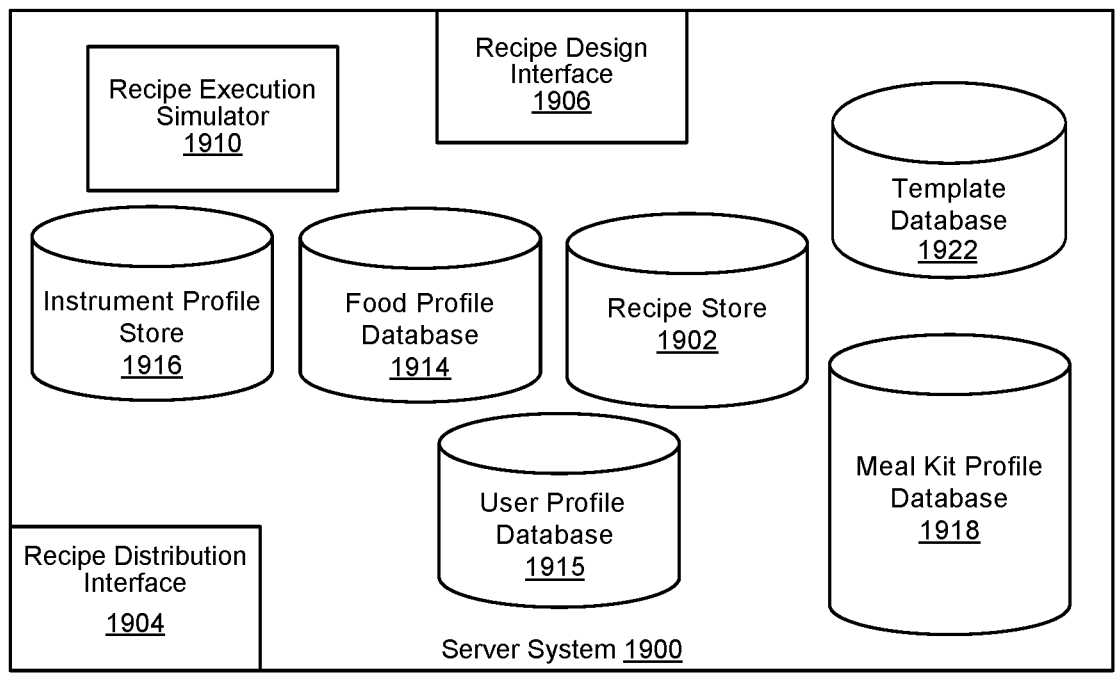
FIG. 19 is a block diagram of a server system that implements a cloud-based recipe store, in accordance with various embodiments.

FIG. 19 is a block diagram of a server system 1900 (e.g., the server system 1800) that implements a cloud-based recipe store, in accordance with various embodiments. The server system 1900 can include a recipe store 1902, a recipe distribution interface 1904, a recipe design interface 1906, a recipe execution simulator 1910, a food profile database 1914, a user profile database 1915, an instrument profile store 1916, a meal kit profile database 1918, a template database 1922, or any combination thereof. The recipe store 1902 stores one or more cooking recipes. Each of the cooking recipes can include one or more heating logic (e.g., heat adjustment algorithms). The recipe distribution interface 1904 can present and provide the content of the recipe store 1902 via a web interface or an application programming interface (API) for external devices to download. For example, a cooking appliance (e.g., the cooking appliance 100A and/or the cooking appliance 100B) can access the recipe distribution interface 1904 over a wide-area network (e.g., the WAN 1804). In at least one example, a user can download a cooking recipe onto a mobile device and then transfer the cooking recipe to the cooking appliance. In at least one example, a user of the cooking appliance can download a cooking recipe directly into the cooking appliance. In various embodiments, the user profile database 1915 stores user-specific information to facilitate various operations described herein, including storing user preferences, user device identifiers, the user's cooking history, user created recipes, stored recipes and/or other user information.

In various embodiments, the server system 1900 provides the recipe design interface 1906 to facilitate the design of the cooking recipes in the recipe store 1902. When designing a cooking recipe, the recipe designer can access the template database 1922 to copy a cooking recipe template or a heating logic template into the cooking recipe. The server system 1900 can provide the recipe execution simulator 1910 to simulate the cooking recipe from the recipe designer. The server system 1900 can generate one or more visuals (e.g., videos, charts, graphs, combinations thereof, etc.) to depict the transformation of a food target corresponding to the cooking recipe. The server system 1900 can present the simulated transformation represented by the visual via the recipe design interface 1906. The simulation can result in a visual simulation and/or a temperature gradient simulation. The simulation can access a food profile database 1914 to determine how a unit amount of target food (e.g., referred to as a "food target") transforms visually in response to ambient or internal temperature change. The food profile database 1914 can also specify heating capacitance and conductance characteristics of a unit amount of target food to facilitate the simulation. The recipe execution simulator 1910 can thus provide feedback to the recipe designer to ensure that the cooking recipe can work as intended in a cooking appliance.

The instrument profile store 1916 can store specifications of multiple versions or embodiments of the disclosed cooking appliance. In some embodiments, the designer can select from the instrument profile store 1916 to determine which version/embodiment of the disclosed cooking appliance can work with the specified cooking recipe. In some embodiments, the recipe execution simulator 1910 can run the simulation based on one of the version/embodiment in the instrument profile store 1916.

The meal kit profile database 1918 can store package identifiers of one or more known meal kits/food packages. In some embodiments, logic of the cooking recipe can refer to one or more of the package identifiers. This enables the designer to specify a change of tactic/logic based on a cooking appliance's recognition of a package identifier. In various embodiments, the database can include more detailed info about the meal kits, including physical properties (height/weight/dimension), exact type of food (e.g. species of fish), source of food (e.g. ranch where beef originated), etc.

Figure 20:
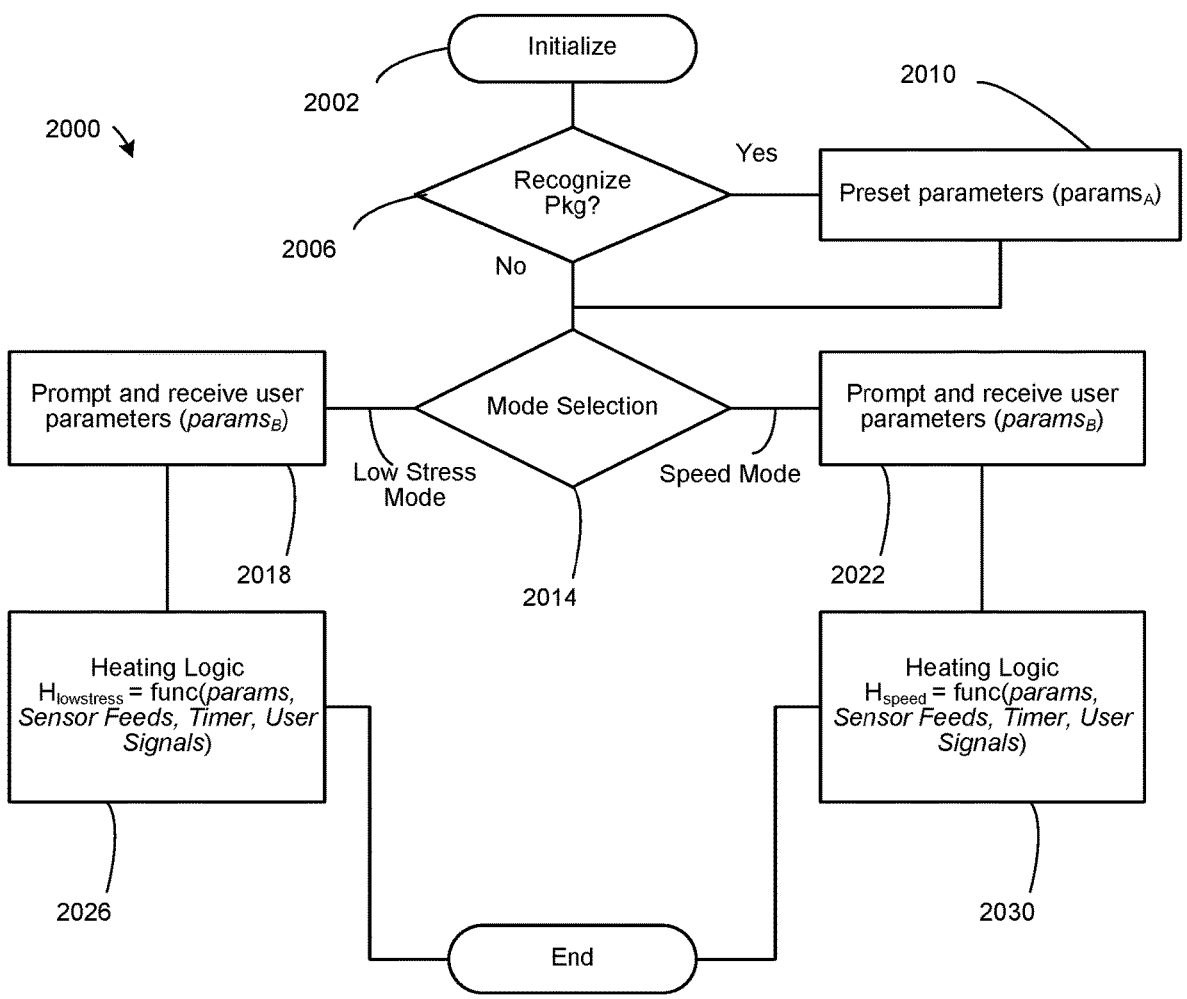
FIG. 20 is a control flow diagram illustrating an example of a cooking recipe, in accordance with various embodiments.

FIG. 20 is a control flow diagram illustrating an example of a cooking recipe 2000, in accordance with various embodiments. The cooking recipe 2000 can be a set of instructions (e.g., electronic and/or computer-readable instructions) adapted to configure a cooking appliance to process a target food type. A cooking appliance (e.g., the cooking appliance 100A and/or the cooking appliance 100B) can download the cooking recipe 2000 from a server system (e.g., the server system 1900) and execute the cooking recipe 2000. The cooking recipe 2000 can include a heating logic (e.g., a heat adjustment algorithm) and instructions to configure the heating logic. For example, at step 2002, the cooking appliance can initialize the cooking recipe 2000. At step 2006, the cooking appliance determines whether it recognizes a meal package (e.g., the cooking appliance can utilize its camera to scan for a package identifier or prompt a user of the cooking appliance to enter a package identifier). At step 2010, responsive to recognizing the meal package (e.g., a package corresponding to an entry in the meal kit profile database 1918), the cooking appliance configures a set of heating logic preset parameters corresponding to the recognized package identifier. For example, the cooking appliance can access (e.g., locally or over a network) a meal kit profile database to identify the corresponding set of heating logic preset parameters. In this example, regardless of whether the meal package is recognized, the cooking appliance can proceed to step 2014.

At step 2014, the cooking appliance selects an operational mode that a user of the cooking appliance prefers and makes other user-specific adjustment as appropriate. For example, the cooking appliance can prompt the user to enter a mode selection via its touchscreen, its one or more buttons, or a mobile device connected to the cooking appliance. At step 2018, responsive to selecting a first mode (e.g., the low stress mode), the cooking appliance can prompt for (e.g., the user) and receive heating logic user parameters relevant to the first mode. Similarly, at step 2022, responsive to selecting a second mode (e.g., the high speed mode), the cooking appliance can prompt for and receive heating logic user parameters relevant to the second mode. When the first mode is selected, the cooking appliance can execute, at step 2026, heat adjustment algorithm/heating logic of the cooking recipe 2000 associated with the first mode (e.g., referred to as "heating logic A"). When the second mode is selected, the cooking appliance can execute, at step 2030, heat adjustment algorithm/heating logic of the cooking recipe 2000 associated with the second mode (e.g., referred to as "heating logic B").

The heating logic A can be a function of the heating logic user parameters specified at step 2018, the heating logic preset parameters at step 2010 (if any), one or more sensor feeds, a timer, one or more user signals, or any combination thereof. Similarly, the heating logic B can be a function of the heating logic user parameters specify at step 2022, the heating logic reset parameters at step 2010 (if any), one or more sensor feeds, a timer, one or more user signals or any combination thereof.

In some embodiments, a state machine can represent a heating logic sequence. For example, the cooking recipe can include multiple heating logic sequences. At least some of the heating logic sequences can be alternatives of each another. For example, the cooking recipe 2000 can dictate the basic settings of the state machine. State machine can be further configured by the heating logic preset parameters and/or the heating logic user parameters. Based on these settings, the state machine can configure components of the cooking appliance differently according to a current state of operation. For example, the state machine can specify heating element configuration (e.g., of one or more heating elements) based on the current state of operation. The sensor feeds, the timer, and/or the user signals of the cooking appliance can be the input signals to the state machine. A heating logic sequence can dictate whether changes to the input signals can change the current state of operation. The cooking recipe 2000 can specify heating element configuration (e.g., of one or more heating elements) based on the current state of operation. In some embodiments, one of the states is a termination state. Once a termination state is reached, the cooking appliance can notify (e.g., via an output component) a user that the content in the cooking appliance is ready.

When designing a cooking recipe, the designer can block access to any of the above steps. For example, the designer can skip step 2014 and forces a cooking appliance to operate only in the low stress mode or only in the high speed mode.

Figure 21:
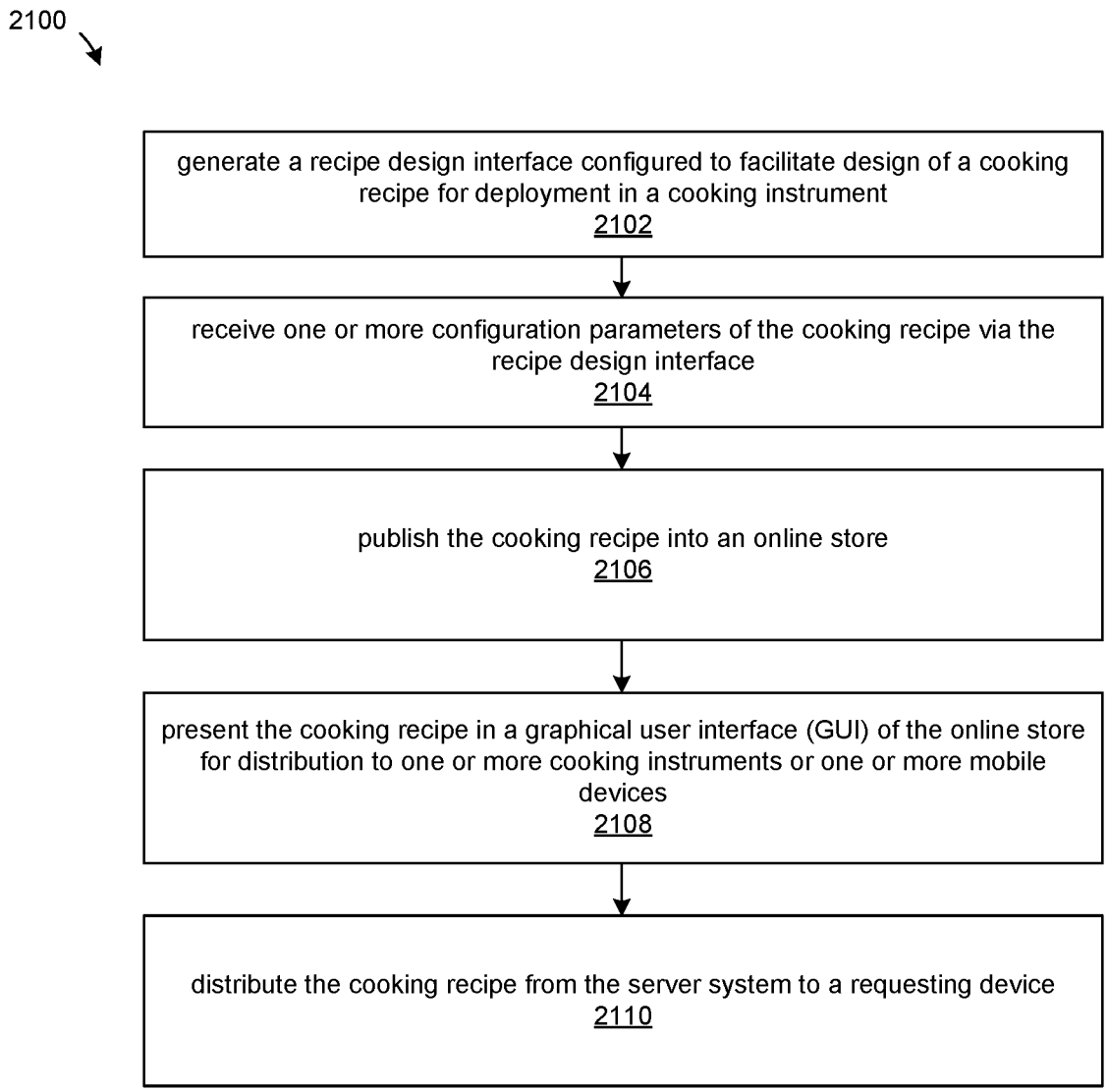
FIG. 21 is a flow diagram illustrating a method of operating a server system that implements a cloud-based recipe store, in accordance with various embodiments.

FIG. 21 is a flow diagram illustrating a method 2100 of operating a server system (e.g., the server system 1900) that implements a cloud-based recipe store, in accordance with various embodiments. At step 2102, the server system can generate a recipe design interface (e.g., the recipe design interface 1906) configured to facilitate design of a cooking recipe for deployment in a cooking appliance (e.g., the cooking appliance 100A and/or the cooking appliance 100B). In some embodiments, the recipe design interface has an integrated developer environment (IDE) for inputting the heating logic. The IDE can enforce a format convention for specifying the heating logic. The recipe design interface can provide access to a recipe execution simulator (e.g., the recipe execution simulator 1910). The recipe execution simulator can compute a simulation of the cooking recipe against a known food profile (e.g., from the food profile database 1914). For example, the simulation can include a visual depiction (e.g., a chart or a graph) of a food target undergoing transformation according to the heating logic and/or a visual depiction of temperature progression of the food target or parts of the cooking appliance. The recipe execution simulator can then present the simulation via the recipe design interface. The known food profile can specify how a food target transforms visually in response to ambient or internal temperature change, and the heat capacity and conductance characteristics of a unit amount of the food target.

The recipe design interface can provide access to one or more heating logic templates (e.g., in the template database 1922). A heating logic template can be configurable as the heating logic. A heating logic template can be inheritable. For example, when the heating logic inherits from the heating logic template, the heating logic template can serve as a basis for the heating logic that prompts the designer to fill-in subroutines required by the heating logic template. For example, a heating logic template can provide the basic logic to emulate a conventional cooking appliance (e.g., a range, a grill, a nichrome oven, etc.), and allow a designer to specify parameters intended for the conventional cooking appliance. The heating logic template can then translate the parameters intended for the conventional cooking appliance into heating element configurations for one of the disclosed cooking appliance (e.g., the cooking appliance 100A and/or the cooking appliance 100B). A heating logic template can be imported into the heating logic as a subroutine of the heating logic.

At step 2104, the server system can receive one or more configuration parameters of the cooking recipe via the recipe design interface. The cooking recipe can include one or more heating logic sequences. For example, a heating logic sequence can be represented as a state machine (e.g., deterministic finite automaton or a workflow). The state machine can be defined by at least an initial state, a completion state, a state transition function, an output function, an input symbol set (e.g., possible inputs), and an output symbol set (e.g., possible outputs). In one example, an input can be a sensor feed value within a preset range. In another example, an output can be a filament driver parameter associated with a heating element for configuring the heating element after transitioning into a specific state of operation.

The configuration parameters can include an available state in the state machine. The configuration parameters can include a user instruction associated with the state. The user instruction is configured to be displayed in the cooking appliance or a mobile device connected to the cooking appliance. The configuration parameters can include a heating element configuration associated with the state. In some examples, the heating element configuration is specified as a filament driver parameter (e.g., wavelength, amplitude, signal pattern, power, duty cycle, etc.) and a heating element selection (e.g., which heating element to use). In some examples, the heating element configuration is specified as a target temperature, a target spatial region (e.g., cooking depth and position relative to a chamber of the cooking appliance), a target material (e.g., food, tray, chamber wall, perforated sheet, or air), an instrument emulation mode, or any combination thereof.

The configuration parameters can also specify a state change condition associated with a state. The state change condition is a conditional trigger that specifies when to change a current state of operation and to which state to change to. The state change condition can be a function of one or more sensor feeds, one or more timers, one or more user signals, or any combination thereof. For example, the sensor feeds can include a temperature probe inserted into a food target, a temperature sensor in the cooking appliance, a camera in the cooking appliance, or any combination thereof. The user signals can be from a mobile device connected to the cooking appliance, an input button of the cooking appliance, a touchscreen of the cooking appliance, other input component of the cooking appliance, or any combination thereof.

In some embodiments, the server system can cross-check the configuration parameters entered by the recipe designer for errors. For example, the server system can detect (e.g., through simulation or pattern recognition of known problematic logic) a potential error or hazard associated with the cooking recipe or the heating logic. The server system can then present the potential error or hazard via the recipe design interface to notify the recipe designer.

At step 2106, the server system can publish the cooking recipe into an online store (e.g., the recipe store). In some embodiments, the server system provides version control of the cooking recipe. In these embodiments, the server system can maintain multiple versions of the cooking recipe (e.g., at least some of these versions are published). After the publication of the cooking recipe, at step 2108, the server system can present the cooking recipe in a graphical user interface (GUI) (e.g., the recipe distribution interface 1904) of the online store for distribution to one or more cooking appliances or one or more mobile devices. Each of the mobile devices can include an application capable of communicating with a cooking appliance.

At step 2110, the server system can distribute the cooking recipe from the server system to a requesting device (e.g., a device that selects a cooking recipe to download). In some embodiments, prior to distributing the cooking recipe, the server system can configure the cooking recipe with a digital rights management (DRM) mechanism to prevent further unauthorized distribution of the cooking recipe after said distributing to the requesting device.

Figure 22:
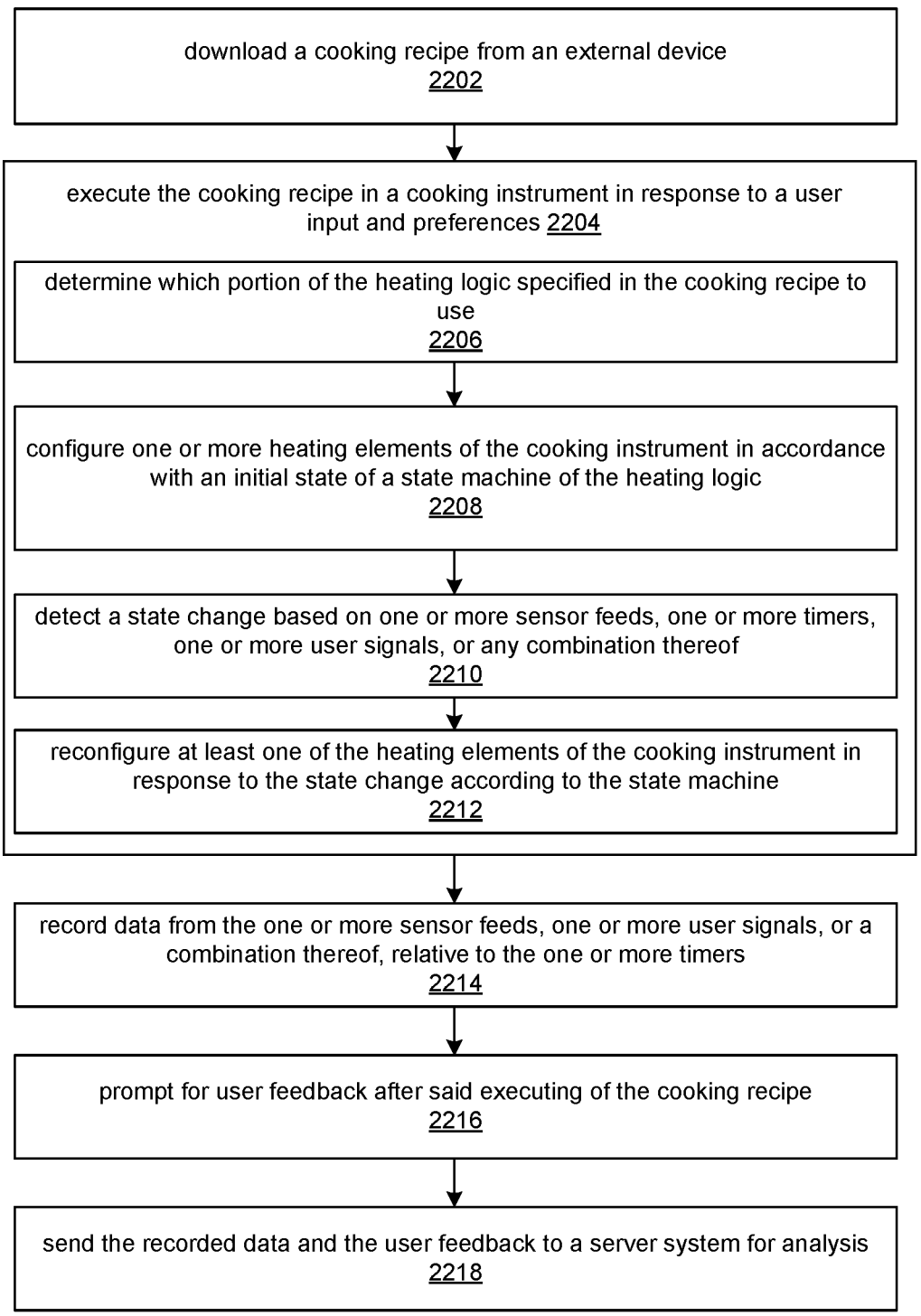
FIG. 22 is a flow diagram illustrating a method of configuring a cooking appliance with a cooking recipe, in accordance with various embodiments.

FIG. 22 is a flow diagram illustrating a method 2200 of configuring a cooking appliance (e.g., the cooking appliance 100A and/or the cooking appliance 100B) with a cooking recipe, in accordance with various embodiments. At step 2202, the cooking appliance can download a cooking recipe from an external device. For example, the external device can be a server system (e.g., the server system 1900), a mobile device, or a portable memory device. The external device can be connected via a wireless network, a physical port of the cooking appliance, or a peer to peer connection established by the cooking appliance.

At step 2204, the cooking appliance can execute the cooking recipe in the cooking appliance in response to a user input and other user-related information. For example, the cooking appliance can detect placement of food into the cooking appliance. The cooking appliance can execute the cooking recipe in response to detecting the placement of food. For example, the cooking appliance can detect the placement of food by a camera in the cooking appliance, a weight sensor, a temperature probe connected to the cooking appliance, a mechanical connection sensor of a door of the cooking appliance, or any combination thereof. The cooking appliance can also adapt the cooking logic to user-related information, such as preferences entered by the user of learned by the cooking appliance based on prior user activity. For example, if a user selects a level of doneness (e.g., medium rare) but provides feedback to the cooking appliance after the cook indicating that the user desired a different outcome (e.g., feedback through a user interface that the recipe was overcooked; manually instructing the cooking appliance to cook a meat for a longer period of time) then the cooking appliance can adjust the cooking logic to automatically provide the user with the desired result.

The cooking recipe can include one or more heating logic sequences represented as state machines. The cooking recipe can be the cooking recipe designed and published in the method 2100. At sub-step 2206, in response to executing the cooking recipe, the cooking appliance can determine which portion of the heating logic specified in the cooking recipe to use. For example, the cooking recipe can specify one or more meal kit package identifiers associated with one or more heating logic sequences. The cooking appliance can detect, via a camera of the cooking appliance, an optical label of the food target in the cooking appliance. The cooking appliance can match the optical label against the meal kit package identifiers (if any) to select a corresponding heating logic sequence (e.g., with a corresponding state machine). The cooking appliance can execute the corresponding heating logic sequence.

The cooking recipe can specify two or more operation modes and two or more heating logic sequences associated with the operation modes. For example, the operation modes can include a low stress mode and a high speed mode. The high speed mode requires an operating user of the cooking appliance to extract a food target from the cooking appliance at a specific time determined by the heating logic sequence. The low stress mode corresponds to a heating logic sequence that enables a range of time during which the operating user can extract the food target without overcooking or undercooking the food target.

In some embodiments, the heating logic can specify an exception catching logic that monitors one or more sensor feeds, one or more user signals, one or more timers, or any combination thereof, to determine whether an unexpected event has occurred during said executing of the cooking recipe. The cooking appliance can execute the exception catching logic to recover from the unexpected event.

In some embodiments, the cooking recipe specifies one or more heating logic configuration parameters to retrieve from an operating user. In these embodiments, when executing the cooking recipe, the cooking appliance can prompt, via an output component or a network interface of the cooking appliance, the operating user to enter the heating logic configuration parameters. The cooking appliance can receive, via an input component or the network interface, user input associated with the heating logic configuration parameters.

At sub-step 2208, the cooking appliance can configure one or more heating elements of the cooking appliance in accordance with an initial state of the state machine. At sub-step 2210, the cooking appliance can detect a state change based on one or more sensor feeds, one or more timers, one or more user signals, or any combination thereof. At sub-step 2212, the cooking appliance can reconfigure at least one of the heating elements of the cooking appliance in response to the state change according to the state machine. In some embodiments, the cooking appliance can reconfigure the heating elements based on the exception catching logic to recover from the unexpected event.

During said executing of the cooking recipe, at step 2214, the cooking appliance can record data from one or more sensor feeds, one or more user signals, or any combination thereof, relative to the one or more timers. At step 2216, the cooking appliance can prompt for user feedback after said executing of the cooking recipe. At step 2218, the cooking appliance can send the tracked sensor data and the user-specific information, including the user feedback and other user-related information determined by the cooking appliance, to a server system for analysis. In various embodiments, the cooking appliance can also (or alternatively) maintain and analyze user-specific information.

Figure 23:
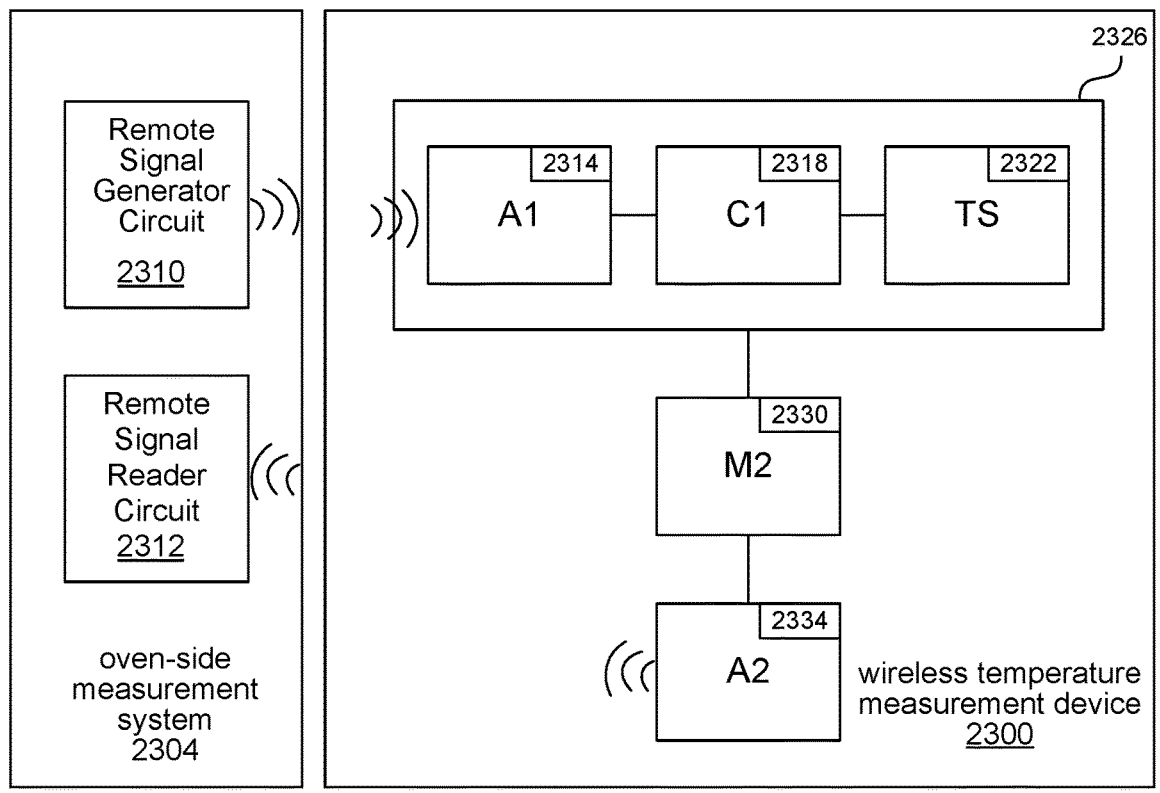
FIG. 23 is a block diagram illustrating a wireless temperature measurement device in communication with a cooking appliance, in accordance with various embodiments.
Figure 30:
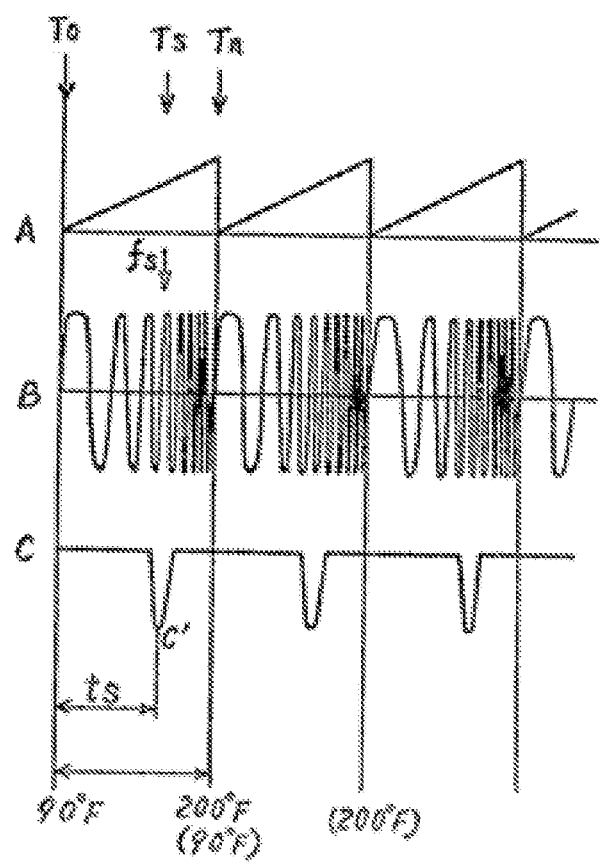
FIG. 30 is a graph diagram illustrating signal generator waveform for various embodiments of a remote signal generator circuit.

FIG. 23 is a block diagram illustrating a wireless temperature measurement device 2300 (e.g., the temperature probe 1010 or the temperature 1100) in communication with a cooking appliance 2304 (e.g., the cooking appliance 100A or the cooking appliance 100B), in accordance with various embodiments. For example, the cooking appliance 2304 can include a remote signal generator circuit 2310 and a remote signal reader circuit 2312. The remote signal generator circuit 2310 can generate an excitation signal at varying frequencies periodically such that a first antenna 2314 of the wireless temperature measurement device 2300 can receive the excitation signal. Waveform B of FIG. 30 depicts one possibility of such an excitation signal. FIG. 30 is a graph diagram illustrating signal generator waveform for various embodiments of a remote signal generator circuit (e.g., the remote signal generator circuit 2310).

In this embodiment, a passive analog circuit 2318, coupled to the first antenna 2314 and a temperature sensitive element 2322 forms a first antenna assembly 2326 that is configured to receive signals generated from the remote signal generator circuit 2310. The first antenna assembly 2326 is configured so that it receives the excitation signals with different efficacy depending on the excitation signal's frequency. That is, the temperature sensitive element 2322 can change the resonant frequency of the passive analog circuit 2318 depending on ambient temperature. By configuring the first antenna assembly 2326 to have its resonant frequency change with temperature, the first antenna assembly 2326 is most effective at receiving energy when the signal generated by the remote signal generator circuit 2310 matches the resonant frequency of the first antenna assembly 2326.

At this point, it is sufficient for the remote signal reader circuit 2312 to determine the temperature of the wireless temperature measurement device 2300. The remote signal reader circuit 2312 can measure scattering parameters (S-parameters) from the wireless temperature measurement device 2300 to determine the most effective absorbed frequency of the first antenna assembly 2326, which in turn, can yield the desired temperature reading from the wireless temperature measurement device 2300. S-parameters (e.g., the elements of a scattering matrix or S-matrix) describe the electrical behavior of linear electrical networks when undergoing various steady state stimuli by electrical signals.

Measuring the S-parameter from a transmitter may be relatively expensive may lack reliability. The S-parameters are less reliable because it works by detecting how much energy is absorbed by the resonant circuit in the first antenna assembly 2326. However, there are many ways for radio frequency energy to be absorbed. For example, different humidity, current geometry of the cooking vessel in question, proximity of human beings and other radiofrequency absorbing geometries.

To disambiguate absorption by environmental reasons or absorption by the resonant circuit, several embodiments of the wireless temperature measurement device 2300 include an additional frequency multiplier 2330 and a second antenna 2334. The frequency multiplier 2330 and the second antenna 2334 to produce more reliable measurement for temperature because the signal (e.g., indicative of a real-time temperature reading) transmitted back to the remote signal reader circuit 2312 would be out of band from the remote signal generator circuit 2310. Instead of detecting energy absorbed by the resonant circuit, the remote signal reader circuit 2312 can be configured to detect a peak second frequency, which is a multiple of the first frequency first absorbed by the first antenna assembly 2326.

When the first frequency produced by the remote signal generator circuit 2310 matches the resonance frequency of the first antenna assembly 2326, the energy absorption would be very efficient, causing the second frequency to be emitted with considerably higher strength. The remote signal reader circuit 2312 can then use the relative strength of the second frequency to determine the temperature of the wireless temperature measurement device 2300.

Figure 24:
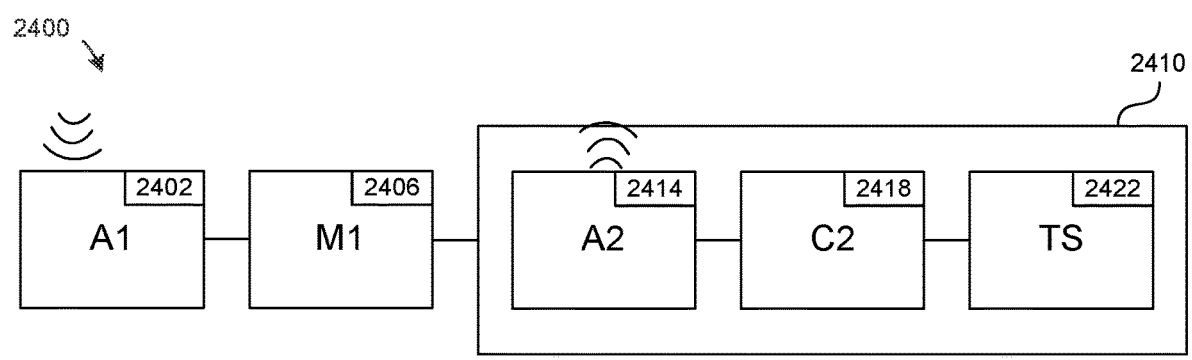
FIG. 24 is a block diagram illustrating at least one embodiment of a wireless temperature measurement device.

FIG. 24 is a block diagram illustrating at least one embodiment of a wireless temperature measurement device 2400 (e.g., the temperature probe 1010 or the temperature 1100). The wireless temperature measurement device 2400 can replace the wireless temperature measurement device 2300 of FIG. 23 and work with the cooking appliance 2304 of FIG. 23. In FIG. 24, a first antenna 2402 is neither coupled to a temperature sensitive element and nor to a passive analog circuit that would modified its resonant frequency based on temperature. Instead, electromagnetic energy from the remote signal generator circuit 2310 (not shown in FIG. 24) is directly absorbed by the first antenna 2402 and multiplied, by a frequency multiplier 2406, before the multiplied signal is fed into a second antenna assembly 2410.

The second antenna assembly 2410 can include a second antenna 2414, a passive analog circuit 2418 (e.g., similar to the passive analog circuit 2318), and a temperature sensitive element 2422 (e.g., similar to the temperature sensitive element 2322).

In this embodiment, electromagnetic energy is absorbed by the first antenna 2402 with similar efficiency as the first antenna 2314 of FIG. 23 and multiplied. The coupling between the frequency multiplier 2406 and the second antenna assembly 2410 is configured such that if the resonant frequency of the second antenna assembly 2410 matches the signal frequency output from the frequency multiplier 2406, transmission of energy can be efficient. The inverse is true if the output frequency from the frequency multiplier 2406 does not match the resonant frequency of the second antenna assembly 2410. From the observation point of the remote signal reader circuit 2312 of FIG. 23, the wireless temperature measurement device 2400 of FIG. 24 can behave similarly to the wireless temperature measurement device 2300 of FIG. 23.

Figure 27:
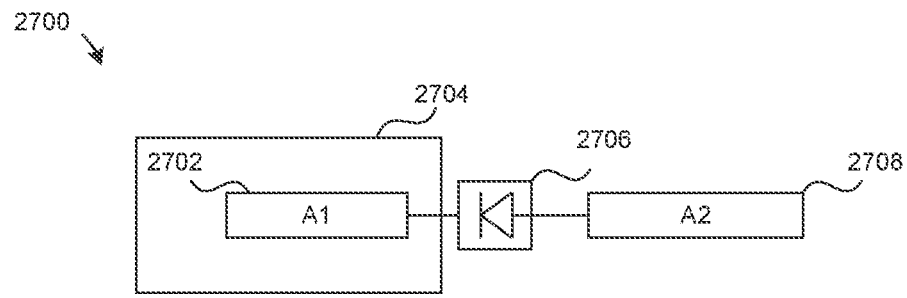
FIG. 27 is a block diagram illustrating at least one embodiment of a wireless temperature measurement device.

FIG. 27 is a block diagram illustrating at least one embodiment of a wireless temperature measurement device 2700. The wireless temperature measurement device 2700 can be the wireless temperature measurement device 2300 or the wireless temperature measurement device 2400. In these embodiments, a first antenna 2702 can represent the first antenna 2302 or the second antenna 2414. A first antenna assembly 2704 can represent the first antenna assembly 2326 or the second antenna assembly 2410. A diode 2706 can be coupled to the first antenna assembly 2704 and a second antenna 2708 respectively on its terminals. The diode 2706 can represent the frequency multiplier 2330 or the frequency multiplier 2406. The second antenna 2708 can be the second antenna 2334 of FIG. 23 or the first antenna 2402 of FIG. 24.

Figure 28:
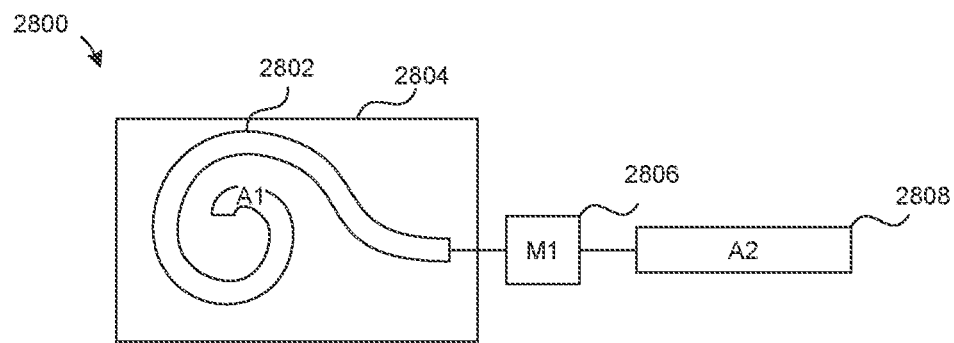
FIG. 28 is a block diagram illustrating at least one embodiment of a wireless temperature measurement device.

FIG. 28 is a block diagram illustrating at least one embodiment of a wireless temperature measurement device 2800. The wireless temperature measurement device 2800 is similar to the wireless temperature measurement device 2700, except for that a first antenna 2802 has a spiral shape. The first antenna 2802 can function the same as the first antenna 2702. A first antenna assembly 2804 can function the same as the first antenna assembly 2704. A diode 2806 can function the same as the diode 2706. A second antenna 2808 can function the same as the second antenna 2708.

In various antenna-diode-antenna embodiments, the first antenna (e.g., the first antenna 2702 or the first antenna 2802) is adapted with a geometry and material such that the first antenna is temperature sensitive and its resonant frequency varies with temperature. The function of the frequency multiplier 2330 can be served by a single diode (e.g., the diode 2706 and/or the diode 2806). In these embodiments, the remote signal generator circuit 2310 excites the first antenna 2702 or the first antenna 2802 of the wireless temperature measurement device 2700 or the wireless temperature measurement device 2800 with varying first frequencies. The wireless temperature measurement device 2700 or the wireless temperature measurement device 2800 can then reemit the received energy in a second varying frequency which is a multiple (e.g., double) of the first frequency from the second antenna 2708 or the first antenna 2802.

Figure 29:
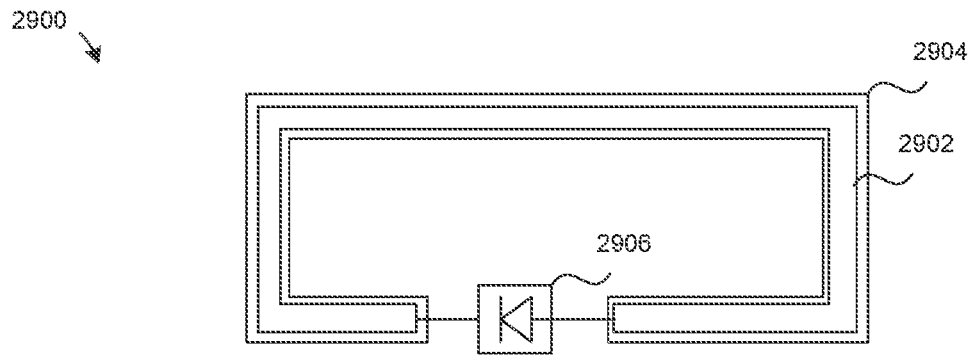
FIG. 29 is a block diagram illustrating at least one embodiment of a wireless temperature measurement device.

FIG. 29 is a block diagram illustrating at least one embodiment of a wireless temperature measurement device 2900. The wireless temperature measurement device 2900 is similar to the wireless temperature measurement device 2700, except for that both an antenna 2902 and an antenna assembly 2904 are coupled to both terminals of a diode

2906. The antenna 2902 can function the same as the first antenna 2702. The antenna assembly 2904 can function the same as the first antenna assembly 2704. A diode 2806 can function the same as the diode 2706. The antenna 2902 can also function the same as the second antenna 2708. This can be done because the diode 2906 acts as a frequency multiplier, and thus prevents interference between the signal received on one end of the diode 2906 and the signal transmitted through another end of the diode 2906.

Figure 25:
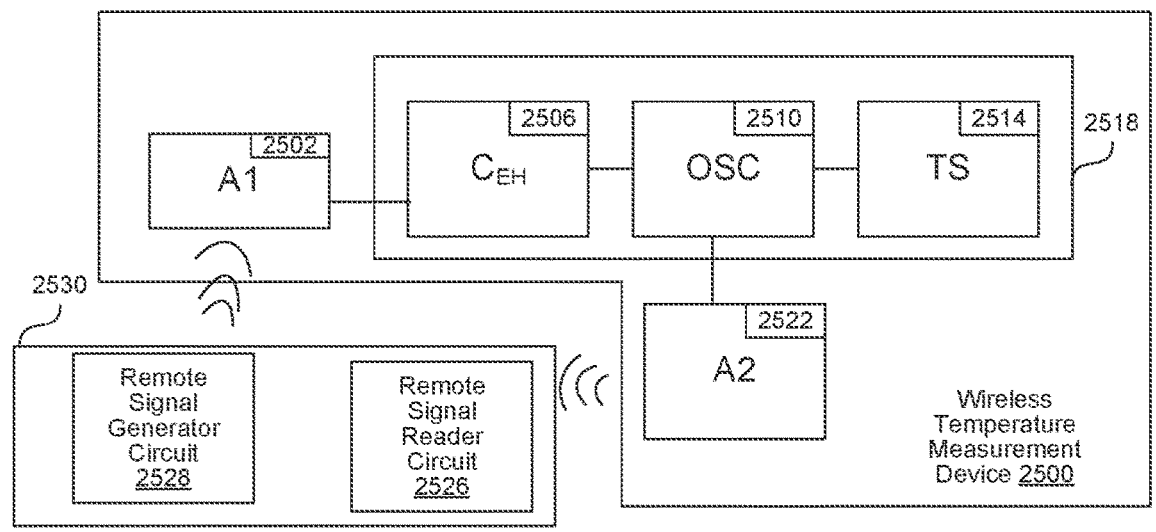
FIG. 25 is a block diagram illustrating at least one embodiment of a wireless temperature measurement device in communication with a cooking appliance 2530.

FIG. 25 is a block diagram illustrating at least one embodiment of a wireless temperature measurement device 2500 (e.g., the temperature probe 1010 or the temperature 1100) in communication with a cooking appliance 2530. FIG. 25 represents at least one embodiment of the wireless temperature measurement device 2500 where a first antenna 2502 can be used for the purpose of powering the device. The first antenna 2502 is coupled to a temperature sensitive radiofrequency generator 2518. A power harvesting circuit 2506 receives power from the first antenna 2502 and delivers power to an oscillator 2510, which generates a different frequency of signal based on temperature measured by a temperature sensitive element 2514. In some embodiments, the first antenna 2502 is configured to receive electromagnetic radio power. In some embodiments, the first antenna 2502 is configured to receive induction power. The oscillator 2510, the power harvesting circuit 2506, and the temperature sensitive element 2514 can together be considered as the temperature sensitive radiofrequency generator 2518.

The power harvesting circuit 2506 can contain power conditioning elements, which enable various electromagnetic energy received from the first antenna 2502 to be converted into usable energy for the oscillator 2510. In some embodiments (not shown), instead of electromagnetic energy, the power harvesting circuit 2506 can harvest other types of energy from the ambient environment of the cooking appliance 2530. For example, the power harvesting circuit 2506 can harvest energy from vibration (e.g., piezoelectric power harvesting) or temperature gradients (e.g., Peltier power harvesting).

The signal generated by the temperature sensitive radiofrequency generator 2518 is fed into a second antenna 2522. The second antenna 2522 can transmit/emit the signal from the temperature sensitive radiofrequency generator 2518 for interpretation by a remote signal reader circuit 2526 (e.g., similar to the remote signal reader circuit 2312).

A remote signal generator circuit 2528 in this embodiment does not need to produce a varying frequency signal. The function generated by the remote signal generator circuit 2528 for the first antenna 2502 can be a wireless power generator. The remote signal reader circuit 2526 can be a radio frequency receiver. The remote signal generator circuit 2528 and the remote signal reader circuit 2526 can be part of the cooking appliance 2530 (e.g., the cooking appliance 100A or the cooking appliance 100B). Wireless power from the remote signal generator circuit 2528 can be received by the first antenna 2502 and harvested by the power harvesting circuit 2506. A second signal generated by the oscillator 2510 can be transmitted out of the second antenna 2522 and received by the remote signal reader circuit 2526. The second signal can be used by a computing device of a cooking appliance to determine the temperature of the wireless temperature measurement device 2500 based on the second signal.

Figure 26:
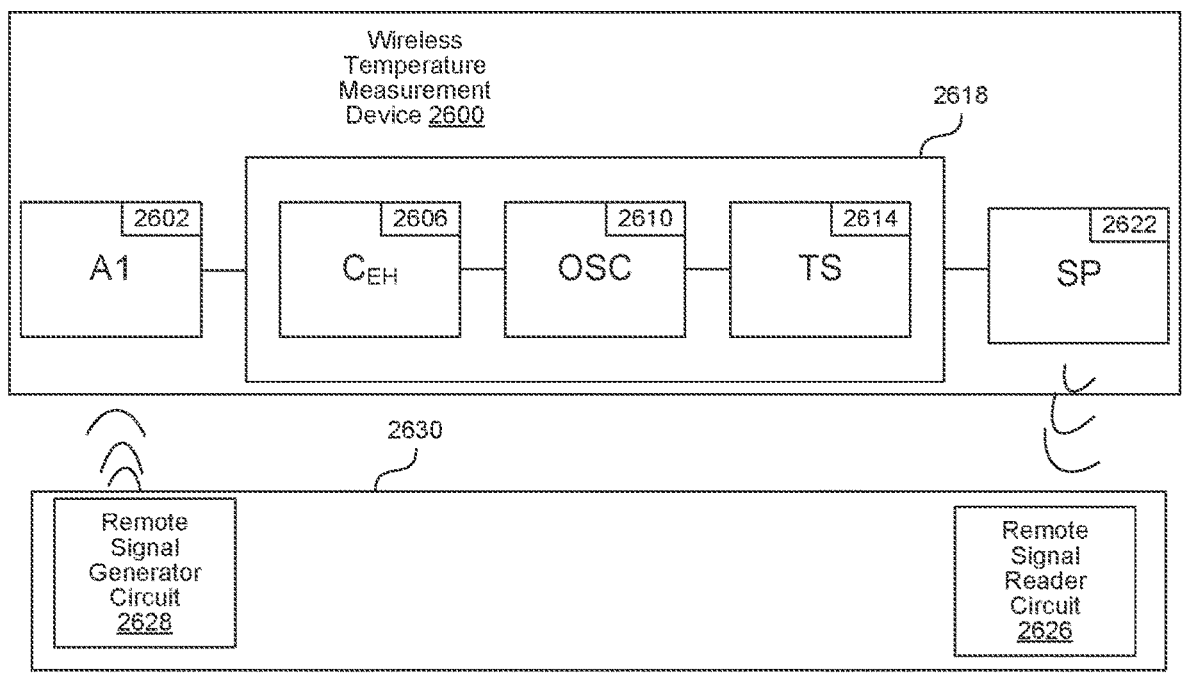
FIG. 26 is a block diagram illustrating at least one embodiment of a wireless temperature measurement device in communication with a cooking appliance.

FIG. 26 is a block diagram illustrating at least one embodiment of a wireless temperature measurement device 2600 (e.g., the temperature probe 1010 or the temperature 1100) in communication with a cooking appliance 2630 (e.g., the cooking appliance 100A or the cooking appliance 100B). The wireless temperature measurement device 2600 can be similar to the wireless temperature measurement device 2500 with the following differences. The wireless temperature measurement device 2600 can include a temperature sensitive audio signal generator 2618 instead of the temperature sensitive radiofrequency generator 2518. The wireless temperature measurement device 2600 can include a first antenna 2602, the temperature sensitive audio signal generator 2618, and a speaker 2622. The temperature sensitive audio signal generator 2618 can include a power harvesting circuit 2606 (e.g., similar to the power harvesting circuit 2506), an oscillator 2610 (e.g., similar to the oscillator 2510), and a temperature sensitive element 2614 (e.g., similar to the temperature sensitive element 2514). However, in the temperature sensitive audio signal generator 2618, the oscillator 2610 is configured to drive the speaker 2622 (e.g., an audio transducer).

A cooking appliance 2630 (e.g., the cooking appliance 100A or the cooking appliance 100B) can power and read temperature information from the wireless temperature measurement device 2600. For example, the cooking appliance 2630 can include a remote signal generator circuit 2628 for generating a power signal to be harvested by the power harvesting circuit 2606. The cooking appliance 2630 can include a remote signal reader circuit 2626 that includes a microphone. The remote signal reader circuit 2626 and/or a computing device of the cooking appliance 2630 can analyze the audio signal received from the speaker 2622 to determine temperature information transmitted by the wireless temperature measurement device 2600.

FIG. 31 is a perspective view of at least an embodiment of a temperature probe 3100. For example, the temperature probe 3100 can be the temperature probe 1100 or the temperature probe 1200. The temperature probe 3100 can include a probe body 3102 (e.g., similar to the probe body 1102), a handle 3104 (e.g., similar to the handle 1140), a cable 3106 (e.g., similar to the cable 1106), an insertion aid 3110 (e.g., similar to the insertion aid 1136), and a tray connector 3114 (e.g., similar to the tray attachment mechanism 1130). The insertion aid 3110 includes holes within its surface. This feature advantageously enables a finer depth control when inserting the temperature probe 3100 due to the larger surface area. The holes in its surface further enables heated air and radiation from the heating elements of a cooking appliance (e.g., the cooking appliance 100) to pass through the insertion aid 3110 without obstruction.

FIG. 32A is a side view of the temperature probe 3100 of FIG. 31 with the insertion aid 3110 at a first position. FIG. 32B is a side view of the temperature probe 3100 of FIG. 31 with the insertion aid 3110 at a second position.

Figure 33:
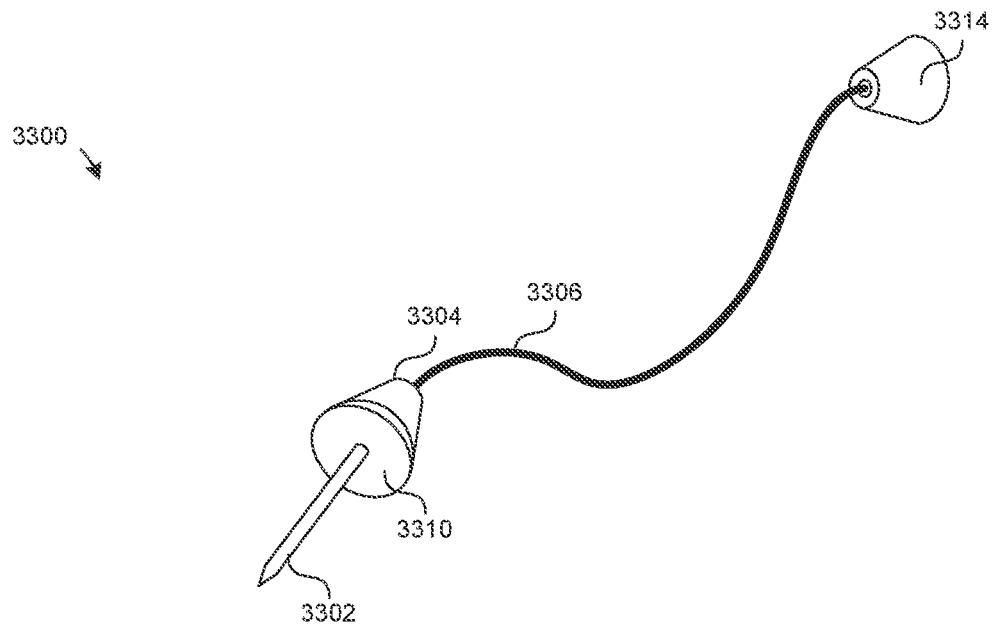
FIG. 33 is a perspective view of at least an embodiment of a temperature probe.
Figures 34A, 34B:
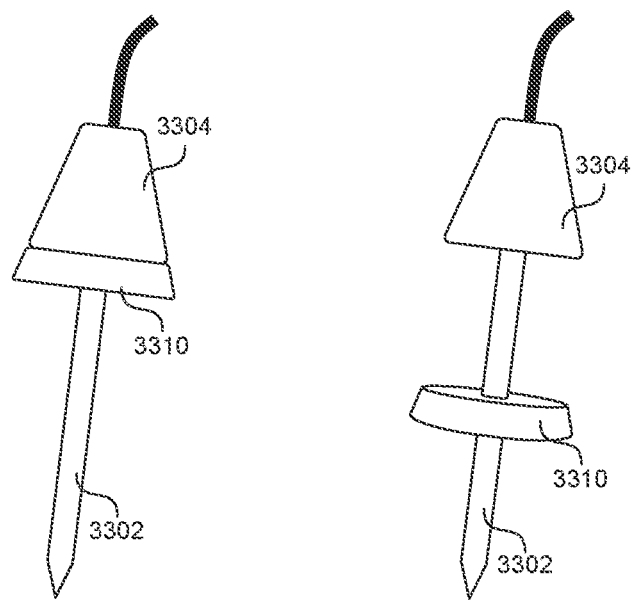
FIG. 34A is a side view of the temperature probe of FIG. 33 with the insertion aid at a first position.
FIG. 34B is a side view of the temperature probe of FIG. 33 with the insertion aid at a second position.

FIG. 33 is a perspective view of at least an embodiment of a temperature probe 3300. For example, the temperature probe 3300 can be the temperature probe 1100 or the temperature probe 1200. The temperature probe 3300 can include a probe body 3302 (e.g., similar to the probe body 1102), a handle 3304 (e.g., similar to the handle 1140), a cable 3306 (e.g., similar to the cable 1106), an insertion aid 3310 (e.g., similar to the insertion aid 1136), and a tray connector 3314 (e.g., similar to the tray attachment mechanism 1130). FIG. 34A is a side view of the temperature probe 3300 of FIG. 33 with the insertion aid 3310 at a first position. FIG. 34B is a side view of the temperature probe 3300 of FIG. 33 with the insertion aid 3310 at a second position.

Figure 35:
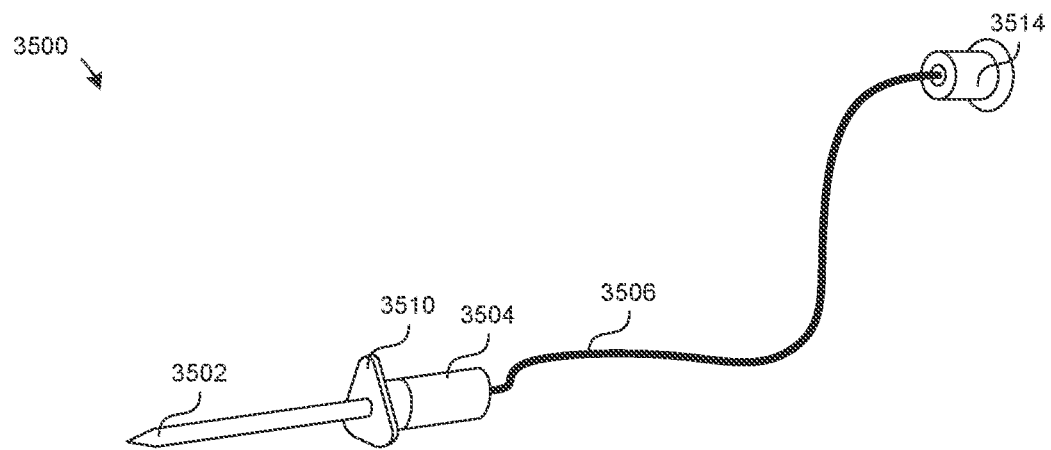
FIG. 35 is a perspective view of at least an embodiment of a temperature probe.
Figures 36A, 36B:
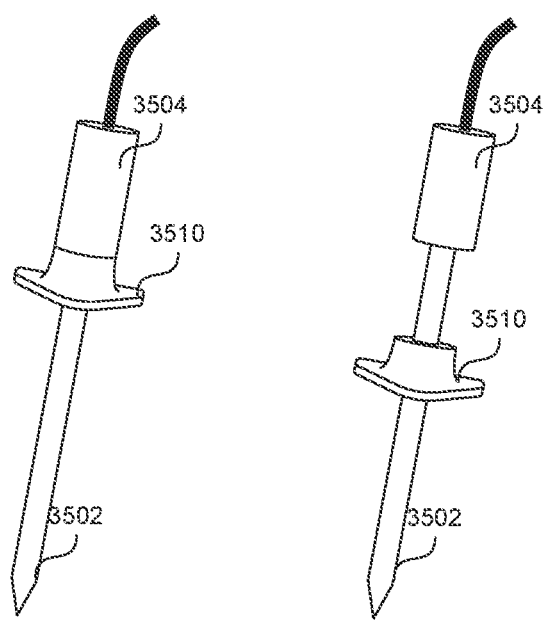
FIG. 36A is a side view of the temperature probe of FIG. 35 with the insertion aid at a first position.
FIG. 36B is a side view of the temperature probe of FIG. 35 with the insertion aid at a second position.

FIG. 35 is a perspective view of at least an embodiment of a temperature probe 3500. For example, the temperature probe 3500 can be the temperature probe 1100 or the temperature probe 1200. The temperature probe 3500 can include a probe body 3502 (e.g., similar to the probe body 1102), a handle 3504 (e.g., similar to the handle 1140), a cable 3506 (e.g., similar to the cable 1106), an insertion aid 3510 (e.g., similar to the insertion aid 1136), and a tray connector 3514 (e.g., similar to the tray attachment mechanism 1130). FIG. 36A is a side view of the temperature probe 3500 of FIG. 35 with the insertion aid 3510 at a first position. FIG. 36B is a side view of the temperature probe 3500 of FIG. 35 with the insertion aid 3510 at a second position.

Figure 37:
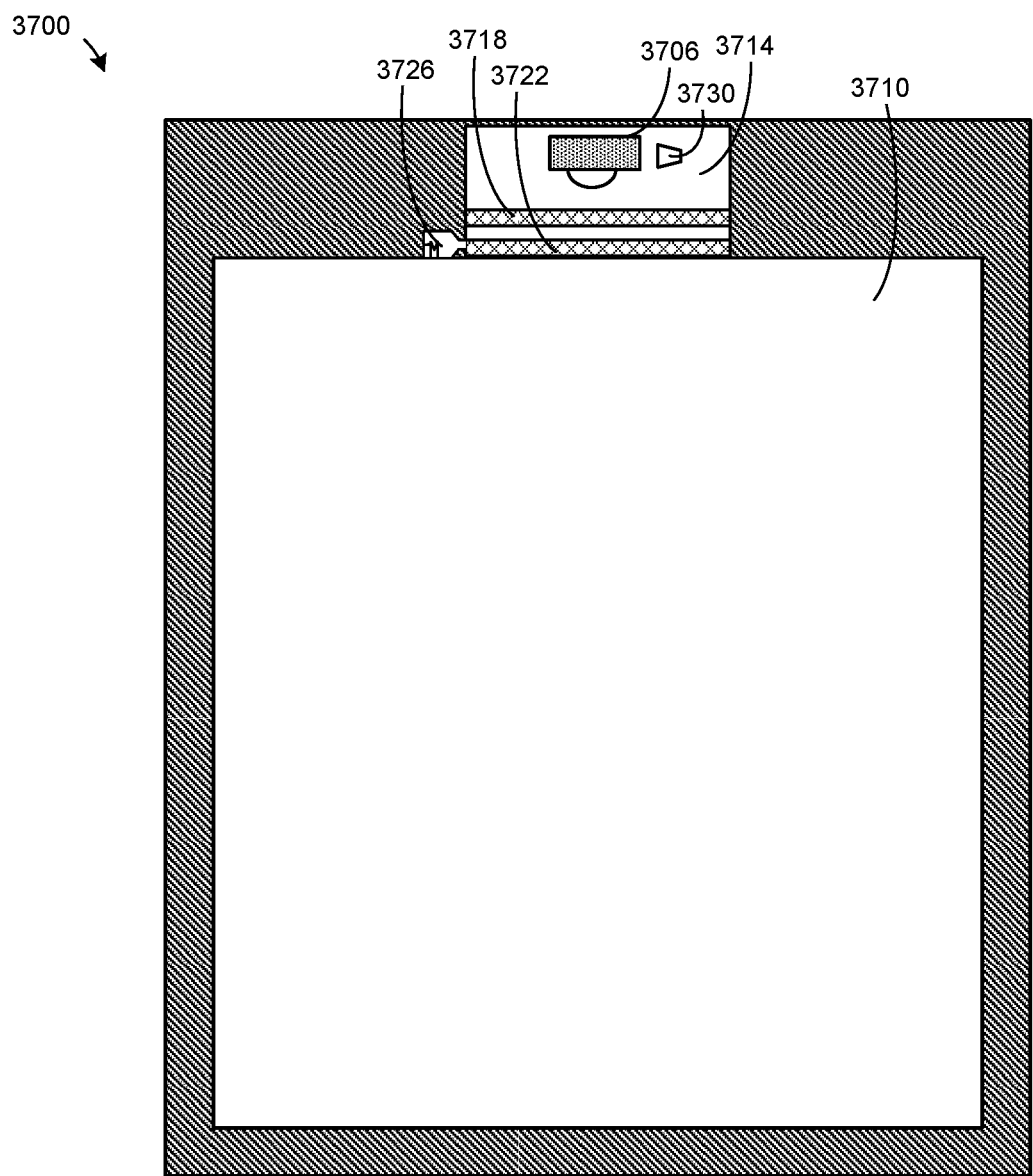
FIG. 37 is a cross-sectional view of a chamber of a cooking appliance with an in-oven camera, in accordance with various embodiments.

FIG. 37 is a cross-sectional view of a cooking appliance 3700 with an in-oven camera system 3706, in accordance with various embodiments. The in-oven camera system 3706 can be attached to the interior of a main chamber 3710. In some embodiments, the in-oven camera system 3706 includes a single camera. In some embodiments, the in-oven camera system 3706 includes multiple cameras. The in-oven camera system 3706 can include an infrared sensor.

In the illustrated embodiment, the in-oven camera system 3706 is encased within a secondary chamber 3714 separated from the main chamber 3710. In some embodiments, the secondary chamber 3714 can be separated from the main chamber 3710 via a double pane window. The double pane window can include a first glass pane 3718 and a second glass pane 3722. The first glass pane 3718 can be integral to the interior wall of the secondary chamber 3714. The second glass pane 3722 can be integral to the interior wall of the main chamber 3710. The first glass pane 3718 and the second glass pane 3722 can be separated by trapped air or vacuum. In some embodiments, the cooking appliance 3700 includes a heating system 3726 to heat the second glass pane 3722 to prevent condensation. In some embodiments, the heating system 3726 is part of heating elements (e.g., the heating elements 114A and 114B) of the cooking appliance 3700. In some embodiments, the heating system 3726 is independent of the heating elements. The heating system 3726 advantageously prevents condensation/fog from obscuring the view of the in-oven camera system 3706.

In some embodiments, the cooking appliance 3700 includes a cooling system 3730. For example, the cooling system 3730 can be a forced air cooling fan, a compressor, a Peltier cooler, or any combination thereof. The cooling system 3730 can be disposed within the secondary chamber 3714 (as illustrated) or in the main chamber 3710 (not shown). In embodiments where the cooling system 3730 is the main chamber 3710, the cooling system 3730 can be directed toward the location adjacent to the secondary chamber 3714.

Figure 38:
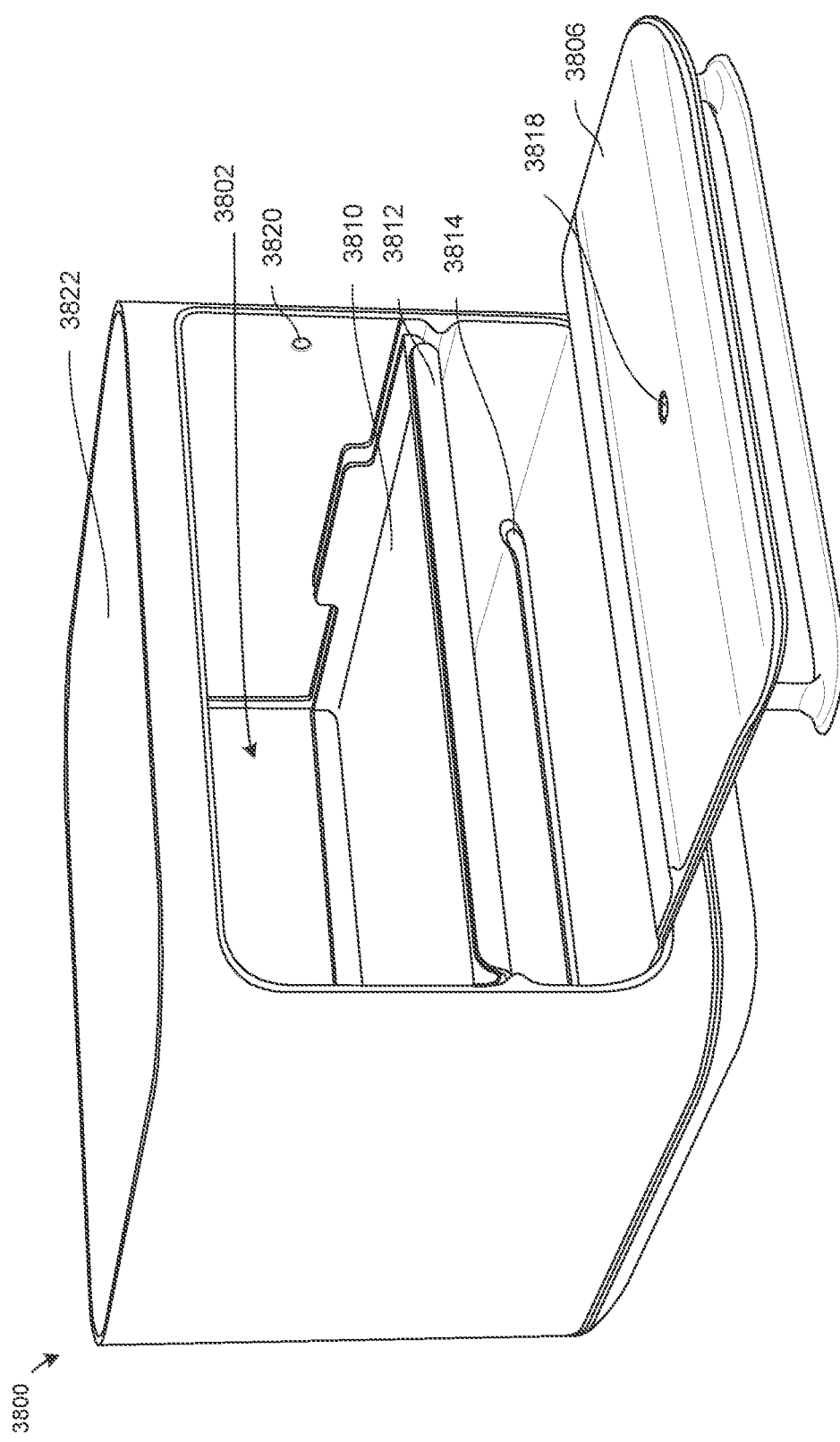
FIG. 38 is a perspective view of a cooking appliance, in accordance with various embodiments.

FIG. 38 is a perspective view of a cooking appliance 3800, in accordance with various embodiments. The cooking appliance 3800 includes a chamber 3802, a door 3806, an oven tray 3810, an oven rack 3812, a light engine 3814, a camera 3818, a probe connector 3820, and a display 3822. The chamber 3802 can be the chamber 102. The door 3806 can be the door 106. The oven tray 3810 can be the cooking platform 110. The oven tray 3810 can be supported by the oven rack 3812. The light engine 3814 can be one of the heating elements 114A or 114B. The camera 3818 can be the camera 118A or the camera 118B. The display 3822 can be the display 122A or 112B. The probe connector 3820 can couple with a temperature probe (e.g., the temperature probe 1100 via the tray attachment mechanism 1130).

Figure 39:
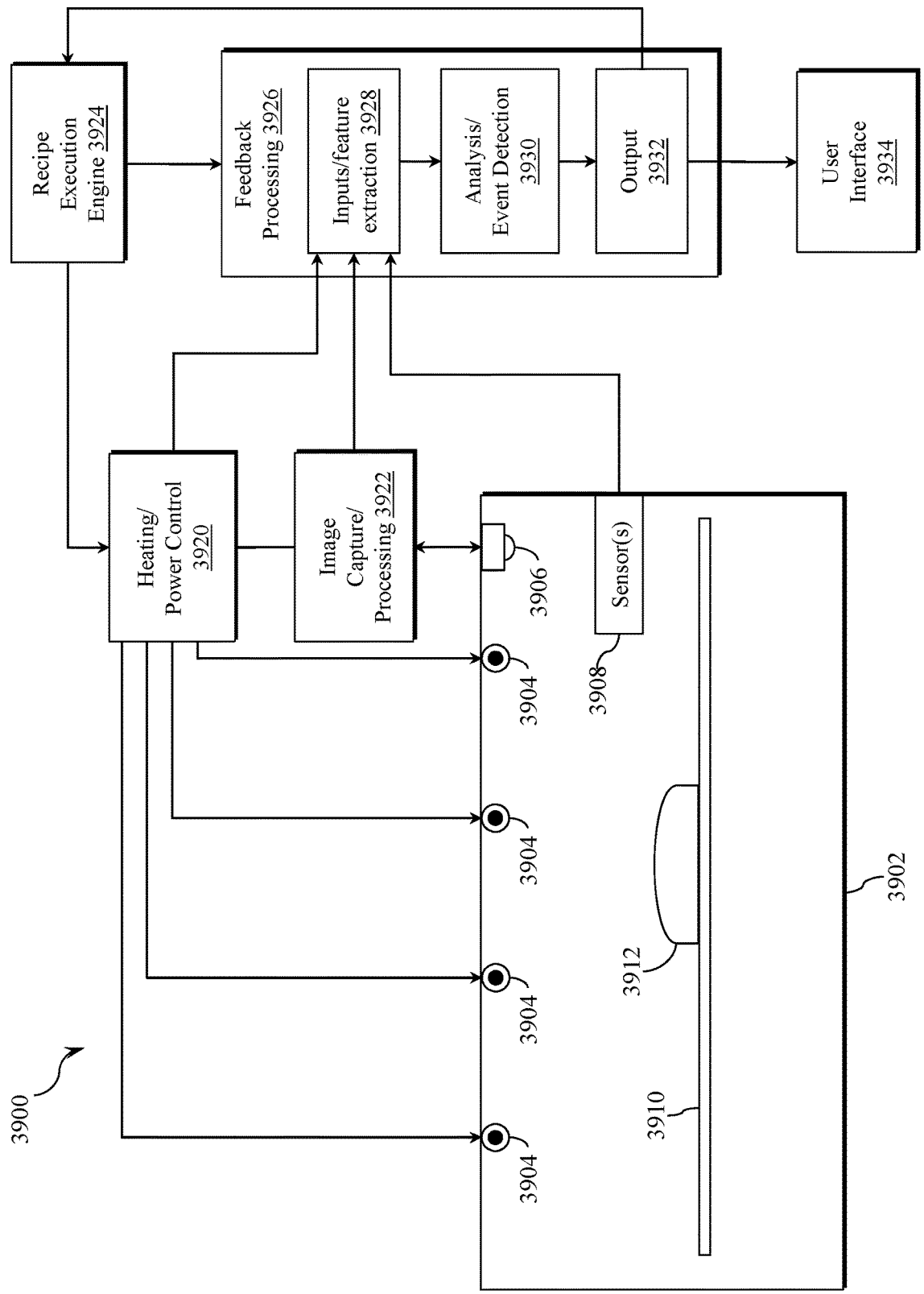
FIG. 39 is a block diagram illustrating a cooking appliance, in accordance with various embodiments.

Referring to FIGS. 39-41, various embodiments of systems and methods for utilizing an in-oven camera will now be described. In various embodiments a light source may be provided in cooking chamber for purposes of image acquisition. However, the heating elements implemented in various embodiments of the present disclosure also generate light, which presents many problems for image acquisition and analysis for in-oven cameras. In various embodiments, the light generated by the heating elements sufficiently illuminate the oven chamber for image acquisition, allowing the dedicated light source to be omitted. In some embodiments, individual heating elements may be selectively activated for short time durations during recipe execution, may undergo continuous variation in power level, and may be selectively powered across a range of emission frequencies/wavelengths (e.g., from visible to infrared light). As a result, the lighting conditions inside the cooking chamber are continually changing during execution of a recipe, which affects the captured image. For example, applying a high power level to a heating element can produce intense light, and rapidly adjusting the power levels will cause corresponding fluctuations in the emitted light. In some embodiments, the spectrum of light emitted may be weighted towards certain colors. In some embodiments, the spectra of light emitted may vary rapidly between certain colors. In some embodiments, the light may be weighted towards certain intensities, and in some embodiments, the light emitted may vary rapidly between intensities.

Conventional image adjustments, such as white balancing and brightness adjustments, are not sufficient to correct for the varying light environment skewed spectrum in the cooking chamber of the present disclosure. A common white balancing approach is the "gray world" assumption, which assumes that every image scene is, on average, a neutral gray. This and similar assumptions may be invalid in the context of imaging within an interior of a cooking chamber where the extreme shifts in lighting power and color affect the resulting image.

Producing a clean and accurate image may be valuable to many cooking contexts. In some embodiments, the in-oven camera may be used to provide an image stream to a user during recipe execution. The user may need accurate image, color and brightness to assess the progress of the recipe. In some embodiments, camera images may be analyzed by the recipe execution engine or other computing components to provide information on the cooking progress and environmental conditions and events before, during and after recipe execution. Having detailed and accurate images may be critical for accurate and reliable image analysis. For example, the recipe engine may monitor the doneness of toast during execution by analyzing the changing color of the toasting bread (e.g., from white to brown). If the image is too bright, too dark or the color is off, then the image analysis will likely be inaccurate and the recipe execution engine may produce an undesirable result.

FIG. 39 is a functional block diagram illustrating various embodiments of a cooking appliance having an in-oven camera. A cooking appliance 3900 includes a cooking chamber 3902 having at least one heating element 3904, at least one in-oven camera 3906, optional sensor(s) 3908, a cooking tray 3910 (or other cooking surface) and a food item 3912 to be cooked. The cooking appliance 3900 further includes a plurality of functional processing components which may be implemented in a computing device (such as computing device 206 described herein) having a processor, memory and/or other hardware and software components. In the illustrated embodiment, functional processing components include heating and power control components 3920, image capture and processing components 3922, a recipe execution engine 3924, feedback processing components 3926 and a user interface 3934.

It will be appreciated that FIG. 39 provides a high level, functional view of a cooking appliance for purpose of illustrating various aspects of the present disclosure, and that the embodiments described herein are not limited to a particular hardware, software or processing configuration, or cooking chamber contents or configuration. For example, one or more functions may be integrated in a single physical device or a software module in a software product, or a function may be implemented in separate physical devices or software modules, without departing from the scope and spirit of the present disclosure. In various embodiments, the processing components of FIG. 39 may be implemented using the hardware and software previously described herein, for example computing device 206 and memories 210 and 214 of FIG. 2.

In operation, the recipe execution engine 3924 executes a heating algorithm to cook the food item 3912. The heating algorithm instructs the heating/power control components 3920 to selectively activate one or more of the heating elements 3904 to cook the food item to achieve a desired result. The feedback processing components may receive captured images from the image capture/processing components 3922, data from other sensors 3908, information about the recipe and cooking status from the recipe execution engine 3924 and/or other data as available to the cooking appliance 3900. The data is received, features are extracted (input/feature extraction component 3928) and analyzed to determine a property, status or event (analysis/event detection components 3930).

In various embodiments, the analysis may be performed using one or more neural networks and/or algorithms. For example, a heating sensor input may be converted to an appropriate scale (Fahrenheit or Celsius) and directly compared to a threshold. Image analysis may be performed, for example, through a process that includes feature extraction (e.g., converting image pixel information to a higher level subset of features for input to the neural network such as through blob detection, edge detection, and other image processing techniques), input of features to a trained neural network, and classification and labeling of the image (e.g., a food property such as food height, status information such as progress of a cook, or an event such as smoke in the chamber). The results may be output (3932) to relevant components of the cooking appliance 3900, including providing feedback to the recipe execution engine 3924 and/or user through a user interface 3934.

In various embodiments, one or more of the processing components are operable to model the light spectrum illuminated by the heating elements 3904. For example, the recipe execution engine 3924 can be configured to select and execute a heating algorithm associated with one or more food profiles or recipes. The heating algorithm may selectively activate one or more of the heating elements 3904 to emit various excitable wavelengths and/or at various powers to cook the meal. In some embodiments, the color temperature and/or power of light emitted by a heating element may be determined from the instantaneous or historical electrical power pumped into each heating element, the material properties of each heating element (e.g., tungsten lamp), the surface area each heating element and other properties of each heating element. In operation, the image capture/processing components 3922 capture an image from inside the chamber 3902 and adjust the image by balancing the image in accordance with the measured or inferred emitted color temperature, brightness and/or other parameters. In some embodiments, the chamber 3902 may be illuminated by a plurality of heating elements, each of which may separately affect the color temperature and/or power of light inside the chamber 3902 at a particular time.

Various embodiments of a process 4000 for image capture and processing will now be described with reference to FIG. 40. First, in step 4002, one or more of the processing components initiates an image capture sequence. For example, the recipe execution engine 3924 may track the progress of a recipe by analyzing images periodically captured by the in-oven camera 3906 at various times during the cook. As another example, a user may activate the image capture sequence through a user interface to visually track the progress of the cook by viewing images captured by the in-oven camera 3906.

In step 4004, the heating algorithm is paused and the heating/power control components 3920 control one or more of the heating elements to an image capture state. In some embodiments, the heating elements are driven to a certain temperature by applying an appropriate amount of power to the heating element. In this manner, the interior of the chamber 3902 will be consistently illuminated during image acquisition, and the captured image may be adjusted for accurate processing.

The image acquisition process may include sending a signal to drive a filament of a heating element to a certain temperature, waiting for the heating element temperature to stabilize around the desired imaging temperature and then acquiring the image while the imaging temperature is stabilized. For example, a tungsten filament will increase in temperature as more power is received, thus increasing the temperature of the filament, the power of the emitted light and the emitted peak wavelengths/frequencies. In various embodiments, the in-oven camera 3906 is synchronized to capture an image when the heating element reaches a desired temperature (steps 4006 and 4008). In one or more embodiments, the image capture and processing components 3922 estimate how long it takes for a heating element to heat up to a desired temperature and then wait for a corresponding amount of time (e.g., 1 second) before capturing the image. In one embodiment, when the heating elements reach a stabilized temperature, a signal is sent from the heating control process components to the image acquisition process components. After image capture, the heating algorithm is resumed (step 4010) to continue with the cook. In various embodiments, steps 4004 through 4010 may be processed efficiently (e.g., in less than 1-2 seconds depending on the system configuration) to minimize the time that the cooking algorithm is paused. One skilled in the art will appreciate that spectral power distribution, and specifically peak wavelength, are related to heating element (specifically, the filament in the heating element) temperature by Planck's law. In addition, in some embodiments, the power output of the heating element (specifically, the filament) is related to the temperature of the heating element (specifically, the filament) through the Stefan-Boltzmann law due to physical properties of the heating element (specifically, the filament).

By driving the heating element to a particular temperature before image acquisition, a baseline color temperature and brightness for the chamber 3902 is used, allowing the captured image to be adjusted (step 4010) for consistent image processing results. In this manner, a user visually tracking the image will see a consistent and accurate image of the food, and the image processing components will receive images having a consistent color and brightness for processing.

The image acquisition and processing components may further include imaging known color points to adjust the captured image (step 4012). For example, heating elements with reflective coatings may provide a color point. In other embodiments, specific markers may be installed in the chamber 3902 to act as known color points and/or camera components such as gaskets may be processed as known color points. In various embodiments, the captured image is adjusted to the known illumination spectrum generated by the heating elements, allowing for direct measurement and adjustment against one or more known color points.

Advantages of the methods disclosed herein for image capture will be apparent to those skilled in the art. During operation of the cooking appliances disclosed herein, color temperature, brightness and other factors can change very rapidly during cooking resulting in wide variations in the quality of captured images, which can negatively impact a user's visual inspection of the food and image processing during a cook or negatively impact algorithms that use captured images as part of their input. Heating and power control algorithms may cycle through heating elements (e.g., power each heating element for 5 seconds), and drive the heating elements to emit energy at different wavelengths and powers (e.g., a higher-frequency and power and shorter peak emission wavelength for searing; lower-frequency and power and longer peak emission wavelength for heating an inner portion of a food item). By driving the heating elements to a known state, a consistent color temperature is generated for image capture. In various embodiments, a steady state may be reached when the heating element is driven to a certain power level (e.g., 90-95% of the desired power level) and maintained at that power level for a desired duration.

In various embodiments, the recipe execution engine can identify potential image acquisition states within a heating algorithm for a particular recipe and synchronize image acquisition to coincide with those states (e.g., through synchronized timing and/or passing a signal/message). It will be appreciated that many heating algorithms may not achieve an acquisition state during operation and that a process, such as process 4000 in FIG. 40, may be implemented for image acquisition.

In various embodiments, the possibly adjusted images from one or more in-oven cameras may be used to determine various geometrical properties of food items in the oven, such as size, shape, thickness, location, and placement density. These and other properties affect heat absorption rates, shading of edible substances by objects in the oven, thermal mass and, ultimately, the cooking results. In one or more embodiments, measurements may be made using two or more cameras to calculate the location of various imaged objects in the three-dimensional space comprising the oven chamber. In another embodiment, structured light such as grid or dot patterns may be projected (e.g., by a laser projected though a diffractive element) onto the food for imaging by the camera. The projected grid allows the contours of the food to be displayed in the image, and the geometric properties of the image can then be calculated (e.g., through triangulation) therefrom.

In various embodiments, a laser emitter or other collimated light source may be placed above the food, for example in the center of a cooking zone, to emit a beam onto the food below when the image is captured. Knowledge of the camera and oven geometry relative to the food allows food height information to be determined from the location of the laser dot on the food within the image.

In some embodiments, markers and/or known physical properties of various components (e.g., rivets, holes, rails) may be installed on the interior of the chamber, on the cooking tray, a temperature probe or other components in the chamber to assist with extrinsic camera calibration and property determination by comparative measurements. For example, markers on the cooking tray can be used to measure the food. A probe, for example, may include stripes etched on the lance, allowing the height and location of food to be measured by analysis of the stripes visible on the image.

Measurements may also be taken using time of flight measurements devices such as LIDAR. For example, a laser may send a pulse towards the food and a sensor can sense the reflection off the food to measure the food height. In another embodiment, one or more sensors can detect the location and properties of the food as it is being placed into the chamber. Measurements, such as using one or more techniques disclosed above, can be used to measure the height and location of the food as it moves into position in the oven. For example, a tray may comprise three cooking zones that sequentially pass into or through a measurement location within the chamber. A measurement for the food in each zone can be taken as the food passes through a location that facilitates measurement. In some embodiments, measurements of the food may also be taken outside of the oven, such as imaging the food from different angles through an app on a camera phone and generating a three-dimensional model of the food from the images.

Image features can be extracted from captured images (components 3928) and analyzed algorithmically, through deep learning, neural networks or other algorithms (components 3930) to analyze a scene. Other indicia of food geometry may include probes and other accessories having certain known shapes or attachments or markers that promote location and orientation detection. In various embodiments, measurements may be determined by providing one or more images and sensor data to a neural network for analysis and/or event detection. For example, the neural network may analyze the image and determine a food height or placement density.

In other embodiments, image capture and analysis may be used to correct user mistakes and protect elements of the cooking system from improper use. Improper placement of food items and trays, using the incorrect accessory or tray can alter, and even ruin, cooking outcomes. When certain components are in close proximity to heater they can be damaged from the intense heat. Image capture and processing algorithms can be used to prevent these issues. In various embodiments, a captured image may be analyzed to detect improper tray placement, improper tray usage, improper accessory usage, probe cable kinking, proximity of probe cable to heaters, detection of broken heaters, food items being placed in incorrect positions on the tray, unexpected food items on the tray, food thickness or piling causing surfaces to be too close to heaters, and/or other issues visible on the captured image.

Image capture and processing can also be used to detect events that may impact cooking or that results in problems for the end user. The image capture and processing system can detect events and/or problems such as food charring, flames, smoke, steam condensation, expulsion of juices and/or other detectable events. In some embodiments, the image capture and processing can be used to analyze and detect issues with the cooking appliance itself that may, in turn, impact cooking. For example, accumulation of oils, grease or condensation on the camera lens or the glass separating the camera lens from the rest of the chamber can be detected through image analysis and a notification may then be transmitted to the user.

Image capture and processing can also be used to accumulate data from one or more physical components that may not otherwise be configured for, or capable of, interaction with the cooking appliance. For example, a conventional temperature probe may include a physical temperature gauge that displays a sensed temperature. The image capture and processing algorithms may identify the temperature probe and read the dial during the cook to receive the internal temperature of the protein. In various embodiments, image capture and processing may be used to read dials, read Vernier scales, detect changes in shape or extension, changes in color, changes in reflectivity, and signals from embedded light sources. In various embodiments the camera may image the chamber, detect the presence of one or more objects, identify the object and read a measurement or property from the object.

To further improve cooking, image capture and processing can be used to detect food states or changes during the cooking process. One example is detecting food browning or searing. Some ways image capture and processing can be employed in this way include using deep learning or neural networks or other algorithms to detect changes not easily described by humans, detect changes in surface color, detect changes in size, detect movement, detect changes in shape, detect uniformity and gradients of the objects, detect initial conditions and/or detect other state characteristics. Such techniques can be combined with historical data for recipes, or such historical data can at times be used alone. Similarly, such techniques may be combined with other sensor measurements. Feedback from image capture/processing and analysis can be used to stop recipes or alter the flow of the recipe. Recipes can be designed to compensate to allow for such changes while still achieving the desired end result.

In one embodiment, the cooking appliance uses a neural network to classify an image to detect food cooking events. The neural network may be trained by entering numerous images from successful and unsuccessful cooks, labeled and verified by experienced chefs. In operation, an image may be acquired, features extracted and then provided to a trained neural network to produce a label for the image. The label can represent an event or state to be acted upon by the system. In some embodiments, the neural network may include sensor inputs and other data (e.g., a temperature sensor, food properties) as needed to check the event. The neural network can operate based on the current state, historical statistical data, and/or by combining data from various images and sensors throughout the cook.

Referring to FIG. 41, a cooking method 4100 using image analysis will now be described in accordance with various embodiments. At step 4102, an image capture process is initiated, and one or more images is captured in step 4104 (and optionally, data from one or more sensors). In various embodiments, the image is adjusted to a stabilized color temperature and brightness and other image processing may be performed, such as dewarping/undistorting, compression, and/or noise/artifact removal. In step 4106, features are extracted from the captured image and received sensor data. The features are then provided to an analysis module to determine image properties and/or detect food status or cooking events (step 4108). Feedback is then provided to the user (e.g., correct improperly placed trade or food) or recipe engine (e.g., adjust cooking algorithm based on measured height or detection of an event during the cook) (step 4110).

Some embodiments of the disclosure have other aspects, elements, features, and steps in addition to or in place of what is described above. These potential additions and replacements are described throughout the rest of the specification. Reference in this specification to "one embodiment", "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

Some embodiments of the disclosure have other aspects, elements, features, and steps in addition to or in place of what is described above. These potential additions and replacements are described throughout the rest of the specification.

The invention claimed is:

1. A cooking appliance comprising:
   a heating element disposed within a cooking chamber of the cooking appliance and operable to selectively emit waves at any of a plurality of powers and/or peak wavelengths;
   a camera operable to capture an image of at least a portion of the cooking chamber; and
   a computing device operable to:
   supply power to the heating element to vary the power and/or peak wavelength of the emitted waves and generate heat within the cooking chamber; and
   instruct the camera to capture the image when the heating element is emitting at a stabilized power and/or peak wavelength;
   wherein the computing device is operable to digitally adjust the captured image, at least in part based on a known color temperature and brightness of light emitted from the heating element in an image capture state.

2. The cooking appliance of claim 1, wherein the heating element illuminates at least a portion of the cooking chamber; and wherein varying the power and/or peak wavelength of the emitted waves causes corresponding fluctuations in the illumination of the cooking chamber.

3. The cooking appliance of claim 1, wherein the computing device is further operable to analyze the captured image to determine a cooking status, one or more environmental conditions, one or more food properties, and/or one or more events.

4. The cooking appliance of claim 1, wherein the heating element is operable to emit at the stabilized power and/or peak wavelength, generating light within the cooking chamber having a corresponding stabilized color temperature and/or power.

5. The cooking appliance of claim 4, wherein a brightness of the captured image is adjusted, at least in part, by adjusting an effective exposure during image acquisition using a calculated stabilized power.

6. The cooking appliance of claim 4, wherein the computing device is further operable to generate an adjusted captured image by adjusting a color of the captured image, at least in part, by balancing the captured image with respect to the stabilized color temperature.

7. The cooking appliance of claim 6, wherein the computing device further comprises feedback components operable to:

receive the adjusted captured image;
extract one or more features from the adjusted captured image; and
analyze the one or more features to determine an event, property, measurement and/or status.

8. The cooking appliance of claim 7, wherein the feedback components comprises one or more neural networks.

9. The cooking appliance of claim 7, wherein the computing device further comprises a recipe execution engine operable to execute a heating algorithm to cook a food;
wherein the heating algorithm includes instructions to selectively supply power to the heating element;
wherein the recipe execution engine receives feedback data from the feedback components, the feedback data comprising information relating to the determined event, property, measurement and/or status; and
wherein the recipe execution engine adjusts the heating algorithm in response to the received feedback data.

10. The cooking appliance of claim 6, wherein the adjusted captured image is analyzed to determine a size, shape, thickness, location, and/or placement density of a food within the cooking chamber.

11. The cooking appliance of claim 1, further comprising a structured light source disposed to project a structured light onto a food item during image capture; and wherein the computing device is operable to determine geometrical properties of the food item by analyzing the structured light in the captured image.

12. The cooking appliance of claim 1, further comprising a collimated light source directed at a food item from a position above the food item; and wherein the computing device is operable to determine a height of the food item by analyzing, in part, a size and location of a light on the food item in the captured image.

13. The cooking appliance of claim 1, further comprising a probe having visible measurement markers, and wherein the captured image is analyzed to determine a food measurement based on a location and/or orientation of the probe in the image.

14. The cooking appliance of claim 1, wherein the captured image is analyzed to detect user mistakes in a food type, preparation and/or placement.

15. The cooking appliance of claim 1, wherein the captured image is analyzed to detect improper tray placement, improper tray usage, improper accessory usage, probe cable kinking, proximity of probe cable or probe to heaters, detection of broken heaters, food items being placed in incorrect positions on a tray, and/or unexpected food items on the tray.

16. The cooking appliance of claim 1, wherein the computing device is further operable to analyze the captured image to detect cooking events comprising one or more of food charring, flames, smoke, steam condensation, and/or expulsion of juices or other contents of food.

17. The cooking appliance of claim 1, wherein the computing device is further operable to:
adjust the captured image in accordance with a color temperature of the heating element;
identify one or more physical components in the captured image, the physical components including visual indicia;
analyze the visible indicia for the physical components; and
adjust a cooking algorithm based on a value indicated by the visible indicia.

18. The cooking appliance of claim 1, wherein the computing device is further operable to:
initiate an image capture process;
capture and adjusting one or more images;
extract features from received images;
analyze extracted features to determine food properties, food status and/or cooking events; and
provide feedback to a recipe execution engine and/or user.

19. The cooking appliance of claim 1, wherein the computing device further comprises a recipe execution engine operable to cook a food item by controlling the heating element in accordance with a heating algorithm to execute a recipe.

20. The cooking appliance of claim 19, wherein the computing device is operable to adjust a heating duration, a heating schedule, a heating output power, a peak emission wavelength, and/or any combination thereof, of the heating element.

21. The cooking appliance of claim 1, further comprising a directional light source operable to project light onto a food item during image capture; and wherein the computing device is operable to determine a height of the food item based on an analysis of the projected light visible in the captured image.

22. The cooking appliance of claim 1 wherein the heating element comprises one or more wavelength-controllable filament assemblies.

23. The cooking appliance of claim 1 wherein the computing device is further operable to:
select a heating recipe;
capture an image of a food item in the cooking chamber;
adjust the image to a known color temperature of the heating element;
analyze the image to determine a state change of the food item in the cooking chamber; and
adjust the heating element in response to the determined state change.

24. A cooking appliance comprising:
a heating element disposed within a cooking chamber of the cooking appliance and operable to selectively emit waves at any of a plurality of powers and/or peak wavelengths;
a camera operable to capture an image of at least a portion of the cooking chamber; and
a computing device operable to:
supply power to the heating element to vary the power and/or peak wavelength of the emitted waves and generate heat within the cooking chamber; and
instruct the camera to capture the image when the heating element is emitting at a stabilized power and/or peak wavelength;
wherein the heating element is operable to emit at the stabilized power and/or peak wavelength, generating light within the cooking chamber having a corresponding stabilized color temperature and/or power; and
wherein a brightness of the captured image is adjusted, at least in part, by compensating for a calculated stabilized power and by adjusting an effective exposure during image acquisition using a calculated stabilized power.

25. A cooking appliance comprising:
a heating element disposed within a cooking chamber of the cooking appliance and operable to selectively emit waves at any of a plurality of powers and/or peak wavelengths;
a camera operable to capture an image of at least a portion of the cooking chamber; and
a computing device operable to:

supply power to the heating element to vary the power and/or peak wavelength of the emitted waves and generate heat within the cooking chamber; and
instruct the camera to capture the image when the heating element is emitting at a stabilized power and/or peak wavelength;
initiate an image capture sequence;
pause a heating algorithm executed by a recipe execution engine;
drive the heating element to an image capture state at a stabilized power and/or peak wavelength;
detect the image capture state;
capture the image; and
resume the heating algorithm.

26. The cooking appliance of claim 25, wherein the image capture sequence is initiated by the recipe execution engine and/or a user.

27. The cooking appliance of claim 25, wherein the heating element illuminates the cooking chamber during image capture by emitting light at approximately a stabilized color temperature corresponding to the image capture state.

28. The cooking appliance of claim 25, wherein the image capture state is detected by estimating a duration of time for the heating element to achieve a designated temperature range for the image capture state and waiting the duration of time until the temperature range is achieved.

29. The cooking appliance of claim 25, wherein the image capture state is detected by determining when the heating element is emitting at the stabilized power and/or peak wavelength; and signaling to the image capture components that the heating element is in the image capture state.

30. The cooking appliance of claim 25, further comprising a plurality of heating elements; and wherein the image capture state is detected by estimating a duration of time for each of the heating elements to reach a designated temperature range for the image capture state and waiting until that temperature range is achieved for each heating element.

31. The cooking appliance of claim 25, wherein the computing device is operable to digitally adjust the captured image, at least in part based on a known color temperature and brightness of light emitted from the heating element in an image capture state.

* * * * *

UNITED STATES PATENT AND TRADEMARK OFFICE
CERTIFICATE OF CORRECTION

| | |
|---|---|
| PATENT NO. | : 11,388,788 B2 |
| APPLICATION NO. | : 16/030858 |
| DATED | : July 12, 2022 |
| INVENTOR(S) | : Dennis Denker et al. |

It is certified that error appears in the above-identified patent and that said Letters Patent is hereby corrected as shown below:

In the Specification

In Column 1, Lines 7-8, change "patent application Ser. No." to --Patent Application No.--.

In Column 1, Line 13, change "patent application Ser. No." to --Patent Application No.--.

In Column 1, Line 14, change "patent application Ser. No." to --Patent Application No.--.

In Column 1, Lines 17-18, change "patent application Ser. No." to --Patent Application No.--.

Signed and Sealed this
First Day of November, 2022

Katherine Kelly Vidal
*Director of the United States Patent and Trademark Office*